(12) United States Patent
Honda

(10) Patent No.: US 10,833,370 B2
(45) Date of Patent: Nov. 10, 2020

(54) BATTERY AND BATTERY MANUFACTURING METHOD

(71) Applicant: Panasonic Intellectual Property Management Co., Ltd., Osaka (JP)

(72) Inventor: Kazuyoshi Honda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 66 days.

(21) Appl. No.: 15/981,652

(22) Filed: May 16, 2018

(65) Prior Publication Data

US 2018/0366785 A1 Dec. 20, 2018

(30) Foreign Application Priority Data

Jun. 15, 2017 (JP) .................. 2017-117383

(51) Int. Cl.
*H01M 10/0583* (2010.01)
*H01M 10/04* (2006.01)
(Continued)

(52) U.S. Cl.
CPC ....... *H01M 10/0583* (2013.01); *H01M 4/665* (2013.01); *H01M 10/045* (2013.01); *H01M 10/0585* (2013.01)

(58) Field of Classification Search
CPC .......... H01M 10/0583; H01M 10/045; H01M 10/0585
(Continued)

(56) References Cited

U.S. PATENT DOCUMENTS

| 4,999,263 A | 3/1991 | Kabata et al. |
| 5,635,312 A | 6/1997 | Yanagisawa et al. |

FOREIGN PATENT DOCUMENTS

| JP | 8-203539 | 8/1996 |
| JP | 2000-195495 | 7/2000 |

(Continued)

OTHER PUBLICATIONS

Kaahwa, Y., Electronic Mobility in Polyethylene Terephthalate, 1979, physica status solidi (a), 55, K197-K199 (Year: 1979).*

(Continued)

*Primary Examiner* — Sean P Cullen
(74) *Attorney, Agent, or Firm* — Greenblum & Bernstein, P.L.C.

(57) ABSTRACT

A battery includes a current collector, first electrode layer, first counter electrode layer, and second electrode layer. The current collector includes a first electroconductive portion, first insulating portion, and second electroconductive portion. The second electroconductive portion includes a first edge region, first front face region, first rear face region, first fold portion, second front face region, second rear face region, and second edge region. The first and second rear face regions face each other by the current collector being folded. The first electrode layer is disposed in contact with the first electroconductive portion, the first counter electrode layer in contact with the first front face region, and the second electrode layer in contact with the second front face region. The first insulating portion links the first electroconductive portion and first edge region. The first electrode layer and first counter electrode layer face each other by the current collector being folded.

14 Claims, 50 Drawing Sheets

(51) Int. Cl.
*H01M 10/0585* (2010.01)
*H01M 4/66* (2006.01)
(58) Field of Classification Search
USPC .......................................................... 429/152
See application file for complete search history.

(56) References Cited

FOREIGN PATENT DOCUMENTS

| | | |
|---|---|---|
| JP | 2003-123743 | 4/2003 |
| JP | 2010-067443 | 3/2010 |
| JP | 2012-243395 | 12/2012 |
| JP | 2014130754 A * | 7/2014 |
| WO | 1988/008210 | 10/1988 |

OTHER PUBLICATIONS

Hayashi et al., Temperature Dependence of Carrier Mobility in Polyethylene Terephthalate, 1973, Japanese Journal of Applied Physics, 12, 1089-1090 (Year: 1973).*

* cited by examiner

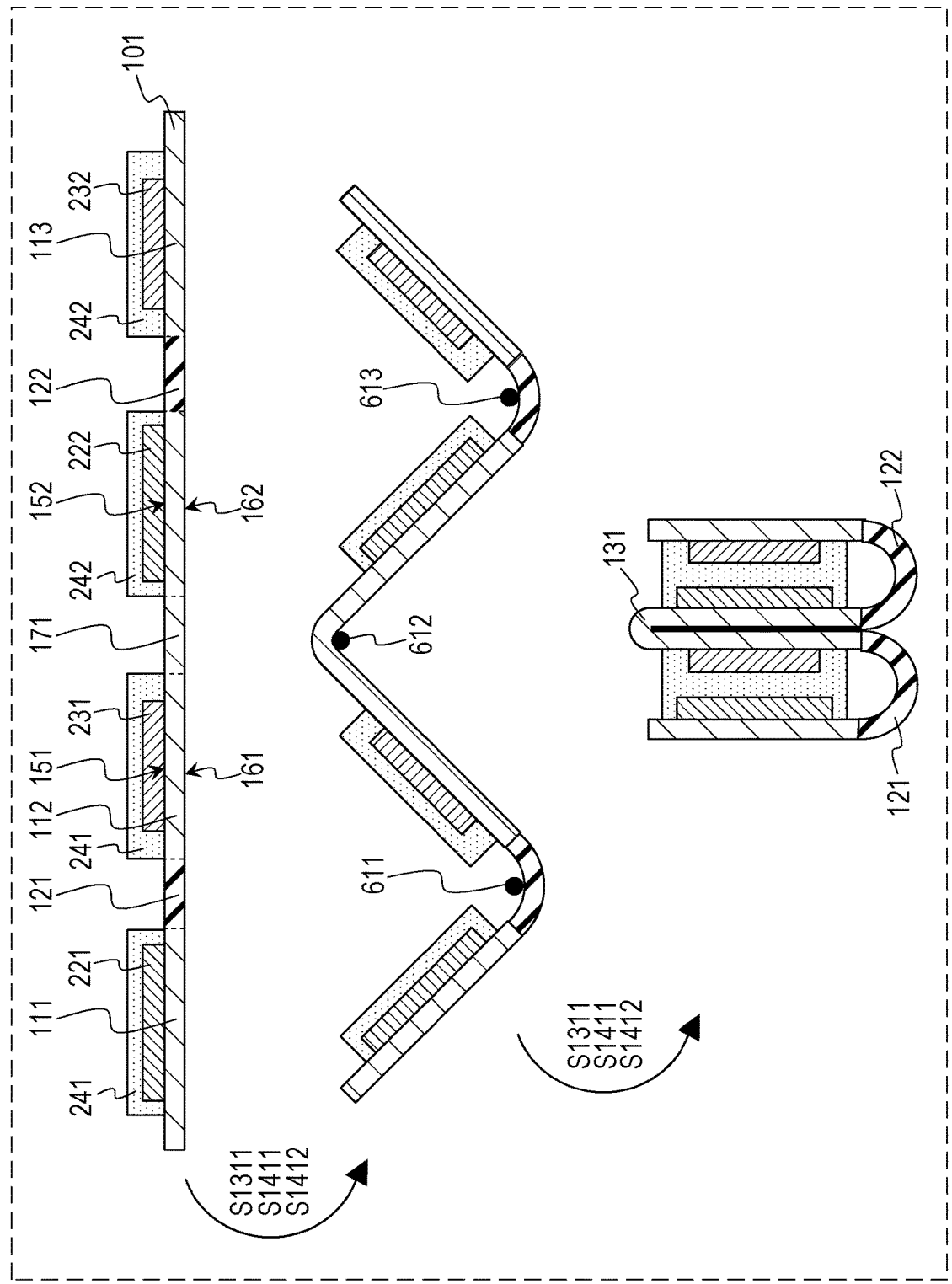

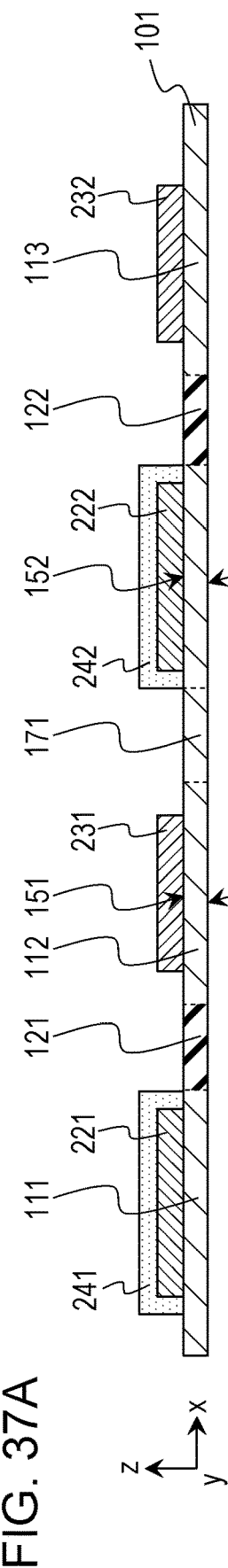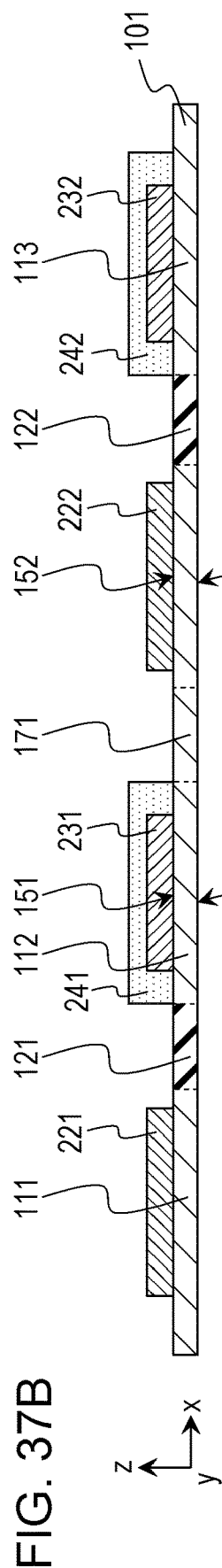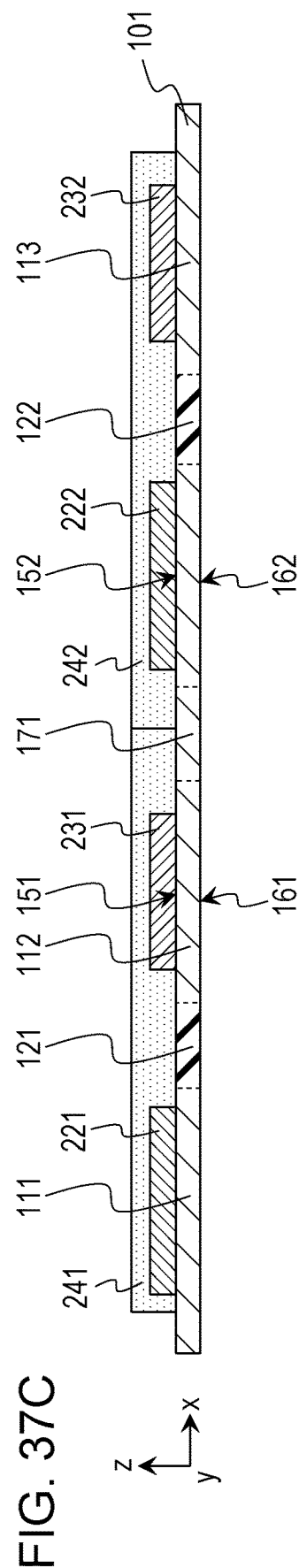

BATTERY AND BATTERY MANUFACTURING METHOD

BACKGROUND

1. Technical Field

The present disclosure relates to a battery and a battery manufacturing method.

2. Description of the Related Art

Japanese Unexamined Patent Application Publication No. 2000-195495 discloses a sheet battery including a composite current collector having a positive current collector layer on one face side and having a negative current collector layer on the other face side.

Japanese Unexamined Patent Application Publication No. 2010-67443 discloses a battery including an electrode base material sectioned into multiple regions and folded at each region, and a unit battery portion including a solid electrolytic layer provided to each region of the electrode base material and a positive-and-negative pair of electrode active material layers that sandwich the solid electrolytic layer.

Japanese Unexamined Patent Application Publication No. 8-203539 discloses a laminated battery that is formed by disposing positive and negative electrodes formed in bands, disposed such that both faces of electrodes of one polarity face electrodes of the other polarity by being folded.

International Publication No. 88/008210 discloses a secondary battery having a structure where a positive electrode and negative electrode are folded in an alternating manner with separators disposed therebetween.

Japanese Patent No. 5,599,366 discloses a manufacturing method of a solid assembled battery, including a process of folding a band-shaped positive current collector and a band-shaped negative current collector in an alternating manner.

Japanese Unexamined Patent Application Publication No. 2003-123743 discloses a cell where positive electrodes and negative electrodes are alternately laminated with solid electrolytic film interposed therebetween, by compression bonding by vertically pressing positive electrodes and negative electrodes layered in an alternative manner.

SUMMARY

Improved bonding strength of components of the battery is desired in the conventional art.

In one general aspect, the techniques disclosed here feature battery, including a first current collector, a first electrode layer, a first counter electrode layer, and a second electrode layer. The first counter electrode layer is a counter electrode of the first electrode layer and the second electrode layer. The first current collector includes a first electroconductive portion, a first insulating portion, and a second electroconductive portion. The second electroconductive portion includes a first edge region, a first front face region, a first rear face region, a first fold portion, a second front face region, a second rear face region, and a second edge region. The first front face region is a region situated between the first edge region and the first fold portion. The first rear face region is a region situated on the rear face of the first front face region. The second front face region is a region situated between the second edge region and the first fold portion. The second rear face region is a region situated on the rear face of the second front face region. The first current collector is folded at the first fold portion, whereby the first rear face region and the second rear face region are positioned facing each other. The first electrode layer is disposed in contact with the first electroconductive portion. The first counter electrode layer is disposed in contact with the first front face region. The second electrode layer is disposed in contact with the second front face region. The first insulating portion links the first electroconductive portion and the first edge region. The first current collector is folded at the first insulating portion, whereby the first electrode layer and the first counter electrode layer are positioned facing each other.

A battery manufacturing method according to an aspect of the present disclosure is a battery manufacturing method using a battery manufacturing apparatus. The battery manufacturing apparatus includes an electrode layer forming unit, a counter electrode layer forming unit, and a current collector folding unit that folds a first current collector. The first current collector includes a first electroconductive portion, a first insulating portion, and a second electroconductive portion. The second electroconductive portion includes a first edge region, a first front face region, a first rear face region, a first fold region, a second front face region, a second rear face region, and a second edge region. The first front face region is a region situated between the first edge region and the first fold region. The first rear face region is a region situated on the rear face of the first front face region. The second front face region is a region situated between the second edge region and the first fold region. The second rear face region is a region situated on the rear face of the second front face region. The first insulating portion links the first electroconductive portion and the first edge region. The method includes steps of: forming (a11) a first electrode layer in contact with the first electroconductive portion by the electrode layer forming unit; forming (a12) a second electrode layer in contact with the second front face region by the electrode layer forming unit; forming (b11) the first counter electrode layer, which is the counter electrode of the first electrode layer, in contact with the first front face region by the counter electrode layer forming unit; folding (c11) the first fold region by the current collector folding unit; and folding (d11) the first insulating portion by the current collector folding unit. In the folding step (c11), the first rear face region and second rear face region are positioned facing each other, due to the first current collector being folded at the first fold region by the current collector folding unit. In the folding step (d11), the first electrode layer and first counter electrode layer are positioned facing each other, due to the first current collector being folded at the first insulating portion by the current collector folding unit.

According to the present disclosure, bonding strength of components of the battery can be improved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 36 is an x-z diagram (cross-sectional view) illustrating an example of a first fold region folding step, a first insulating portion folding step, and a second insulating portion folding step;

FIGS. 37A through 37C are x-z diagrams (cross-sectional views) illustrating schematic configurations of a first current collector where electrode layers, counter electrode layers, and solid electrolyte layers have been formed;

DETAILED DESCRIPTION

Embodiments will be described below with reference to the drawings.

First Embodiment

Figure 1:
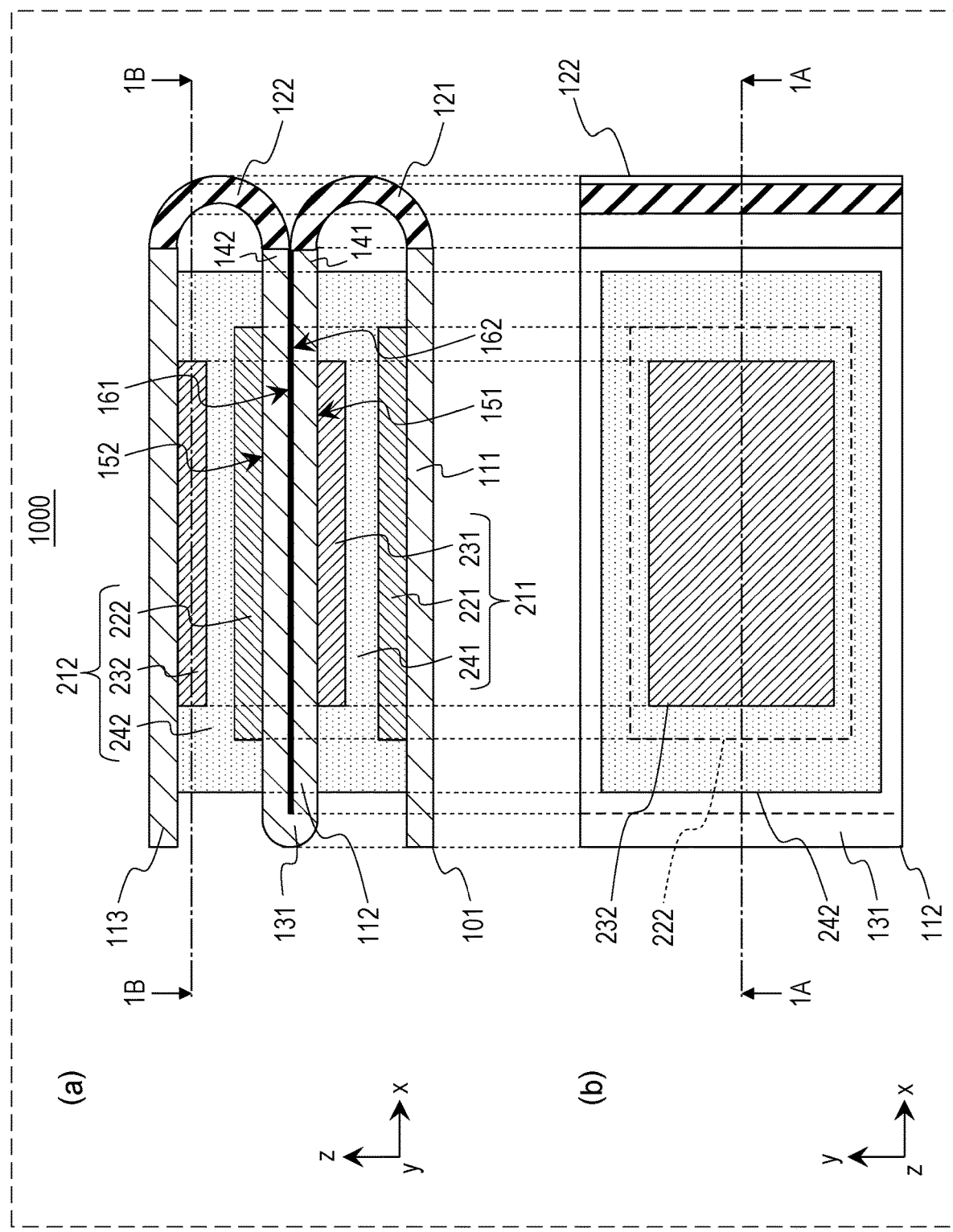
FIG. 1 is a diagram illustrating a schematic configuration of a battery according to a first embodiment.

FIG. 1 is a diagram illustrating a schematic configuration of a battery 1000 according to a first embodiment.

Indicated by (a) in FIG. 1 is an x-z view (cross-sectional view taken along 1A in FIG. 1) illustrating the schematic configuration of the battery 1000 according to the first embodiment.

Indicated by (b) in FIG. 1 is an x-y view (cross-sectional view taken along 1B in FIG. 1) illustrating the schematic configuration of the battery 1000 according to the first embodiment.

The battery 1000 according to the first embodiment includes a first current collector 101, a first electrode layer 221, a first counter electrode layer 231, and a second electrode layer 222.

The first counter electrode layer 231 is a counter electrode of the first electrode layer 221 and second electrode layer 222.

The first current collector 101 has a first electroconductive portion 111, a first insulating portion 121, and a second electroconductive portion 112.

The second electroconductive portion 112 includes a first edge region 141, a first front face region 151, a first rear face region 161, a first fold portion 131, a second front face region 152, a second rear face region 162, and a second edge region 142.

The first front face region 151 is a region situated between the first edge region 141 and the first fold portion 131.

The first rear face region 161 is a region situated on the rear face of the first front face region 151.

The second front face region 152 is a region situated between the second edge region 142 and the first fold portion 131.

The second rear face region 162 is a region situated on the rear face of the second front face region 152.

The first current collector 101 is folded at the first fold portion 131. Accordingly, the first rear face region 161 and the second rear face region 162 are disposed facing each other.

The first electrode layer 221 is disposed in contact with the first electroconductive portion 111.

The first counter electrode layer 231 is disposed in contact with the first front face region 151.

The second electrode layer 222 is disposed in contact with the second front face region 152.

The first insulating portion 121 is a member linking the first electroconductive portion 111 and the first edge region 141.

The first current collector 101 is folded at the first insulating portion 121. Accordingly, the first electrode layer 221 and the first counter electrode layer 231 are positioned facing each other.

According to the above configuration, the bonding strength between components of the battery can be improved. That is to say, the first electrode layer 221 and first counter electrode layer 231 can be respectively disposed to the first electroconductive portion 111 and second electroconductive portion 112 that are linked to each other by the first insulating portion 121. Accordingly, the positional relationship between the first electrode layer 221 disposed on the first electroconductive portion 111 and the first counter electrode layer 231 disposed on the second electroconductive portion 112 can be strongly maintained by the first insulating portion 121 (in other words, by the first current collector 101 that is one component). Accordingly, the layers (or cells) making up the battery can be prevented from exhibiting positional shifting or separation due to shock, vibration, and so forth, when manufacturing the battery or using the battery, for example. That is to say, the strength of bonding of the layers (e.g., the first electrode layer 221 and first counter electrode layer 231) making up the battery can be improved by the first current collector 101. Thus, reliability of the battery can be improved.

Also, according to the above configuration, the first counter electrode layer 231 and second electrode layer 222 can be respectively disposed on the first front face region 151 and second front face region 152 (i.e., two regions that are partial regions of the first current collector 101 and that are linked by the first fold portion 131). Accordingly, the positional relationship between the first counter electrode layer 231 disposed on the first front face region 151 and the second electrode layer 222 disposed on the second front face region 152 can be strongly maintained by the first fold portion 131 (in other words, by the first current collector 101 that is one component). Accordingly, in a case where the laminated battery is configured using the first current collector 101, two battery cells (cells) making up the battery can be linked with each other by the first current collector 101.

Also, according to the above configuration, the first front face region 151 on which the first counter electrode layer 231 is disposed and the second front face region 152 on which the second electrode layer 222 is disposed can be connected by the first fold portion 131 with low resistance. That is to say, the resistance between the first front face region 151 and the second front face region 152 can be reduced. Accordingly, even in a case where the battery is operated under a large current, generation of heat due to contact resistance between the first rear face region 161 and second rear face region 162 can be made less easy to occur. Accordingly, deterioration performance does not readily occur even if a thin current collector is used as the first current collector 101, for example. As a result, reduced weight of the battery can be realized.

Also, according to the above configuration, out of the side faces of the battery, the side face where the first insulating portion 121 is situated can be covered by the first insulating portion 121. Accordingly, mutual contact between members that may exist outside of the battery (e.g., another battery, etc.), and the side face of the battery where the first insulating portion 121 is situated, can be prevented by the first insulating portion 121. Thus, short-circuiting among batteries can be suppressed. Also, partial destruction of the side face of the battery by contact between the battery and members that may exist outside of the battery can be suppressed. Even if a part of components (e.g., electrode material included in the first electrode layer 221, counter electrode material included in the first counter electrode layer 231, and so forth) of the battery falls loose, the fallen component can be suppressed by the first insulating portion 121 from moving to another cell portion within the battery or to the outside of the battery, due to part of the side face of the battery being covered by the first insulating portion 121. Accordingly, short-circuiting within the battery due to fallen components of the battery can be suppressed. This enables the reliability of the battery to be further improved.

Note that the battery 1000 according to the first embodiment may further include a second counter electrode layer 232, as illustrated in FIG. 1.

The second counter electrode layer 232 is a counter electrode of the first electrode layer 221 and second electrode layer 222.

The first current collector 101 may include a second insulating portion 122 and a third electroconductive portion 113.

The second counter electrode layer 232 is disposed in contact with the third electroconductive portion 113.

The second insulating portion 122 is a member linking the second edge region 142 and the third electroconductive portion 113.

The first current collector 101 is folded at the second insulating portion 122, whereby the second electrode layer 222 and second counter electrode layer 232 are positioned facing each other.

According to the above configuration, the bonding strength between components of the battery can be further improved. That is to say, the second electrode layer 222 and second counter electrode layer 232 can be respectively disposed on the second electroconductive portion 112 and third electroconductive portion 113 that are linked with each other by the second insulating portion 122. Accordingly, the positional relationship between the second electrode layer 222 disposed on the second electroconductive portion 112 and the second counter electrode layer 232 disposed on the third electroconductive portion 113 can be strongly maintained by the second insulating portion 122 (in other words, by the first current collector 101 that is one component). Accordingly, the layers (e.g., the second electrode layer 222 and second counter electrode layer 232) making up the battery can be prevented from exhibiting positional shifting or separation due to shock, vibration, and so forth, when manufacturing the battery or using the battery, for example.

Also, according to the above configuration, a laminated battery can be configured using the first current collector 101. That is to say, a power-generating element (first power-generating element 211) including the first electrode layer 221 and first counter electrode layer 231, and a power-generating element (second power-generating element 212) including the second electrode layer 222 and second counter electrode layer 232, can be laminated by serial connection via the first current collector 101 (i.e., the second electroconductive portion 112 of the first current collector 101). Accordingly, the positional relationship between components that are the first power-generating element 211 and the second power-generating element 212 can be strongly maintained by the first insulating portion 121 and second insulating portion 122 (in other words, by the first current collector 101 that is one component). Accordingly, the power-generating elements (e.g., the first power-generating element 211 and second power-generating element 212) making up the battery can be prevented from exhibiting positional shifting or separation due to shock, vibration, and so forth, when manufacturing the battery or using the battery, for example. Thus, the reliability of the battery can be improved while raising the battery voltage by the serial connection of the first power-generating element 211 and second power-generating element 212.

Also, according to the above configuration, out of the side faces of the battery, the side face where the second insulating portion 122 is situated can be covered by the second insulating portion 122. Accordingly, mutual contact between members that may exist outside of the battery (e.g., another battery, etc.), and the side face of the battery where the second insulating portion 122 is situated, can be prevented by the second insulating portion 122. Thus, short-circuiting among batteries can be suppressed. Also, partial destruction of the side face of the battery by contact between the battery and members that may exist outside of the battery can be suppressed. Even if a part of components (e.g., electrode material included in the second electrode layer 222, counter electrode material included in the second counter electrode layer 232, and so forth) of the battery falls loose, the fallen component can be suppressed by the second insulating portion 122 from moving to another cell portion (e.g., the first power-generating element 211, etc.) within the battery or to the outside of the battery, due to part of the side face of the battery being covered by the second insulating portion 122. Accordingly, short-circuiting within the battery due to fallen components of the battery can be suppressed. This enables the reliability of the battery to be further improved.

Note that the battery 1000 according to the first embodiment may further include a first solid electrolyte layer 241, as illustrated in FIG. 1.

The first solid electrolyte layer 241 is situated between the first electrode layer 221 and the first counter electrode layer 231.

According to the above configuration, one solid battery cell (first power-generating element 211) can be configured from the first electrode layer 221, first counter electrode layer 231, and first solid electrolyte layer 241.

Note that the first solid electrolyte layer 241 may be disposed in contact with the first electroconductive portion 111 and second electroconductive portion 112 in the battery 1000 according to the first embodiment, as illustrated in FIG. 1.

According to the above configuration, the strength of bonding between components of the battery can be further improved. That is to say, the strength of bonding between the first electroconductive portion 111 and second electroconductive portion 112 can be improved by the first solid electrolyte layer 241. Accordingly, the first electrode layer 221 and first counter electrode layer 231 can be suppressed from peeling loose from the first current collector 101. Thus, the layers of the first power-generating element 211 can be prevented from exhibiting positional shifting or separation due to shock, vibration, and so forth, when manufacturing the battery or using the battery, for example. Thus, reliability of the battery can be improved even further.

Note that the battery 1000 according to the first embodiment may further include a second solid electrolyte layer 242.

The second solid electrolyte layer 242 is situated between the second electrode layer 222 and the second counter electrode layer 232.

According to the above configuration, one solid battery cell (second power-generating element 212) can be configured from the second electrode layer 222, second counter electrode layer 232, and second solid electrolyte layer 242. Thus, a laminated battery can be configured of the first power-generating element 211 and the second power-generating element 212 being serially connected via the first current collector 101. The first power-generating element 211 (i.e., the first electrode layer 221, first counter electrode layer 231, and first solid electrolyte layer 241) and the second power-generating element 212 (i.e., the second electrode layer 222, second counter electrode layer 232, and second solid electrolyte layer 242) can be strongly linked by the first current collector 101 at this time. Accordingly, the battery cells (first power-generating element 211 and second power-generating element 212) can be prevented from exhibiting positional shifting or separation due to shock, vibration, and so forth, when manufacturing the battery or using the battery, for example. That is to say, the strength of bonding of the battery cells (first power-generating element 211 and second power-generating element 212) can be improved by the first current collector 101. Thus, the reliability of the battery can be improved while raising the battery voltage by the serial connection of the first power-generating element 211 and second power-generating element 212.

Note that the second solid electrolyte layer 242 may be disposed in contact with the second electroconductive portion 112 and third electroconductive portion 113 in the battery 1000 according to the first embodiment, as illustrated in FIG. 1.

According to the above configuration, the strength of bonding between components of the battery can be further improved. That is to say, the strength of bonding between the second electroconductive portion 112 and third electroconductive portion 113 can be improved by the second solid electrolyte layer 242. Accordingly, the second electrode layer 222 and second counter electrode layer 232 can be suppressed from peeling loose from the first current collector 101. Thus, the layers making up the second power-generating element 212 can be prevented from exhibiting positional shifting or separation due to shock, vibration, and so forth, when manufacturing the battery or using the battery, for example. Thus, reliability of the battery can be improved even further.

Details of advantages of the above will be described below by way of first and second comparative examples.

Figure 51:
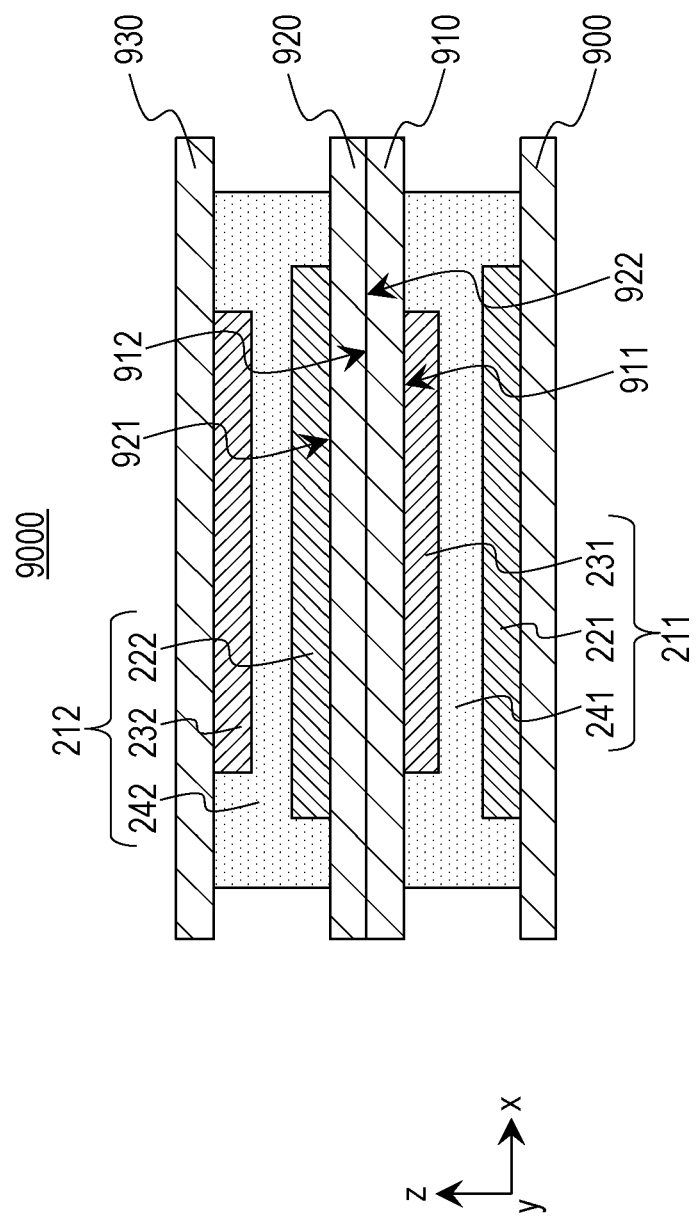
FIG. 51 is a cross-sectional view illustrating a schematic configuration of a battery according to a first comparative example.

FIG. 51 is a cross-sectional view illustrating a schematic configuration of a battery 9000 according to the first comparative example.

The battery 9000 according to the first comparative example has a current collector 900, a current collector 910, a current collector 920, and a current collector 930. The first counter electrode layer 231 is formed in a front face region 911 of the current collector 910. The second electrode layer 222 is formed in a front face region 921 of the current collector 920. A rear face region 912 of the current collector 910 and a rear face region 922 of the current collector 920 are disposed in contact with each other.

Now, the battery 9000 according to the first comparative example does not have the first current collector 101 in the battery 1000 according to the first embodiment. In other words, the current collector 910 and current collector 920 are not linked to each other by a member equivalent to the first fold portion 131.

Accordingly, the strength of bonding among components of the battery cannot be improved in the first comparative example. That is to say, there is a higher probability of positional deviation occurring between the current collector 910 and current collector 920 that are not linked to each other. Accordingly, there is a higher probability of positional deviation occurring between the components situated at the front face region 911 side of the current collector 910 (e.g., the second power-generating element 212) and the components situated at the front face region 921 side of the current collector 920 (e.g., the first power-generating element 211), due to shock, vibration, and so forth, when manufacturing the battery or using the battery, for example. Accordingly, the battery reliability cannot be improved in the battery 9000 according to the first comparative example.

As opposed to this, the bonding strength among the components of the battery can be improved in the first embodiment, by having the first current collector 101 that has the first fold portion 131, as described above. The positional relationship of the components of the battery (e.g., the first power-generating element 211 and second power-generating element 212) can be maintained more strongly by the first fold portion 131 in the first embodiment, as compared to a case where the rear face region 912 of the current collector 910 and the rear face region 922 of the current collector 920 simply have an adhesive layer provided there between, in the battery 9000 according to the first comparative example, for example. Further, the resistance between the first front face region 151 and the second front face region 152 can be reduced by the first fold portion 131.

Moreover, the current collector 900 and current collector 910 are not linked to each other by a member equivalent to the first insulating portion 121 in the battery 9000 according to the first comparative example.

Accordingly, the strength of bonding among components of the battery cannot be improved in the first comparative example. That is to say, there is a higher probability of positional deviation occurring between the current collector 900 and current collector 910 that are not linked to each other. Accordingly, there is a higher probability of positional deviation occurring between the components situated at the side of the current collector 900 (e.g., the first electrode layer 221) and the components situated at the side of the current collector 910 (e.g., the first counter electrode layer 231), due to shock, vibration, and so forth, when manufacturing the battery or using the battery, for example. Accordingly, the battery reliability cannot be improved in the battery 9000 according to the first comparative example.

As opposed to this, the bonding strength among the components of the battery can be improved in the first embodiment, by having the first current collector 101 that has the first insulating portion 121.

Furthermore, the current collector 920 and current collector 930 are not linked to each other by a member equivalent to the second insulating portion 122 in the battery 9000 according to the first comparative example.

Accordingly, the strength of bonding among components of the battery cannot be improved in the first comparative example. That is to say, there is a higher probability of positional deviation occurring between the current collector 920 and current collector 930 that are not linked to each other. Accordingly, there is a higher probability of positional deviation occurring between the components situated at the side of the current collector 920 (e.g., the second electrode layer 222) and the components situated at the side of the current collector 930 (e.g., the second counter electrode layer 232), due to shock, vibration, and so forth, when manufacturing the battery or using the battery, for example. Accordingly, the battery reliability cannot be improved in the battery 9000 according to the first comparative example.

As opposed to this, the bonding strength among the components of the battery can be improved in the first embodiment, by having the first current collector 101 that has the second insulating portion 122.

Figure 52:
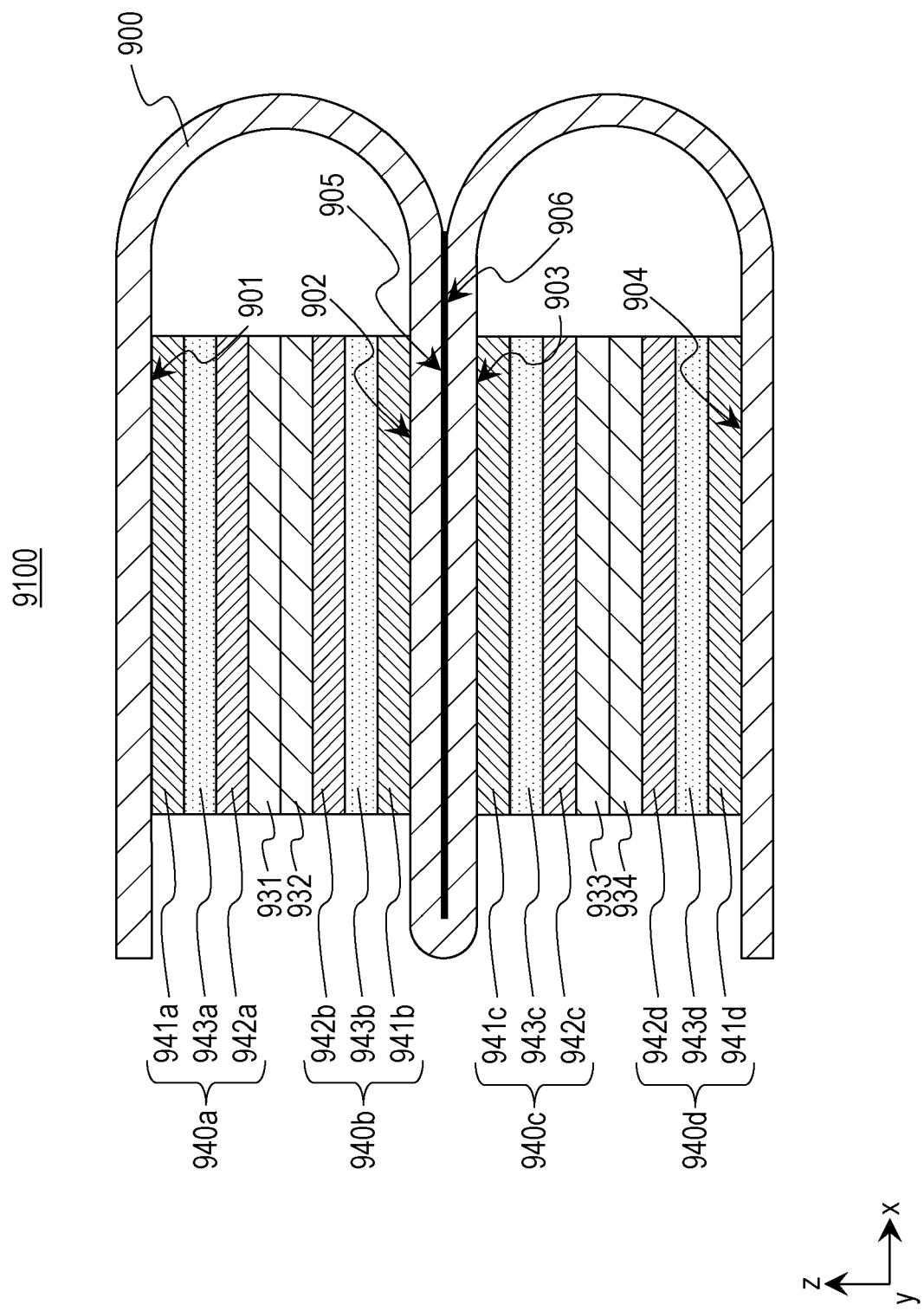
FIG. 52 is a cross-sectional view illustrating a schematic configuration of a battery according to a second comparative example.

FIG. 52 is a cross-sectional view illustrating a schematic configuration of a battery 9100 according to the second comparative example.

The battery 9100 according to the second comparative example has the current collector 900. The current collector 900 is folded so that a rear face region 905 and a rear face region 906 come into contact. Power-generating elements (940a, 940b, 940c, and 940d) are disposed in contact with front face regions (901, 902, 903, and 904) of the current collector 900. That is to say, electrode layers (941a, 941b, 941c, and 941d) are each disposed in contact with the front face regions (901, 902, 903, and 904) of the current collector 900. Solid electrolyte layers (943a, 943b, 943c, and 943d) are also each disposed in contact with the electrodes (941a, 941b, 941c, and 941d). Counter electrode layers 942a, 942b, 942c, and 942d) are each disposed in contact with the solid electrolyte layers (943a, 943b, 943c, and 943d). Current collectors (931, 932, 933, and 934) are each disposed in contact with the counter electrode layers 942a, 942b, 942c, and 942d).

The battery 9100 according to the second comparative example has two electrode layers of the same polarity (i.e., electrode layer 941b and electrode layer 941c) disposed across the fold portion of the current collector 900. That is to say, the battery 9100 according to the second comparative example does not have a bipolar electrode structure including the first current collector 101 in the battery 1000 according to the first embodiment. In other words, the battery 9100 according to the second comparative example does not have a configuration where two electrode layers of polarity opposite to each other (e.g., the second electrode layer 222 and first counter electrode layer 231) disposed across the first fold portion 131 of the first current collector 101.

Accordingly, a laminated battery where the power-generating elements are serially connected cannot be made with the second comparative example. That is to say, the power-generating elements (940a, 940b, 940c, and 940d) can only be connected in parallel in the battery 9100 according to the second comparative example. Accordingly, the battery voltage cannot be raised by serially connecting the power-generating elements in the second comparative example.

As opposed to this, a laminated battery where the first power-generating element 211 and second power-generating element 212 are serially connected via the first current collector 101 can be configured in the first embodiment, as described above. Further, the intensity of bonding of the battery cells making up the battery (first power-generating element 211 and second power-generating element 212) can be raised by the first current collector 101. Accordingly, the reliability of the battery can be improved while raising the battery voltage by the serial connection of the first power-generating element 211 and second power-generating element 212.

Also, current collectors (931 and 932) of opposite polarity as that of the current collector 900 are disposed between the front face region 901 and front face region 902 in the battery 9100 according to the second comparative example. Further, current collectors (933 and 934) of opposite polarity as that of the current collector 900 are disposed between the front face region 903 and front face region 904 of the first current collector 900 in the battery 9100 according to the second comparative example. That is to say, the battery 9100 according to the second comparative example does not have solid electrolyte layers disposed in contact with current collectors on both sides, as in the battery 1000 according to the first embodiment.

Accordingly, the strength of bonding between components of the battery cannot be improved in the second embodiment. That is to say, the current collector 931 and current collector 932 (or the current collector 933 and 934) in the battery 9100 according to the second comparative example 2 readily peel away. Further, the counter electrode layers (941a, 942b, 942c, and 942d) readily peel loose from the current collectors (931, 932, 933, and 934) in the battery 9100 according to the second comparative example. Thus, there is a possibility that positional deviation or separation will occur among the power-generating elements.

As opposed to this, the strength of bonding among the components of the battery can be improved even further, by the solid electrolyte layers (i.e., the first solid electrolyte layer 241 and second solid electrolyte layer 242) disposed in contact with the current collectors on both sides in the first embodiment, as described above. That is to say, the strength of bonding between the first electroconductive portion 111 and second electroconductive portion 112 can be improved by the first solid electrolyte layer 241. The strength of bonding between the second electroconductive portion 112 and third electroconductive portion 113 can also be improved by the second solid electrolyte layer 242.

The first electroconductive portion 111, second electroconductive portion 112, and third electroconductive portion 113 are members having electroconductivity. The first electroconductive portion 111, second electroconductive portion 112, and third electroconductive portion 113 may be thin films having electroconductivity, for example. Examples of material from which the first electroconductive portion 111, second electroconductive portion 112, and third electroconductive portion 113 are formed include metal (stainless steel (SUS), aluminum (Al), copper (Cu), and so forth), for example. The material of a principal face of the first electroconductive portion 111, second electroconductive portion 112, and third electroconductive portion 113 on which electrode layers are formed may be a different material from that of a principal face where counter electrode layers are formed. That is to say, a multi-layer-structure metal foil may be used for the first electroconductive portion 111, second electroconductive portion 112, and third electroconductive portion 113. Also, a current collector layer (e.g., a layer including an electroconductive material) may be provided to portions coming into contact with an electrode layer or counter electrode layer. The thicknesses of the first electroconductive portion 111, second electroconductive portion 112, and third electroconductive portion 113 may be 5 to 100 μm, for example.

The first power-generating element 211 and second power-generating element 212 are power-generating units having charging and discharging properties (e.g., secondary batteries), for example. The first power-generating element 211 and second power-generating element 212 may be battery cells, for example.

Note that the first power-generating element 211 and second power-generating element 212 may have solid electrolyte layers. That is to say, the first power-generating element 211 and second power-generating element 212 may be fully-solid batteries.

The first electrode layer 221 and second electrode layer 222 are layers including electrode material (e.g., active material).

The first counter electrode layer 231 and second counter electrode layer 232 are layers including counter electrode material (e.g., active material). Counter electrode material is material making up counter electrodes to the electrode material.

The first electrode layer 221 and first counter electrode layer 231 may be each formed over ranges narrower than the first electroconductive portion 111 and second electroconductive portion 112, as illustrated in FIG. 1.

The second electrode layer 222 and second counter electrode layer 232 each may be formed over ranges narrower than the second electroconductive portion 112 and third electroconductive portion 113, as illustrated in FIG. 1.

The first solid electrolyte layer 241 and second solid electrolyte layer 242 are solid electrolyte layers including solid electrolytes.

The first solid electrolyte layer 241 may be disposed over a greater area than that of the first electrode layer 221 and first counter electrode layer 231, as illustrated in FIG. 1. That is to say, the first solid electrolyte layer 241 may be disposed in a manner covering the first electrode layer 221 and first counter electrode layer 231. Accordingly, short-circuiting of the first electrode layer 221 and first counter electrode layer 231 due to direct contact can be prevented.

Also, the second solid electrolyte layer 242 may be disposed over a greater area than that of the second electrode layer 222 and second counter electrode layer 232, as illustrated in FIG. 1. That is to say, the second solid electrolyte layer 242 may be disposed in a manner covering the second electrode layer 222 and second counter electrode layer 232. Accordingly, short-circuiting of the second electrode layer 222 and second counter electrode layer 232 due to direct contact can be prevented.

The first solid electrolyte layer 241 may be disposed in a range that is narrower than the first electroconductive portion 111 and second electroconductive portion 112, as illustrated in FIG. 1. Alternatively, the formation range of the first solid electrolyte layer 241 may be the same range as the first electroconductive portion 111 and second electroconductive portion 112.

Also, the second solid electrolyte layer 242 may be formed in a range narrower than that of the second electroconductive portion 112 and third electroconductive portion 113, as illustrated in FIG. 1. Alternatively, the formation range of the second solid electrolyte layer 242 may be the same range as the second electroconductive portion 112 and third electroconductive portion 113.

Note that the first electrode layer 221 and second electrode layer 222 may be negative active material layers. The electrode material in this case is a negative active material. The first electroconductive portion 111 is a negative current collector. The second electroconductive portion 112 is a bipolar current collector (i.e., a current collector having a principal face having a positive layer and a principal face having a negative layer). The first counter electrode layer 231 and second counter electrode layer 232 are positive active material layers. The counter electrode material is a positive active material. The third electroconductive portion 113 is a positive current collector.

Alternatively, the first electrode layer 221 and second electrode layer 222 may be positive active material layers. The electrode material in this case is a positive active material. The first electroconductive portion 111 is a positive current collector. The second electroconductive portion 112 is a bipolar current collector. The first counter electrode layer 231 and second counter electrode layer 232 are negative active material layers. The counter electrode material is a negative active material. The third electroconductive portion 113 is a negative current collector.

Known positive active materials (e.g., lithium cobalt oxide, lithium oxonitrate (LiNO), etc.) may be used as positive active material included in the positive active material layers. Various materials capable of ion detachment and insertion such as lithium (Li) and magnesium (Mg) may be used as ingredients of the positive active material.

Known solid electrolytes (e.g., inorganic solid electrolytes, etc.) may be used as materials included in the positive active material layers. Sulfide solid electrolytes, oxide solid electrolytes, or the like, may be used as an inorganic solid electrolyte. As an example of a sulfide solid electrolyte, a mixture of lithium sulfide and phosphorus pentasulfide ($Li_2S:P_2S_5$) may be used. The surface of the positive active material may be coated with a solid electrolyte. Conductors (e.g., acetylene black, etc.), adhesive binders (e.g., polyvinylidene difluoride, etc.) may be used as materials included in the positive active material layers.

A positive active material layer may be fabricated by a paste-like coating agent, in which these materials included in the positive active material layers have been kneaded with a solvent, being coated upon the face of a positive current collector, and dried. Pressing may be performed after drying, in order to improve the density of the positive active material layer. The thickness of the positive active material layer fabricated in this way is 5 to 300 μm, for example.

Metal foil (e.g., SUS foil or Al foil) or the like may be used as the positive current collector.

Known negative active materials (e.g., graphite, etc.) may be used as negative active material included in the negative active material layers. Various materials capable of ion detachment and insertion such as lithium (Li) and magnesium (Mg) may be used as ingredients of the positive active material.

Known solid electrolytes (e.g., inorganic solid electrolytes, etc.) may be used as materials included in the negative active material layers. Sulfide solid electrolytes, oxide solid electrolytes, or the like, may be used as an inorganic solid electrolyte. As an example of a sulfide solid electrolyte, a mixture of $Li_2S:P_2S_5$ may be used. Conductors (e.g., acetylene black, etc.), adhesive binders (e.g., polyvinylidene difluoride, etc.) may be used as materials included in the negative active material layers.

A negative active material layer may be fabricated by a paste-like coating agent, in which these materials included in the negative active material layers have been kneaded with a solvent, being coated upon the face of a negative current collector, and dried. Pressing of the negative polarity plate may be performed in order to improve the density of the negative active material layer. The thickness of the negative active material layer fabricated in this way is 5 to 300 μm, for example.

Metal foil (e.g., SUS foil or Cu foil) or the like may be used as the negative current collector.

The range of formation of the positive active material layers and the negative active material layers may be the same. Alternatively, the range of formation of the negative active material layers may be larger than the range of formation of the positive active material layers. According to this, deterioration in reliability of the battery due to lithium deposition (or magnesium deposition), for example, can be prevented.

Known solid electrolytes (e.g., inorganic solid electrolytes, etc.) may be used as materials included in the solid electrolyte layers. Sulfide solid electrolytes, oxide solid electrolytes, or the like, may be used as an inorganic solid electrolyte. As an example of a sulfide solid electrolyte, a mixture of $Li_2S:P_2S_5$ may be used.

Adhesive binders (e.g., polyvinylidene difluoride, etc.) may be used as materials included in the solid electrolyte layers.

A solid electrolyte layer may be fabricated by a paste-like coating agent, in which these included materials have been kneaded with a solvent, being coated upon the face of a positive current collector or negative current collector, and dried.

The first insulating portion 121 and second insulating portion 122 are members formed of insulating material (i.e., material having no electroconductivity or sufficiently low electroconductivity). Examples of the material of the first insulating portion 121 and second insulating portion 122 include resin or the like. The first insulating portion 121 and second insulating portion 122 may be resin films (or meshes). The thickness of the first insulating portion 121 and second insulating portion 122 may be 5 to 100 µm, for example.

The first insulating portion 121 is linked to the first electroconductive portion 111 and second electroconductive portion 112. That is to say, one end of the first insulating portion 121 is connected (e.g., bonded) to the first electroconductive portion 111 (e.g., an end of the first electroconductive portion 111). Another end of the first insulating portion 121 is connected (e.g., bonded) to the first edge region 141 that is an end of the second electroconductive portion 112.

The first current collector 101 may be fabricated by the first electroconductive portion 111, second electroconductive portion 112, third electroconductive portion 113, first insulating portion 121, and second insulating portion 122, that have each been individually prepared, being combined (i.e., connected to each other.)

Figure 2:
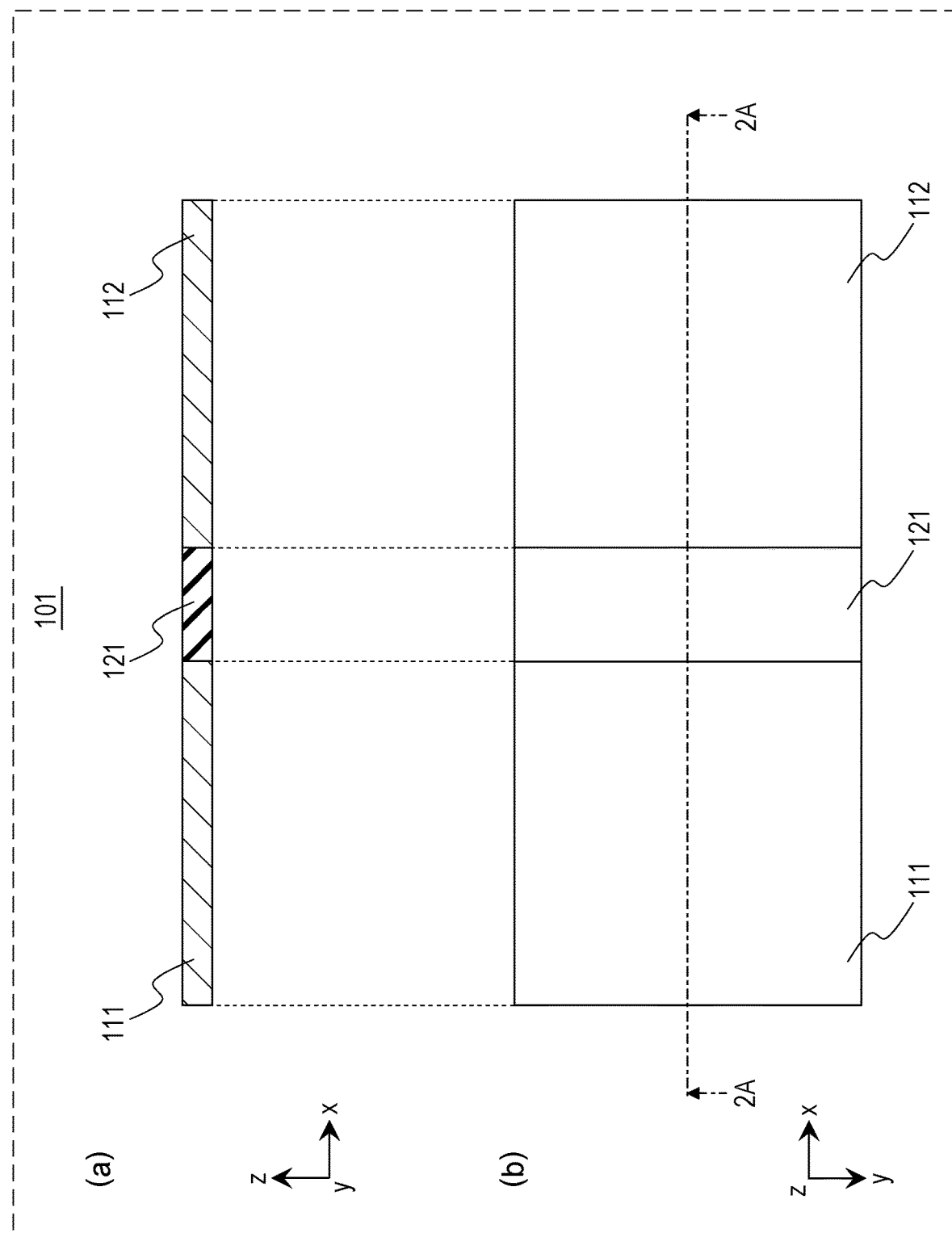
FIG. 2 is a diagram illustrating a schematic configuration of an example of a first current collector.

FIG. 2 is a diagram illustrating a schematic configuration of an example of the first current collector 101.

Indicated by (a) FIG. 2 is an x-z view (cross-sectional view taken along 2A in FIG. 2) illustrating a schematic configuration of an example of the first current collector 101.

Indicated by (b) in FIG. 2 is an x-y view (plan view) illustrating a schematic configuration of an example of the first current collector 101.

At least one (or both) of the first electroconductive portion 111 and the second electroconductive portion 112 may be connected to the first insulating portion 121 by abutting, as illustrated in FIG. 2. That is to say, the side faces of the first electroconductive portion 111 and first insulating portion 121 may be connected (e.g., bonded) to the first insulating portion 121.

According to this configuration, steps on the first current collector 101 can be reduced in size. Accordingly, the form after winding up when manufacturing the battery can be improved, for example. Thus, a battery with higher energy density can be realized.

Figure 3:
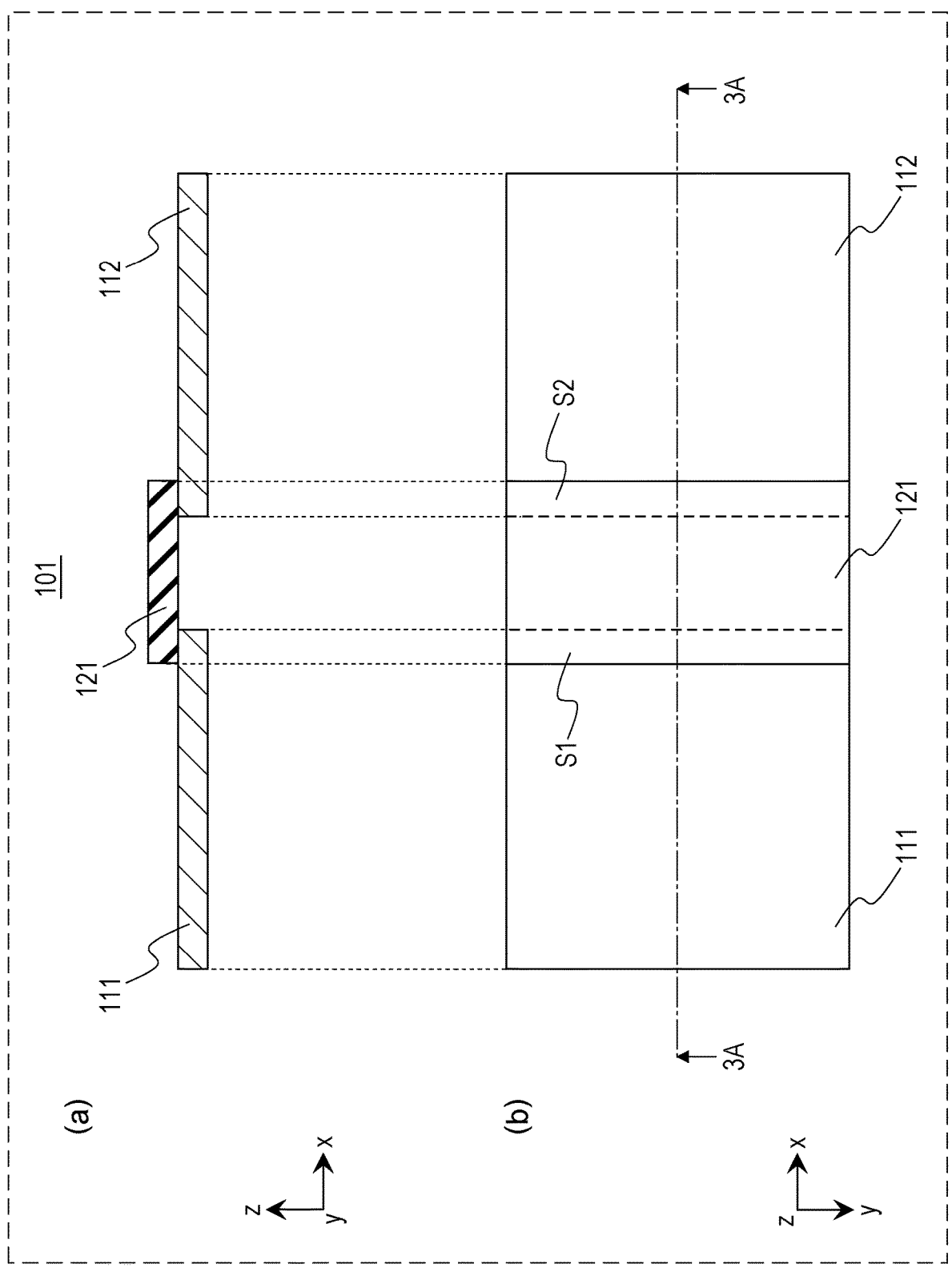
FIG. 3 is a diagram illustrating a schematic configuration of an example of the first current collector.

FIG. 3 is a diagram illustrating a schematic configuration of an example of the first current collector 101.

Indicated by (a) in FIG. 3 is an x-z view (cross-sectional view taken along 3A in FIG. 3) illustrating a schematic configuration of an example of the first current collector 101.

Indicated by (b) in FIG. 3 is an x-y view (plan view) illustrating a schematic configuration of an example of the first current collector 101.

At least one (or both) of the edge portion S1 of the first electroconductive portion 111 and the edge portion S2 of the second electroconductive portion 112 may be connected to the first insulating portion 121 by overlapping, as illustrated in (b) in FIG. 3.

According to this configuration, the bonding area can be increased. Thus, the bonding strength can be improved.

Figure 4:
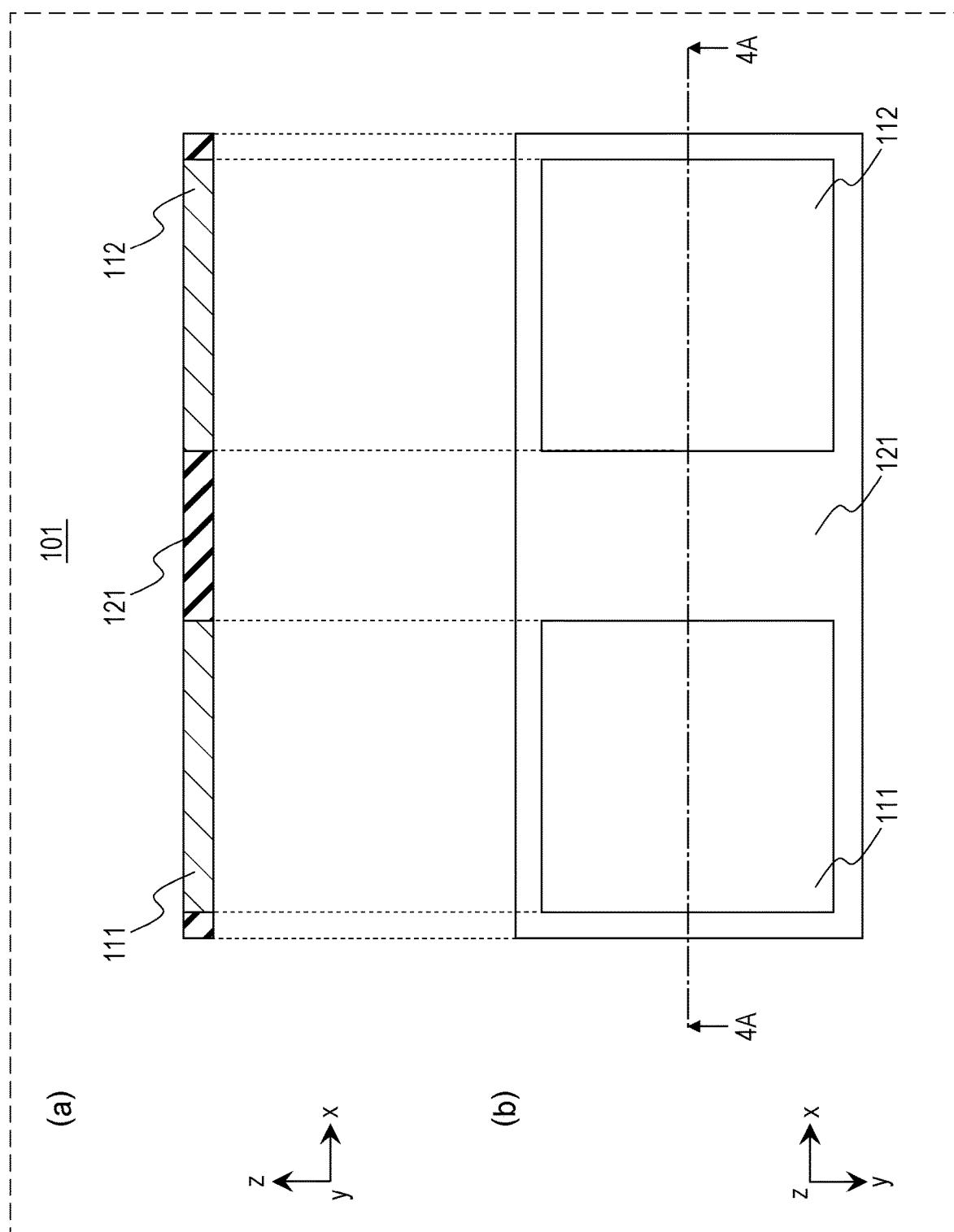
FIG. 4 is a diagram illustrating a schematic configuration of an example of the first current collector.

FIG. 4 is a diagram illustrating a schematic configuration of an example of the first current collector 101.

Indicated by (a) in FIG. 4 is an x-z view (cross-sectional view taken along 4A in FIG. 4) illustrating a schematic configuration of an example of the first current collector 101.

Indicated by (b) in FIG. 4 is an x-y view (plan view) illustrating a schematic configuration of an example of the first current collector 101.

At least one (or both) of the ends of the first electroconductive portion 111 and second electroconductive portion 112 may be connected to the first insulating portion 121 by fitting, as illustrated in FIG. 4. That is to say, the first electroconductive portion 111 and first insulating portion 121 may be embedded into opening portions formed in the first insulating portion 121. The first electroconductive portion 111 and second electroconductive portion 112 may thus be fixed to the opening portions of the first insulating portion 121.

According to this configuration, steps on the first current collector 101 can be reduced in size. Accordingly, the form after winding up when manufacturing the battery can be improved, for example. Thus, a battery with higher energy density can be realized. Further, the first insulating portion 121 can be continuously formed over the entirety of the first current collector 101. Thus, the tensile strength of the first current collector 101 can be improved.

The second insulating portion 122 is linked to the second electroconductive portion 112 and third electroconductive portion 113. That is to say, one end of the second insulating portion 122 is connected (e.g., bonded) to the second edge region 142 that is an end of the second electroconductive portion 112. Further, another end of the second insulating portion 122 is connected (e.g., bonded) to the third electroconductive portion 113 (e.g., to an end of the third electroconductive portion 113).

Note that the method of connecting at least one (or both) of the second electroconductive portion 112 and the third electroconductive portion 113 to the second insulating portion 122 may be different from the method of connecting at least one (or both) of the first electroconductive portion 111 and second electroconductive portion 112 to the first insulating portion 121, or may be the same.

Note that the second edge region 142 of the second electroconductive portion 112 (i.e., in a case where the second electroconductive portion 112 is rectangular, one side of the rectangle) to which the second insulating portion 122 is connected may be an edge situated facing the first edge region 141 of the second electroconductive portion 112 to which the first insulating portion 121 is connected (an edge facing in a direction parallel with the first edge region 141). Alternatively, the second edge region 142 of the second electroconductive portion 112 to which the second insulating portion 122 is connected may be an edge not situated facing the first edge region 141 of the second electroconductive portion 112 to which the first insulating portion 121 is connected (an edge facing in a direction orthogonal to the first edge region 141).

Note that the first insulating portion 121 and second insulating portion 122 may be portions formed by a part (electroconductive part) of the first current collector 101 being made non-electroconductive (e.g., electroconductivity being sufficiently reduced) by chemical processing (oxidization, etc.).

Figure 5:
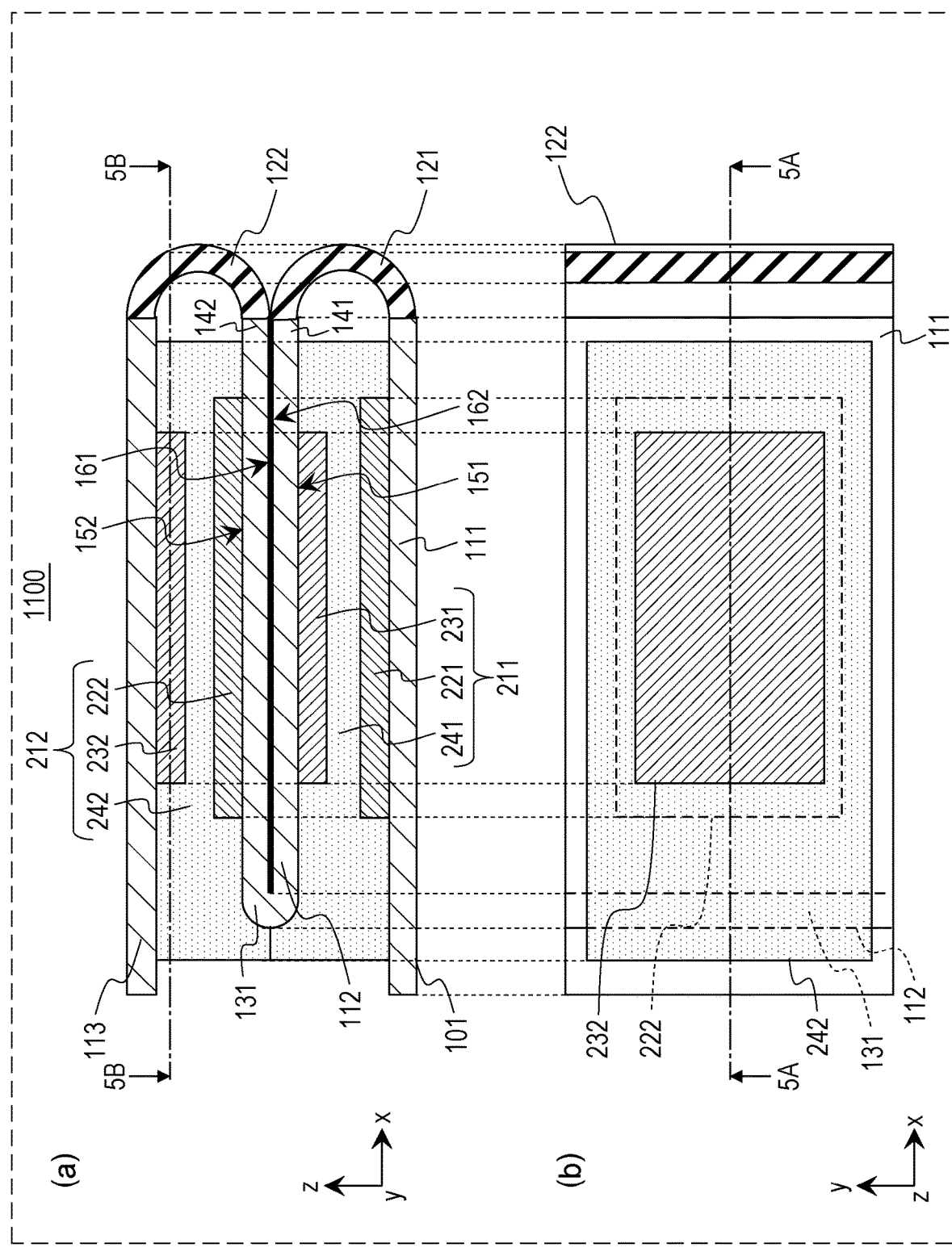
FIG. 5 is a diagram illustrating a schematic configuration of a battery according to the first embodiment.

FIG. 5 is a diagram illustrating a schematic configuration of a battery 1100 according to the first embodiment.

Indicated by (a) in FIG. 5 is an x-z view (cross-sectional view taken along 5A in FIG. 5) illustrating a schematic configuration of an example of the battery 1100 according to the first embodiment.

Indicated by (b) in FIG. 5 is an x-y view (cross-sectional view taken along 5B in FIG. 5) illustrating a schematic configuration of an example of the battery 1100 according to the first embodiment.

The battery 1100 according to the first embodiment further has, in addition to the configuration of the above-described battery 1000 according to the first embodiment, the following configuration.

That is, the first fold portion 131 of the battery 1100 according to the first embodiment is covered by at least one of the first solid electrolyte layer 241 and second solid electrolyte layer 242.

According to the above configuration, the first fold portion 131 can be prevented from being exposed. Accordingly, the first solid electrolyte layer 241 or second solid electrolyte layer 242 can prevent, for example, another current collector adjacent to the second electroconductive portion 112 (e.g., the first electroconductive portion 111 or third electroconductive portion 113) and the second electroconductive portion 112 from coming into contact with each other at the first fold portion 131. Accordingly, the probability of another current collector adjacent to the second electroconductive portion 112 (e.g., the first electroconductive portion 111 or third electroconductive portion 113) and the second electroconductive portion 112 short-circuiting can be reduced. Thus, the reliability of the battery can be improved.

For example, the first fold portion 131 may be covered by both of the first solid electrolyte layer 241 and second solid electrolyte layer 242, as illustrated in FIG. 5. More specifically, part of the first fold portion 131 (i.e., the part adjacent to the first front face region 151) may be covered by the first solid electrolyte layer 241. Further, part of the first fold portion 131 (i.e., the part adjacent to the second front face region 152) may be covered by the second solid electrolyte layer 242.

Note that in the first embodiment, the first fold portion 131 may be covered by the first solid electrolyte layer 241 alone. Alternatively, the first fold portion 131 may be covered by the second solid electrolyte layer 242 alone.

The first rear face region 161 and second rear face region 162 may be in contact with each other, as illustrated in FIGS. 1 and 5.

According to the above configuration, the first rear face region 161 and second rear face region 162 that are in contact with each other can conduct electricity. Thus, electron mobility is realized at the first fold portion 131, and also electron mobility is realized between the first rear face region 161 and second rear face region 162 that are in contact with each other, while increasing the bonding strength between the component materials of the battery by the first fold portion 131.

Note that the entire faces of the first rear face region 161 and second rear face region 162 may be in contact with each other, as illustrated in FIGS. 1 and 5. Alternatively, part of the first rear face region 161 and second rear face region 162 may be in contact with each other. Alternatively, the first rear face region 161 and second rear face region 162 do not have to be in contact with each other. In this case, a separate member may be disposed between the first rear face region 161 and second rear face region 162.

Figure 6:
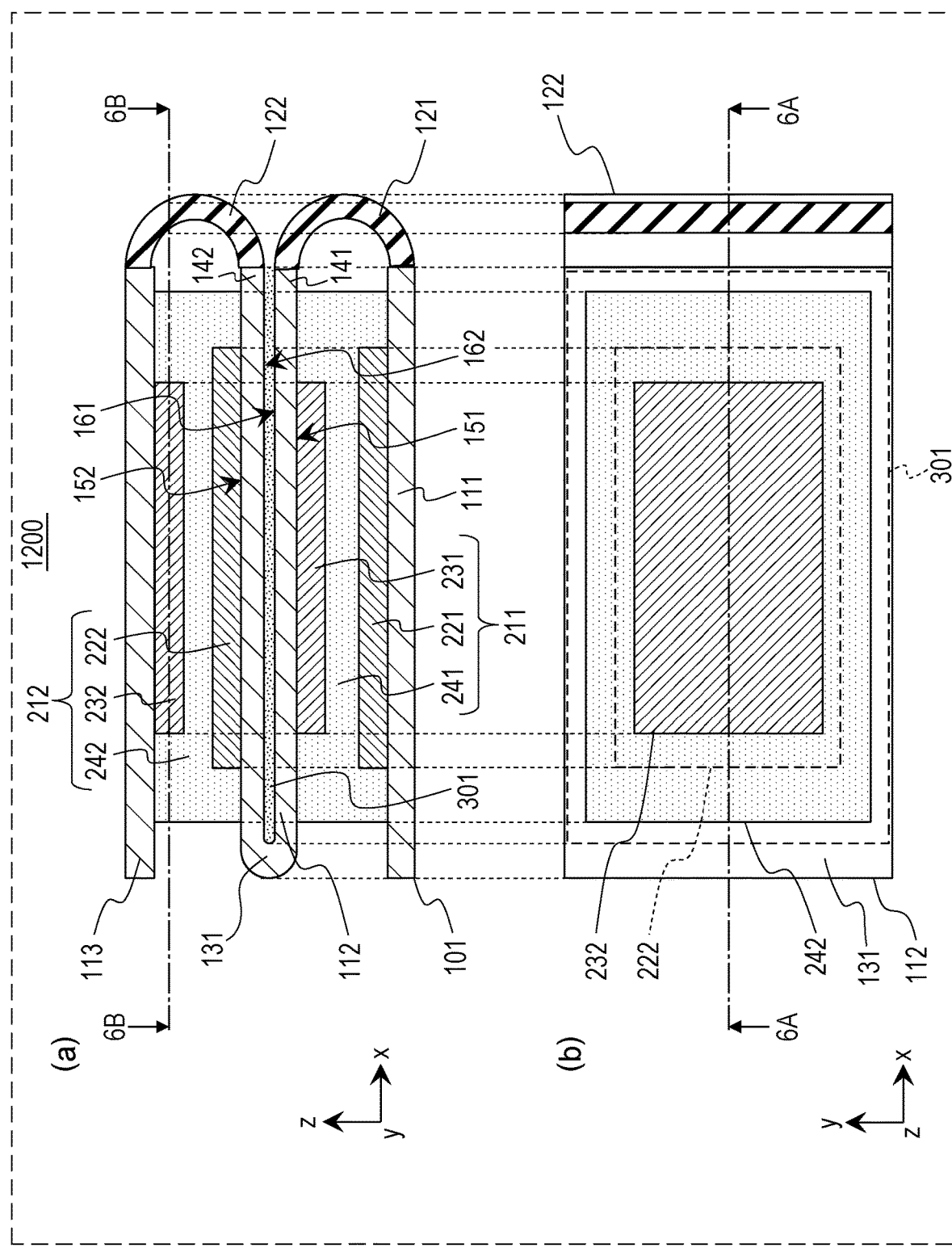
FIG. 6 is a diagram illustrating a schematic configuration of a battery according to the first embodiment.

FIG. 6 is a diagram illustrating a schematic configuration of a battery 1200 according to the first embodiment.

Indicated by (a) in FIG. 6 is an x-z view (cross-sectional view taken along 6A in FIG. 6) illustrating a schematic configuration of an example of the battery 1200 according to the first embodiment.

Indicated by (b) in FIG. 6 is an x-y view (cross-sectional view taken along 6B in FIG. 6) illustrating a schematic configuration of an example of the battery 1200 according to the first embodiment.

The battery 1200 according to the first embodiment further has, in addition to the configuration of the above-described battery 1000 according to the first embodiment, the following configuration.

That is to say, the battery 1200 according to the first embodiment further includes a first adhesion portion 301.

The first adhesion portion 301 is a member that adheres the first rear face region 161 and second rear face region 162 to each other.

The first adhesion portion 301 is disposed between the first rear face region 161 and the second rear face region 162.

According to the above configuration, the bonding strength among the component members of the battery can be further strengthened. That is to say, the positional relationship between the first counter electrode layer 231 disposed on the first front face region 151 and the second electrode layer 222 disposed on the second front face region 152 can be more strongly maintained by the first adhesion portion 301, in addition to the first fold portion 131. Accordingly, the layers (or cells) making up the battery can be prevented from exhibiting positional shifting or separation due to shock, vibration, and so forth, when manufacturing the battery or using the battery, for example. Thus, reliability of the battery can be improved.

Note that the first adhesion portion 301 may include an electroconductive adhesive agent.

According to the above configuration, the first adhesion portion 301 can have electroconductivity. That is to say, the first adhesion portion 301 can conduct electricity. Accordingly, the first front face region 151 on which the first counter electrode layer 231 is disposed and the second front face region 152 on which the second electrode layer 222 is disposed can be connected with low resistance by the first adhesion portion 301, in addition to the first fold portion 131. That is to say, the contact resistance between the first front face region 151 and the second front face region 152 can be reduced. Accordingly, even in a case where the battery is operated under a large current, generation of heat due to contact resistance between the first front face region 151 and second front face region 152 can be made less easy to occur, for example.

Note that the first adhesion portion 301 may be disposed on the entire region where the first rear face region 161 and the second rear face region 162 face each other, as illustrated in FIG. 6. In this case, the first adhesion portion 301 may be formed as a uniformly continuous film.

Alternatively, the first adhesion portion 301 may be disposed at a part of the region where the first rear face region 161 and second rear face region 162 face each other. The first adhesion portion 301 may be formed divided into multiple island forms at this time. The first rear face region 161 and second rear face region 162 may be in contact with each other at positions where the first adhesion portion 301, formed as multiple island forms, is not disposed.

Commonly known adhesive agent may be used for the adhesive material included in the first adhesion portion 301. Examples of the adhesive material include electroconductive adhesive agents such as soft-silicone electroconductive adhesive agents (e.g., TB 3303G, TB 3333C, etc., manufactured by Three Bond Co., Ltd.), silver-epoxy based electroconductive adhesive agents (e.g., XA-874, XA-910, etc., manufactured by Fujikura Kasei Co., Ltd.), and so forth.

Figure 7:
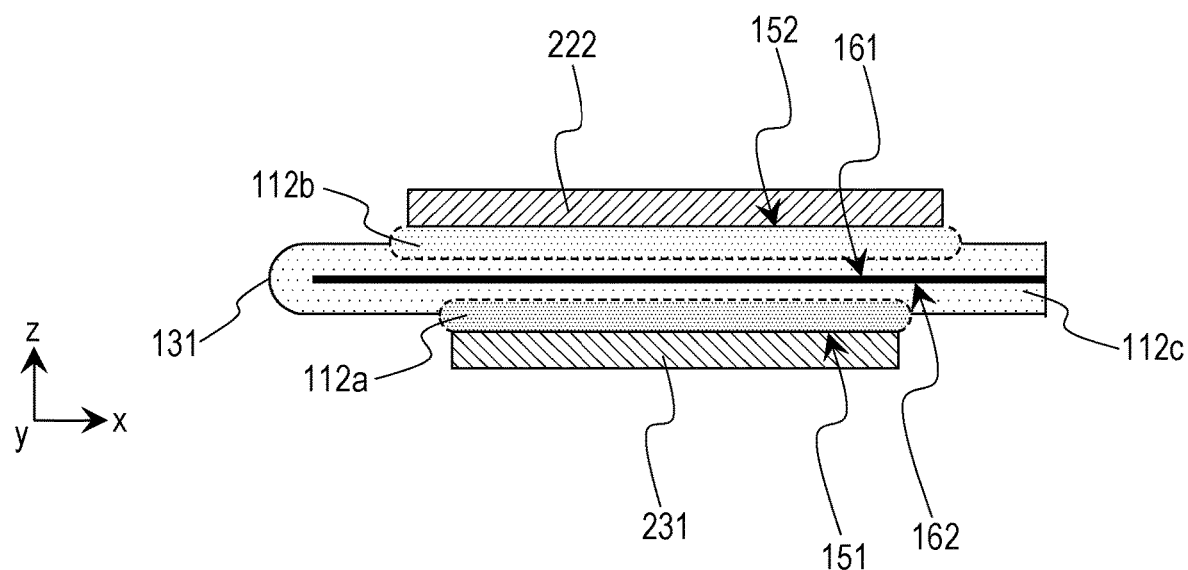
FIG. 7 is a cross-sectional diagram illustrating a schematic configuration of an example of a second conducting unit according to the first embodiment.

FIG. 7 is a cross-sectional diagram illustrating a schematic configuration of an example of the second electroconductive portion 112 according to the first embodiment.

The second electroconductive portion 112 illustrated in FIG. 7 includes a material 112a in the first front face region 151.

The second electroconductive portion 112 illustrated in FIG. 7 also includes a material 112b in the second front face region 152. The material 112b here is a different material from the material 112a.

The second electroconductive portion 112 illustrated in FIG. 7 also includes a material 112c in a region including the first rear face region 161, second rear face region 162, and first fold portion 131. The material 112c here is a different material from the material 112a and the material 112b.

Figure 8:
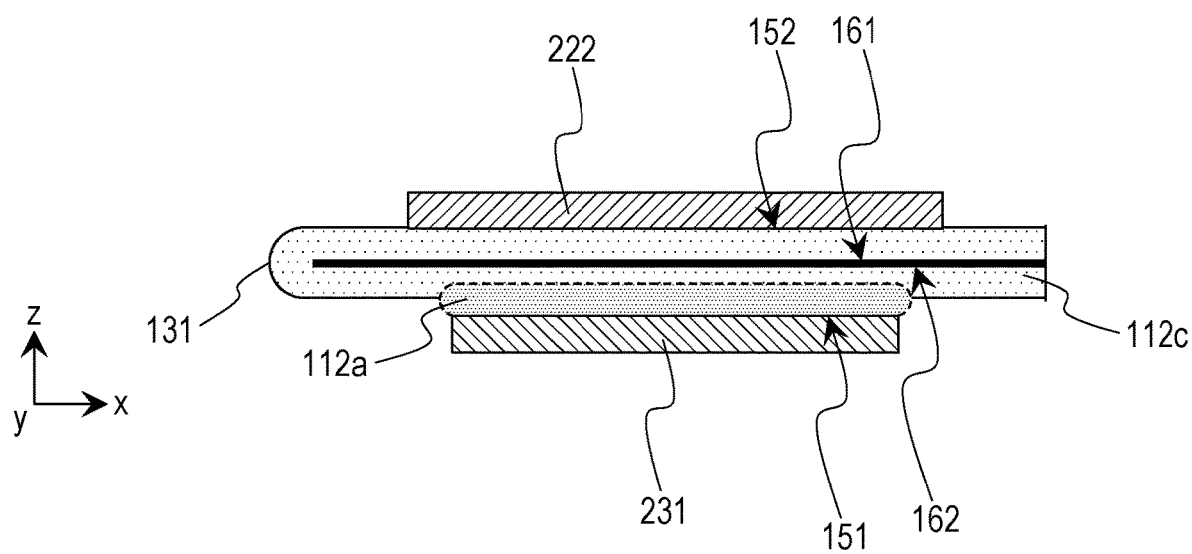
FIG. 8 is a cross-sectional diagram illustrating a schematic configuration of an example of the second conducting unit according to the first embodiment.

FIG. 8 is a cross-sectional diagram illustrating a schematic configuration of an example of the second electroconductive portion 112 according to the first embodiment.

The second electroconductive portion 112 illustrated in FIG. 8 includes the material 112a in the first front face region 151.

The second electroconductive portion 112 illustrated in FIG. 8 also includes the material 112c in the region including the second front face region 152, first rear face region 161, second rear face region 162, and first fold portion 131. The material 112c here is a different material from the material 112a.

Figure 9:
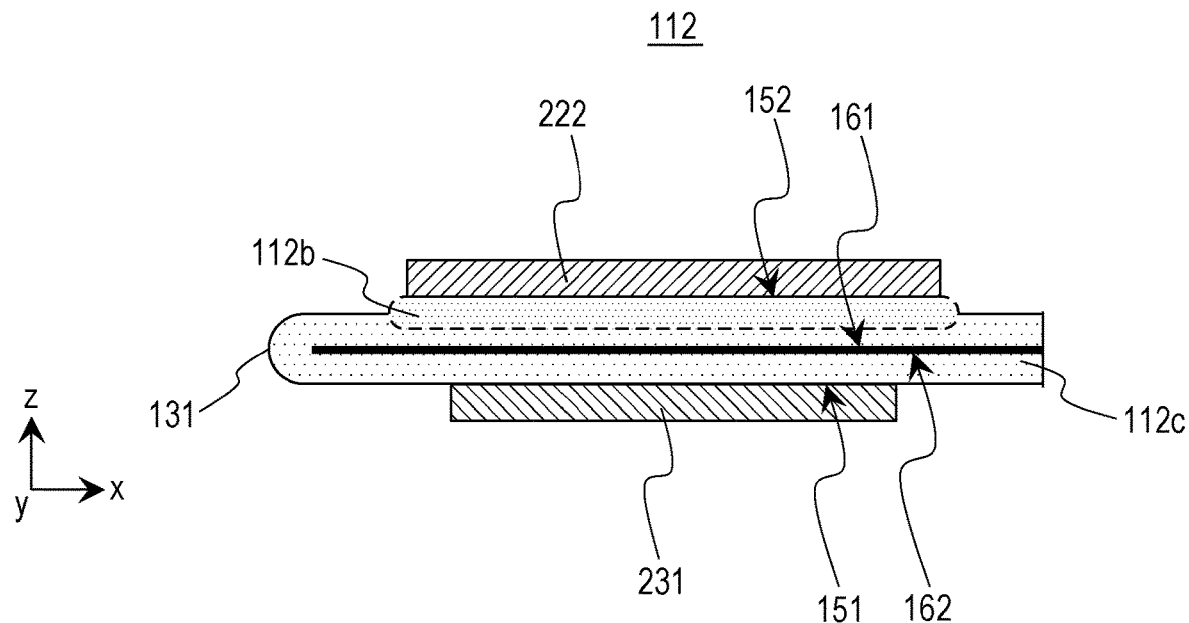
FIG. 9 is a cross-sectional diagram illustrating a schematic configuration of an example of the second conducting unit according to the first embodiment.

FIG. 9 is a cross-sectional diagram illustrating a schematic configuration of an example of the second electroconductive portion 112 according to the first embodiment.

The second electroconductive portion 112 illustrated in FIG. 9 includes the material 112b in the second front face region 152.

The second electroconductive portion 112 illustrated in FIG. 9 also includes the material 112c in the region including the first front face region 151, first rear face region 161, second rear face region 162, and first fold portion 131. The material 112c here is a different material from the material 112b.

Figure 10:
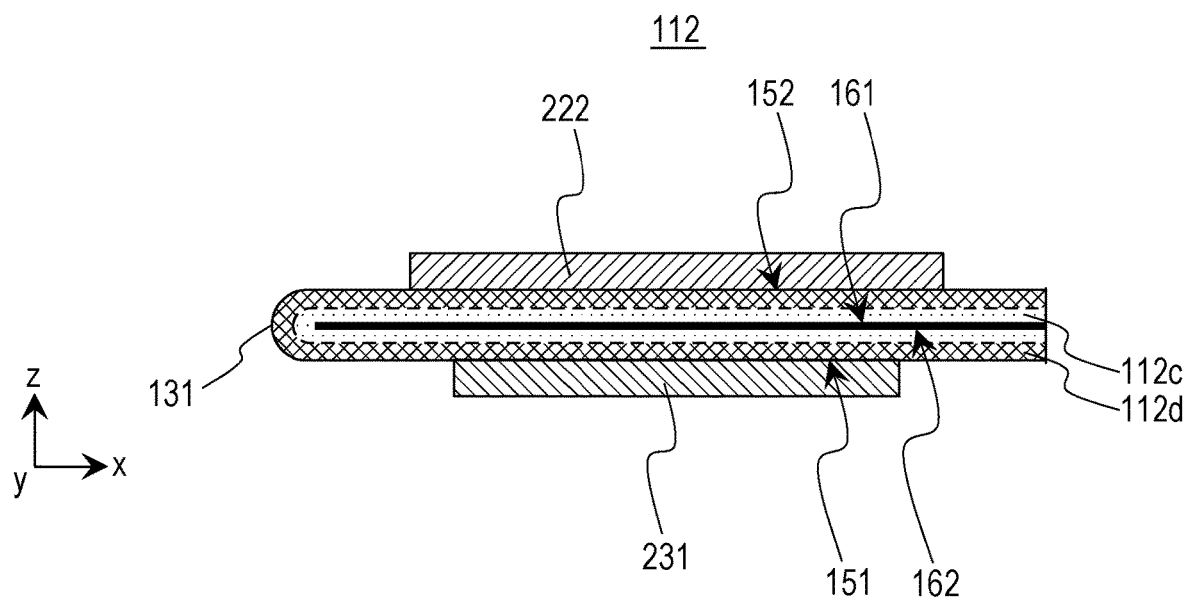
FIG. 10 is a cross-sectional diagram illustrating a schematic configuration of an example of the second conducting unit according to the first embodiment.

FIG. 10 is a cross-sectional diagram illustrating a schematic configuration of an example of the second electroconductive portion 112 according to the first embodiment.

The second electroconductive portion 112 illustrated in FIG. 10 includes the material 112c in a region including part of the first rear face region 161, second rear face region 162, and first fold portion 131 (e.g., a region on the inner side of the folded structure).

The second electroconductive portion 112 illustrated in FIG. 10 also includes a material 112d in a region including part of the first front face region 151, second front face region 152, and first fold portion 131 (e.g., a region on the outer side of the folded structure). The material 112d here is a different material from the material 112c.

Note that in the first embodiment, the first front face region 151 may include a first material. For example, the first front face region 151 may be formed of the first material or include the first material as the primary component thereof.

Also, the second front face region 152 may include a second material. For example, the second front face region 152 may be formed of the second material or include the second material as the primary component thereof.

The second material here may be a material that is different from the first material, as illustrated in the examples in FIGS. 7 through 9.

According to the above configuration, a material suitable for electric connection to the first counter electrode layer 231 can be used as the first material. At the same time, a material suitable for electric connection to the second electrode layer 222 can be used as the second material. According to these, the electrical connection between the first front face region 151 and first counter electrode layer 231 and the electrical connection between the second front face region 152 and second electrode layer 222 can be improved, while increasing bonding strength between the component materials of the battery by the first fold portion 131.

Note that in the example illustrated in FIG. 7, the first material is material 112a and the second material is material 112b.

Also, in the example illustrated in FIG. 8, the first material is material 112a and the second material is material 112c.

Further, in the example illustrated in FIG. 9, the first material is material 112c and the second material is material 112b.

In the first embodiment, the first rear face region 161 and second rear face region 162 may include a third material, as illustrated in FIGS. 7 through 10. For example, the first rear face region 161 and second rear face region 162 may be formed of the third material or include the third material as the primary component thereof. That is to say, the first rear face region 161 and second rear face region 162 may include the same material 112c.

According to the configuration described above, reliability of connection among power-generating elements can be improved while increasing bonding strength between the component materials of the battery by the first fold portion 131. That is to say, occurrence of trouble between the first rear face region 161 and second rear face region 162 can be reduced by a configuration where the first rear face region 161 and second rear face region 162 are of the same third material. More specifically, even in a case where environmental gas (e.g., gas component remaining in or invading into the containing the laminated member of the first power-generating element 211 and second power-generating element 212) enters into a minute gap region between the first rear face region 161 and second rear face region 162, there is no different in miniature potential different or ionization rate between the first rear face region 161 and second rear face region 162, due to being formed of the same third material. Accordingly, even if used for a long period of time for example, trouble such as the corrosion phenomenon does not occur between the first rear face region 161 and second rear face region 162.

Note that in the first embodiment, the first material may be a different material from the third material, as illustrated in the examples in FIGS. 7, 8, and 10.

According to the configuration described above, a material suitable for electrical connection to the first counter electrode layer 231 can be used as the first material. Thus, the first rear face region 161 and second rear face region 162 can be formed of the third material, while increasing bonding strength between the component materials of the battery by the first fold portion 131, and while obtaining good electrical connection between the first front face region 151 and the first counter electrode layer 231 by using the first material.

Also, a minute gap region does not form between the first front face region 151 and the first rear face region 161 (e.g., the first front face region 151 and first rear face region 161 are in tight contact), due to integrally forming the first front face region 151 and first rear face region 161 as a single member (i.e., the first current collector 101). Accordingly, invasion of environmental gas between the first front face region 151 and first rear face region 161 can be prevented.

Thus, trouble such as the corrosion phenomenon does not occur between the first front face region 151 and first rear face region 161 that are formed of different materials from each other, as well.

Note that in the example illustrated in FIG. 7, the first material is material 112a and the third material is material 112c.

Also, in the example illustrated in FIG. 8, the first material is material 112a and the third material is material 112c.

Further, in the example illustrated in FIG. 10, the first material is material 112d and the third material is material 112c.

Moreover, in the first embodiment, the second material may be a different material form the third material, as illustrated in the examples in FIGS. 7, 9, and 10.

According to the configuration described above, a material suitable for electrical connection to the second electrode layer 222 can be used as the second material. Thus, the first rear face region 161 and second rear face region 162 can be formed of the third material, while increasing bonding strength between the component materials of the battery by the first fold portion 131, and while obtaining good electrical connection between the second front face region 152 and the second electrode layer 222 by using the second material.

Also, a minute gap region does not form between the second front face region 152 and the second rear face region 162 (e.g., the second front face region 152 and second rear face region 162 are in tight contact), due to integrally forming the second front face region 152 and second rear face region 162 as a single member (i.e., the first current collector 101). Accordingly, invasion of environmental gas between the second front face region 152 and second rear face region 162 can be prevented. Thus, trouble such as the corrosion phenomenon does not occur between the second front face region 152 and second rear face region 162 that are formed of different materials from each other, as well.

Note that in the example illustrated in FIG. 7, the second material is material 112b and the third material is material 112c.

Also, in the example illustrated in FIG. 9, the second material is material 112b and the third material is material 112c.

Further, in the example illustrated in FIG. 10, the second material is material 112d and the third material is material 112c.

In a case where the first counter electrode layer 231 is a positive active material layer (i.e., in a case where the counter electrode material is positive active material), SUS, Al, and so forth, may be used as the first material included in the first front face region 151.

Also, in a case where the first counter electrode layer 231 is a negative active material layer (i.e., in a case where the counter electrode material is negative active material), SUS, Cu, and so forth, may be used as the first material included in the first front face region 151.

In a case where the second electrode layer 222 is a positive active material layer (i.e., in a case where the electrode material is positive active material), SUS, Al, and so forth, may be used as the second material included in the second front face region 152.

In a case where the second electrode layer 222 is a negative active material layer (i.e., in a case where the electrode material is negative active material), SUS, Cu, and so forth, may be used as the second material included in the second front face region 152.

Al, Cu, platinum (Pt), nickel (Ni), and alloys thereof, may be used as the third material included in the first rear face region 161 and second rear face region 162. Using Pt, Ni, and alloys thereof, as the third material, enables anti-corrosion nature to be improved. Alternatively, the third material may be a material that has high chemical resistance to environmental gas that may exist around the power-generating elements in minute amounts (e.g., hydrogen sulfide ($H_2S$) gas). Examples of the third material may include tantalum, gold, Inconel, alloys thereof, and so forth.

Note that in the first embodiment, the expression, "a predetermined region includes a predetermined material as a primary component" means that, for example, "a predetermined region includes 50% by weight or more of a predetermined material as to the entirety of the predetermined region".

Figure 11:
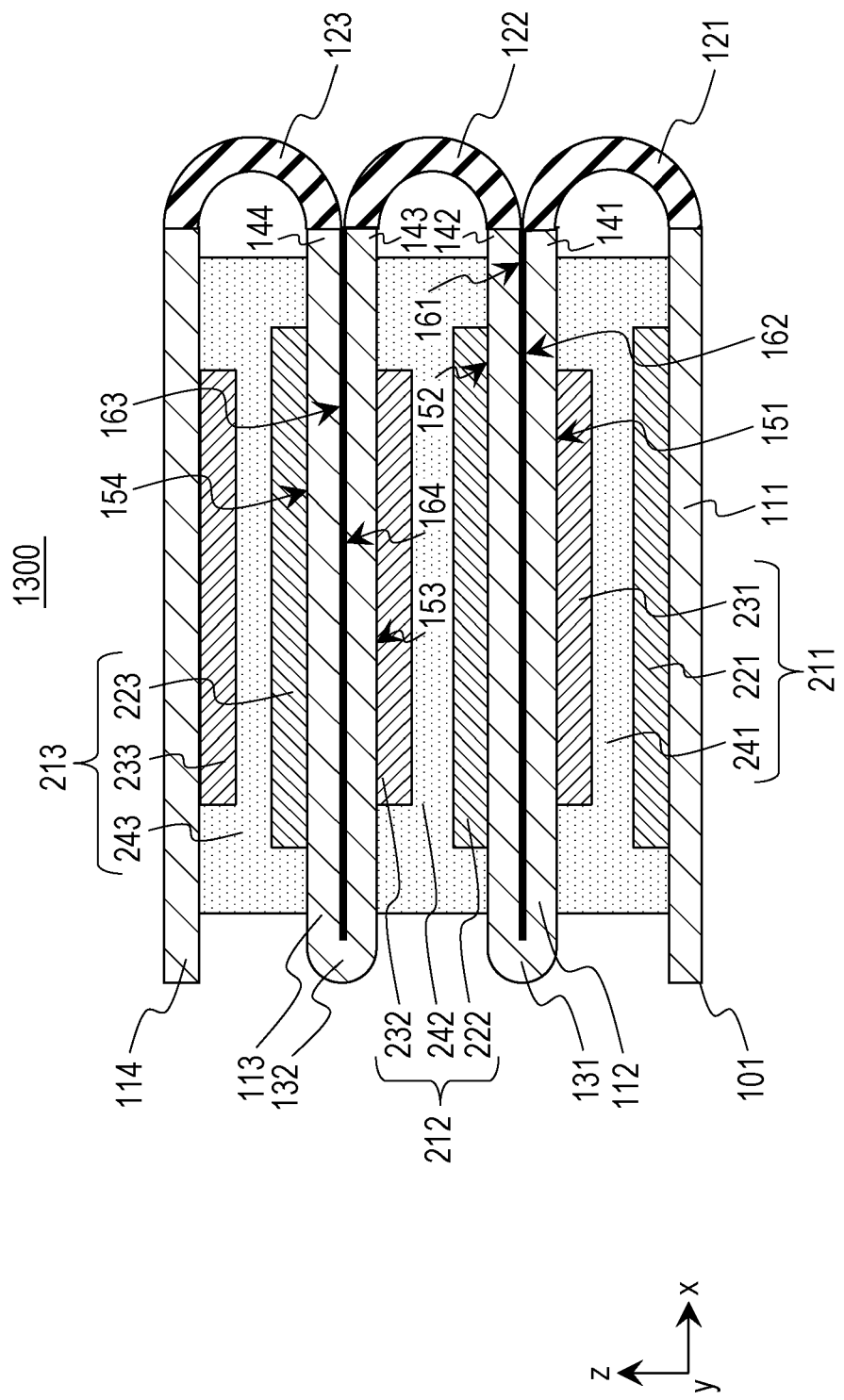
FIG. 11 is a cross-sectional diagram illustrating a schematic configuration of a battery according to the first embodiment.

FIG. 11 is a cross-sectional diagram illustrating a schematic configuration of a battery 1300 according to the first embodiment.

The battery 1300 according to the first embodiment has the following configuration in addition to the configuration of the above-described battery 1000 according to the first embodiment.

That is to say, the battery 1300 according to the first embodiment further includes a third electrode layer 223 and a third counter electrode layer 233.

The third counter electrode layer 233 is a counter electrode of the first electrode layer 221, second electrode layer 222, and third electrode layer 223.

The first current collector 101 includes a third insulating portion 123 and a fourth electroconductive portion 114.

The third electroconductive portion 113 includes a third edge region 143, a third front face region 153, a third rear face region 163, a second fold portion 132, a fourth front face region 154, a fourth rear face region 164, and a fourth edge region 144.

The third front face region 153 is a region situated between the third edge region 143 and the second fold portion 132.

The third rear face region 163 is a region situated on the rear face of the third front face region 153.

The fourth front face region 154 is a region situated between the fourth edge region 144 and the second fold portion 132.

The fourth rear face region 164 is a region situated on the rear face of the fourth front face region 154.

The first current collector 101 is folded at the second fold portion 132, whereby the third rear face region 163 and fourth rear face region 164 are positioned facing each other.

The second counter electrode layer 232 is disposed in contact with the third front face region 153.

The third electrode layer 223 is disposed in contact with the fourth front face region 154.

The third counter electrode layer 233 is disposed in contact with the fourth electroconductive portion 114.

The second insulating portion 122 is a member linking the second edge region 142 and third edge region 143.

The third insulating portion 123 is a member linking the fourth edge region 144 and the fourth electroconductive portion 114.

The first current collector 101 is folded at the third insulating portion 123, whereby the third electrode layer 223 and third counter electrode layer 233 are positioned facing each other.

According to the above configuration, the bonding strength among component members of the battery can be further improved. That is to say, the third electrode layer 223 and third counter electrode layer 233 can be respectively disposed at the third electroconductive portion 113 and fourth electroconductive portion 114 that are linked with each other by the third insulating portion 123. Accordingly, the positional relationship between the third electrode layer 223 disposed on the third electroconductive portion 113 and the third counter electrode layer 233 disposed on the fourth electroconductive portion 114 can be strongly maintained by the third insulating portion 123 (in other words, by the first current collector 101 that is one component). Accordingly, the layers (or cells) making up the battery can be prevented from exhibiting positional shifting or separation due to shock, vibration, and so forth, when manufacturing the battery or using the battery, for example. That is to say, the strength of bonding of the layers (e.g., the third electrode layer 223 and third counter electrode layer 233) making up the battery can be improved by the first current collector 101. Thus, reliability of the battery can be improved.

Also, according to the above configuration, the second counter electrode layer 232 and third electrode layer 223 can be respectively disposed on the third front face region 153 and fourth front face region 154 (i.e., two regions that are partial regions of the first current collector 101 and that are linked by the second fold portion 132). Accordingly, the positional relationship between the second counter electrode layer 232 disposed on the third front face region 153 and the third electrode layer 223 disposed on the fourth front face region 154 can be strongly maintained by the second fold portion 132 (in other words, by the first current collector 101 that is one component). Accordingly, in a case where the laminated battery is configured using the first current collector 101, two battery cells (cells) making up the battery can be linked with each other by the first current collector 101.

Also, according to the above configuration, the third front face region 153 on which the second counter electrode layer 232 is disposed and the fourth front face region 154 on which the third electrode layer 223 is disposed can be connected by the second fold portion 132 with low resistance. That is to say, the resistance between the third front face region 153 and the fourth front face region 154 can be reduced. Accordingly, even in a case where the battery is operated under a large current, generation of heat due to contact resistance between the third rear face region 163 and fourth rear face region 164 can be made less easy to occur. Accordingly, deterioration performance does not readily occur even if a thin current collector is used as the first current collector 101, for example. As a result, reduced weight of the battery can be realized.

Also, according to the above configuration, out of the side faces of the battery, the side face where the third insulating portion 123 is situated can be covered by the third insulating portion 123. Accordingly, mutual contact between members that may exist outside of the battery (e.g., another battery, etc.), and the side face of the battery where the third insulating portion 123 is situated, can be prevented by the third insulating portion 123. Thus, short-circuiting among batteries can be suppressed. Also, partial destruction of the side face of the battery by contact between the battery and members that may exist outside of the battery can be suppressed. Even if a part of components (e.g., electrode material included in the third electrode layer 223, counter electrode material included in the third counter electrode layer 233, and so forth) of the battery falls loose, the fallen component can be suppressed by the third insulating portion 123 from moving to another cell portion within the battery or to the outside of the battery, due to part of the side face of the battery being covered by the third insulating portion 123. Accordingly, short-circuiting within the battery due to fallen components of the battery can be suppressed. This enables the reliability of the battery to be further improved.

Note that the battery 1300 according to the first embodiment may further include a third solid electrolyte layer 243, as illustrated in FIG. 11.

The third solid electrolyte layer 243 is situated between the third electrode layer 223 and the third counter electrode layer 233.

According to the above configuration, one solid battery cell (third power-generating element 213) can be configured from the third electrode layer 223, third counter electrode layer 233, and third solid electrolyte layer 243. Thus, a laminated battery can be configured of the first power-generating element 211, second power-generating element 212, and third power-generating element 213 being serially connected via the first current collector 101. The second power-generating element 212 (i.e., the second electrode layer 222, second counter electrode layer 232, and second solid electrolyte layer 242) and the third power-generating element 213 (i.e., the third electrode layer 223, third counter electrode layer 233, and third solid electrolyte layer 243) can be strongly linked by the first current collector 101 at this time. Accordingly, the battery cells (second power-generating element 212 and third power-generating element 213) can be prevented from exhibiting positional shifting or separation due to shock, vibration, and so forth, when manufacturing the battery or using the battery, for example. That is to say, the strength of bonding of the battery cells (second power-generating element 212 and third power-generating element 213) can be improved by the first current collector 101. Thus, the reliability of the battery can be improved while raising the battery voltage by the serial connection of the second power-generating element 212 and third power-generating element 213.

Note that the third solid electrolyte layer 243 may be disposed in contact with the third electroconductive portion 113 and fourth electroconductive portion 114 in the battery 1300 according to the first embodiment.

According to the above configuration, the strength of bonding between components of the battery can be further improved. That is to say, the strength of bonding between the third electroconductive portion 113 and fourth electroconductive portion 114 can be improved by the third solid electrolyte layer 243. Accordingly, the third counter electrode layer 233 can be suppressed from peeling loose from the fourth electroconductive portion 114. Further, the third electrode layer 223 can be suppressed from peeling loose from the third electroconductive portion 113. Thus, the layers making up the third power-generating element 213 can be prevented from exhibiting positional shifting or separation due to shock, vibration, and so forth, when manufacturing the battery or using the battery, for example. Thus, reliability of the battery can be improved even further.

Note that the third electrode layer 223 and third counter electrode layer 233 may be formed in a narrower range than the third electroconductive portion 113 and fourth electroconductive portion 114, as illustrated in FIG. 11.

Also, the third solid electrolyte layer 243 may be disposed over a greater area than that of the third electrode layer 223 and third counter electrode layer 233. That is to say, the third solid electrolyte layer 243 may be disposed in a form covering the third electrode layer 223 and third counter electrode layer 233, as illustrated in FIG. 11. Thus, short-circuiting of the third electrode layer 223 and third counter electrode layer 233 due to direct contact can be prevented.

Also, the third solid electrolyte layer 243 may be disposed over a narrower range than the third electroconductive portion 113 and fourth electroconductive portion 114, as illustrated in FIG. 11. Alternatively, the range of formation of the third solid electrolyte layer 243 may be the same range as that of the third electroconductive portion 113 and fourth electroconductive portion 114.

The third insulating portion 123 is linked to the third electroconductive portion 113 and fourth electroconductive portion 114. That is to say, one end of the third insulating portion 123 is connected (e.g., bonded) to the fourth edge region 144 that is an end of the third electroconductive portion 113. Another end of the third insulating portion 123 is connected (e.g., bonded) to the fourth electroconductive portion 114 (e.g., an end of the fourth electroconductive portion 114).

A connection method of at least one (e.g., both) of the third electroconductive portion 113 and fourth electroconductive portion 114 to the third insulating portion 123 may be different from the connection method of at least one (e.g., both) of the second electroconductive portion 112 and third electroconductive portion 113 to the second insulating portion 122, or may be the same.

Note that the fourth edge region 144 of the third electroconductive portion 113 (i.e., in a case where the third electroconductive portion 113 is rectangular, one side of the rectangle) to which the third insulating portion 123 is connected may be an edge situated facing the third edge region 143 of the third electroconductive portion 113 to which the second insulating portion 122 is connected (an edge facing in a direction parallel with the third edge region 143), as illustrated in FIG. 11. Alternatively, the fourth edge region 144 of the third electroconductive portion 113 (i.e., in a case where the third electroconductive portion 113 is rectangular, one side of the rectangle) to which the third insulating portion 123 is connected may be an edge not situated facing the third edge region 143 of the third electroconductive portion 113 to which the second insulating portion 122 is connected (an edge facing in a direction orthogonal to the third edge region 143).

Note that the first electrode layer 221, second electrode layer 222, and third electrode layer 223 may be negative active material layers. The electrode material here is a negative active material. The first electroconductive portion 111 is a negative current collector. The second electroconductive portion 112 and third electroconductive portion 113 are bipolar current collectors. The first counter electrode layer 231, second counter electrode layer 232, and third counter electrode layer 233 are positive active material layers. The counter electrode material is a positive active material. The fourth electroconductive portion 114 is a positive current collector.

Alternatively, the first electrode layer 221, second electrode layer 222, and third electrode layer 223 may be positive active material layers. The electrode material here is a positive active material. The first electroconductive portion 111 is a positive current collector. The second electroconductive portion 112 and third electroconductive portion 113 are bipolar current collectors. The first counter electrode layer 231, second counter electrode layer 232, and third counter electrode layer 233 are negative active material layers. The counter electrode material is a negative active material. The fourth electroconductive portion 114 is a negative current collector.

Note that the fourth electroconductive portion 114 is a member having electroconductivity. The configurations of the first electroconductive portion 111, second electroconductive portion 112, third electroconductive portion 113, and fourth electroconductive portion 114 (e.g., thicknesses, area, shape, materials included, etc.) may be the same as each other, or may be different.

A second adhesion portion may be disposed on the third electroconductive portion 113, in the same way as with the second electroconductive portion 112. That is to say, the second adhesion portion may be disposed between the third rear face region 163 and fourth rear face region 164. The second adhesion portion is a member that adheres the third rear face region 163 and fourth rear face region 164 to each other.

The third insulating portion 123 is a member formed of insulating material (i.e., material having no electroconductivity or sufficiently low electroconductivity). Configurations of the first insulating portion 121, second insulating portion 122, and third insulating portion 123 (e.g., thicknesses, area, shape, materials included, etc.) may be the same as each other, or may be different.

The third power-generating element 213 is a power-generating unit having charging and discharging properties (e.g., a secondary battery), for example. The third power-generating element 213 may be a battery cell, or a fully-solid battery, for example. Configurations of the first power-generating element 211, second power-generating element 212, and third power-generating element 213 (e.g., thicknesses, area, shape, materials included, etc.) may be the same as each other, or may be different.

The third electrode layer 223 is a layer including electrode material (e.g., active material). Configurations of the first electrode layer 221, second electrode layer 222, and third electrode layer 223 (e.g., thicknesses, area, shape, materials included, etc.) may be the same as each other, or may be different.

The third counter electrode layer 233 is a layer including counter electrode material (e.g., active material). Counter electrode material is material making up counter electrodes to the electrode material. Configurations of the first counter electrode layer 231, second counter electrode layer 232, and third counter electrode layer 233 (e.g., thicknesses, area, shape, materials included, etc.) may be the same as each other, or may be different.

The third solid electrolyte layer 243 is a solid electrolyte layer including a solid electrolyte. Configurations of the first solid electrolyte layer 241, second solid electrolyte layer 242, and third solid electrolyte layer 243 (e.g., thicknesses, area, shape, materials included, etc.) may be the same as each other, or may be different.

Figure 12:
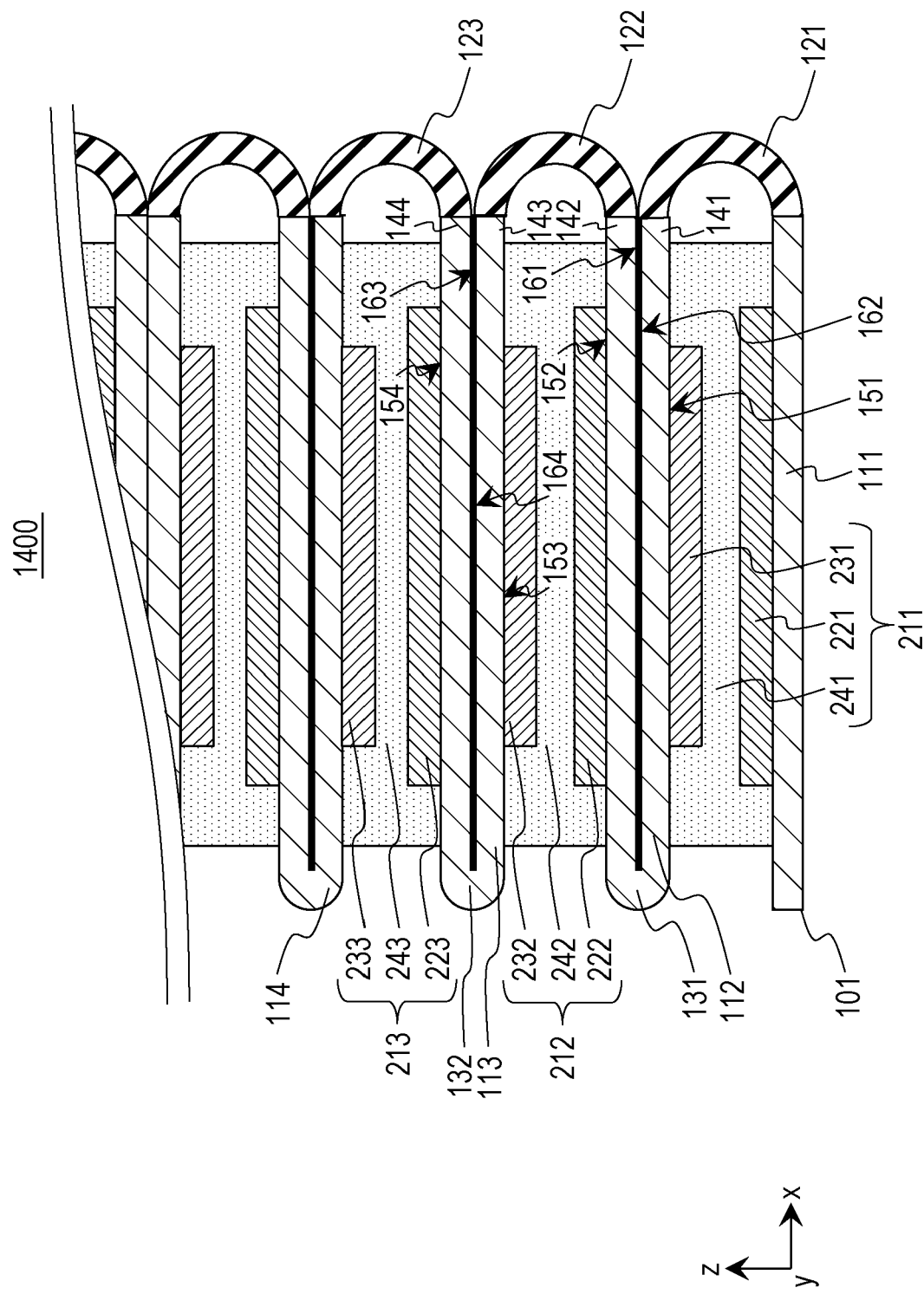
FIG. 12 is a cross-sectional diagram illustrating a schematic configuration of a battery according to the first embodiment.

FIG. 12 is a cross-sectional diagram illustrating a schematic configuration of a battery 1400 according to the first embodiment.

The battery according to the first embodiment may be configured with four or more power-generating elements having been laminated, as illustrated in FIG. 12.

A fourth and subsequent power-generating elements are further laminated on the fourth electroconductive portion 114 in the battery 1400 illustrated in FIG. 12. A bipolar battery where multiple power-generating elements (cells) are serially connected is capable of yielding high voltage, for example.

The number of layers of power-generating elements making up the battery according to the first embodiment may be two to 200, for example. Adjusting the number of layers of power-generating elements can realize adjustment of output in accordance with the usage of the battery (electronic devices, electric machines, electric vehicles, stationary batteries, etc.).

Figure 13:
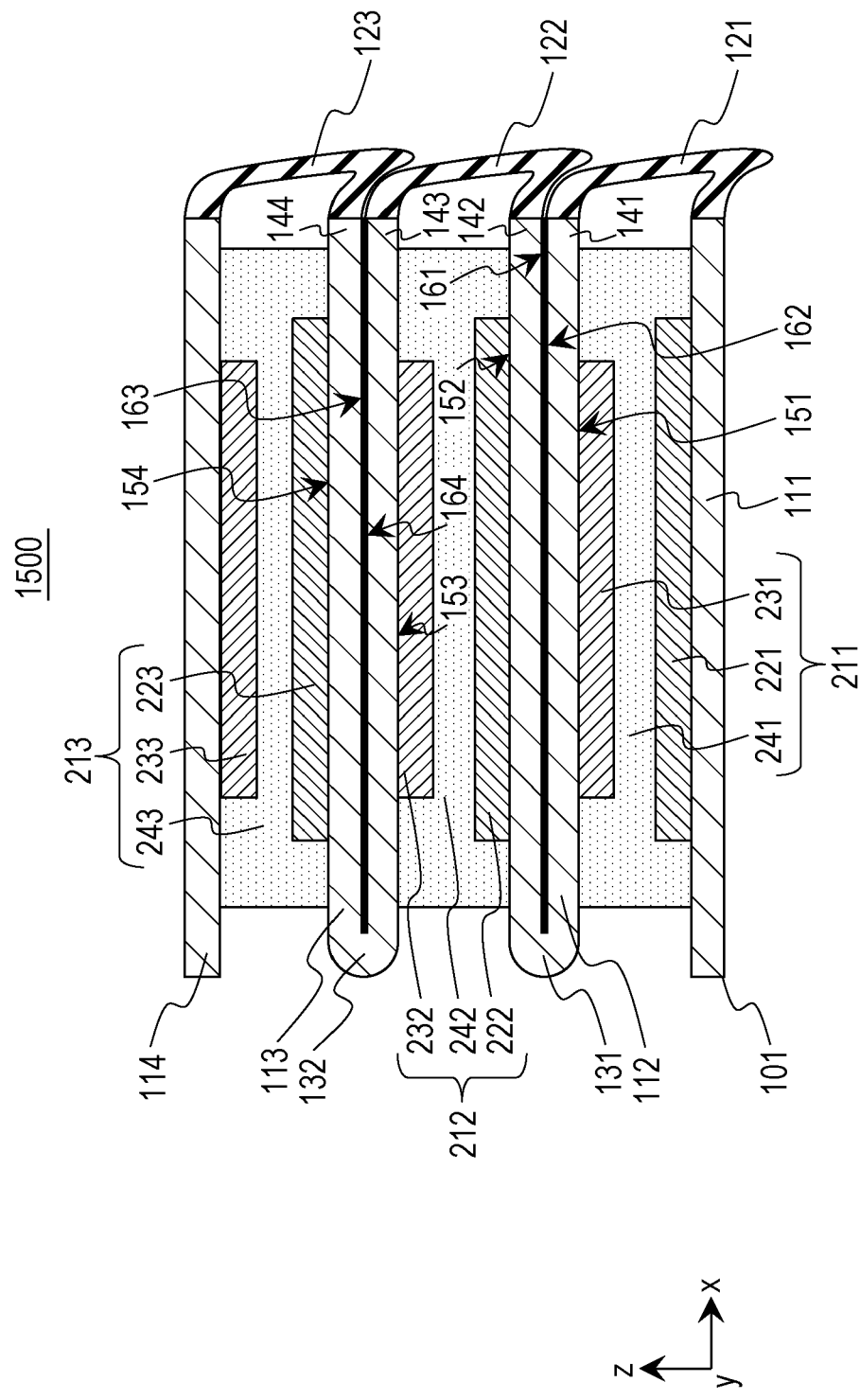
FIG. 13 is a cross-sectional diagram illustrating a schematic configuration of a battery according to the first embodiment.

FIG. 13 is a cross-sectional diagram illustrating a schematic configuration of a battery 1500 according to the first embodiment.

Multiple insulating portions may be bent and bonded so as to be bonded to each other in the first embodiment, as illustrated in FIG. 13. Thus, multiple insulating portions can be integrated like a wall. Accordingly, the structure where multiple power-generating elements are serially connected can be maintained even more strongly.

Note that in the first embodiment, part (or all) of the side faces of the laminated structure of power-generating elements may be covered by an insulating material (e.g., a sealant). Accordingly, the serially-connected power-generating elements can be sealed. The sealant here may be a moisture-preventing laminating sheet. Thus, the sealant can prevent the power-generating elements from deteriorating due to moisture. The laminated structure of the power-generating elements may be contained within a sealing case. Commonly known battery cases (e.g., laminating sacks, metal cans, resin cases, etc.) may be used as a sealing case.

Also, the battery according to the first embodiment may further have a pair of external electrodes. The pair of external electrodes may protrude to the outer side of the top and bottom faces (or side faces) of the laminated structure, in a case where the entirety of the laminated structure of power-generating elements is to be sealed by the sealant. One of the external electrodes may be connected to the first electroconductive portion 111, for example, the other of the external electrodes may be connected to, for example, the second electroconductive portion 112, third electroconductive portion 113, or fourth electroconductive portion 114. This enables discharge to a load connected to the pair of external electrodes, and charging of the battery (the power-generating elements) by a charging device connected to the external electrodes.

Note that in the present disclosure, the expression, "a configuration where a predetermined layer and another predetermined layer are positioned facing each other" means that "part of the principal face (or the entire region of the principal face) of the predetermined layer is situated overlapping "part of the principal face (or the entire region of the principal face) of the other predetermined layer, as viewed from the laminating direction of the layers".

Also, in the present disclosure, the expression, "a configuration where a predetermined layer and another predetermined layer are positioned facing each other" also encompasses "a configuration where a separate member (e.g., a layer made of a separate material) is disposed between a principal face of the predetermined layer and a principal face of the other predetermined layer that face each other".

A manufacturing method of the battery according to the first embodiment will be described later as a third embodiment.

Second Embodiment

A second embodiment will be described below. Description that is redundant with that of the above-described first embodiment will be omitted as appropriate.

Figure 14:
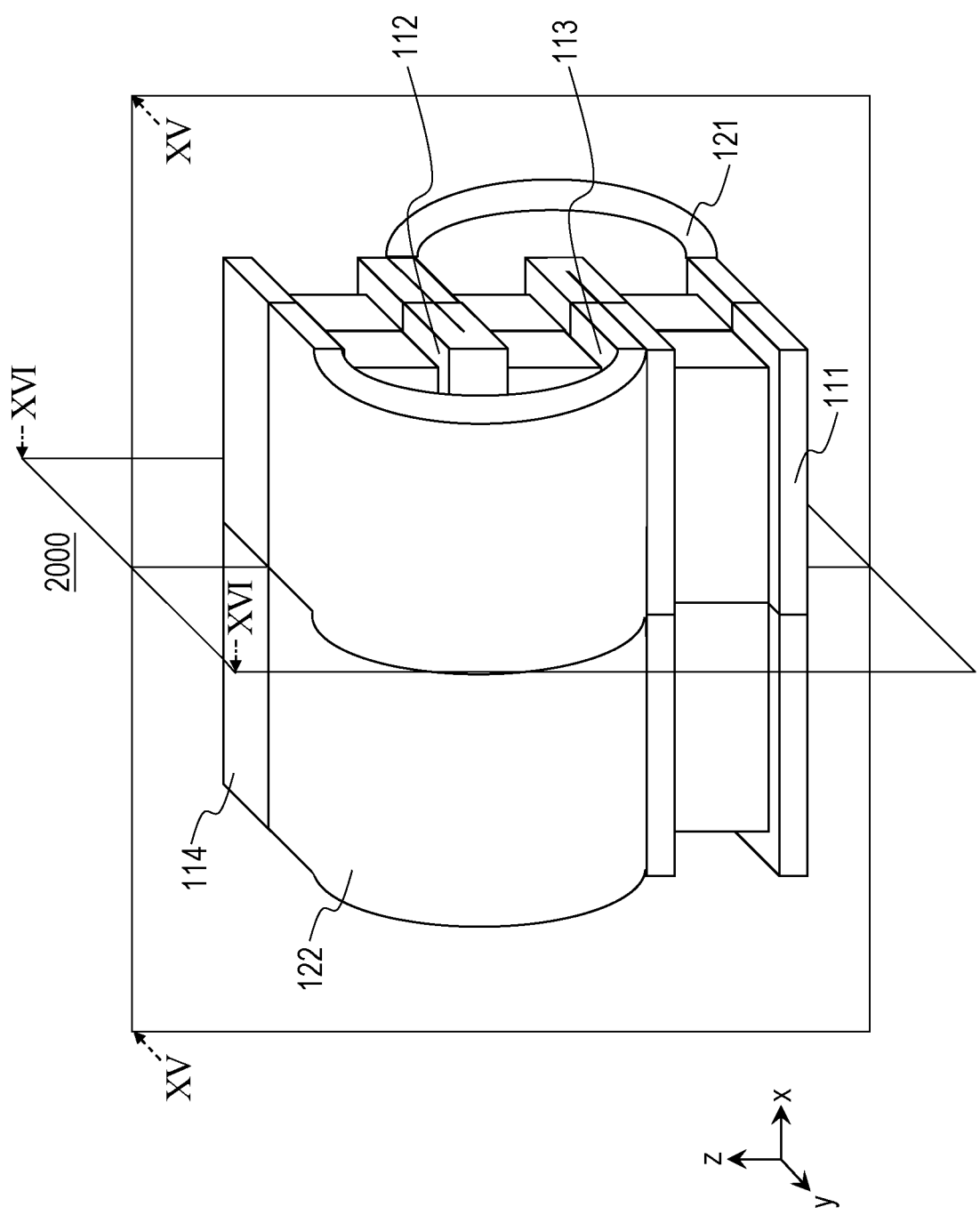
FIG. 14 is a perspective view illustrating a schematic configuration of a battery according to a second embodiment.

FIG. 14 is a perspective view illustrating a schematic configuration of a battery 2000 according to the second embodiment.

Figure 15:
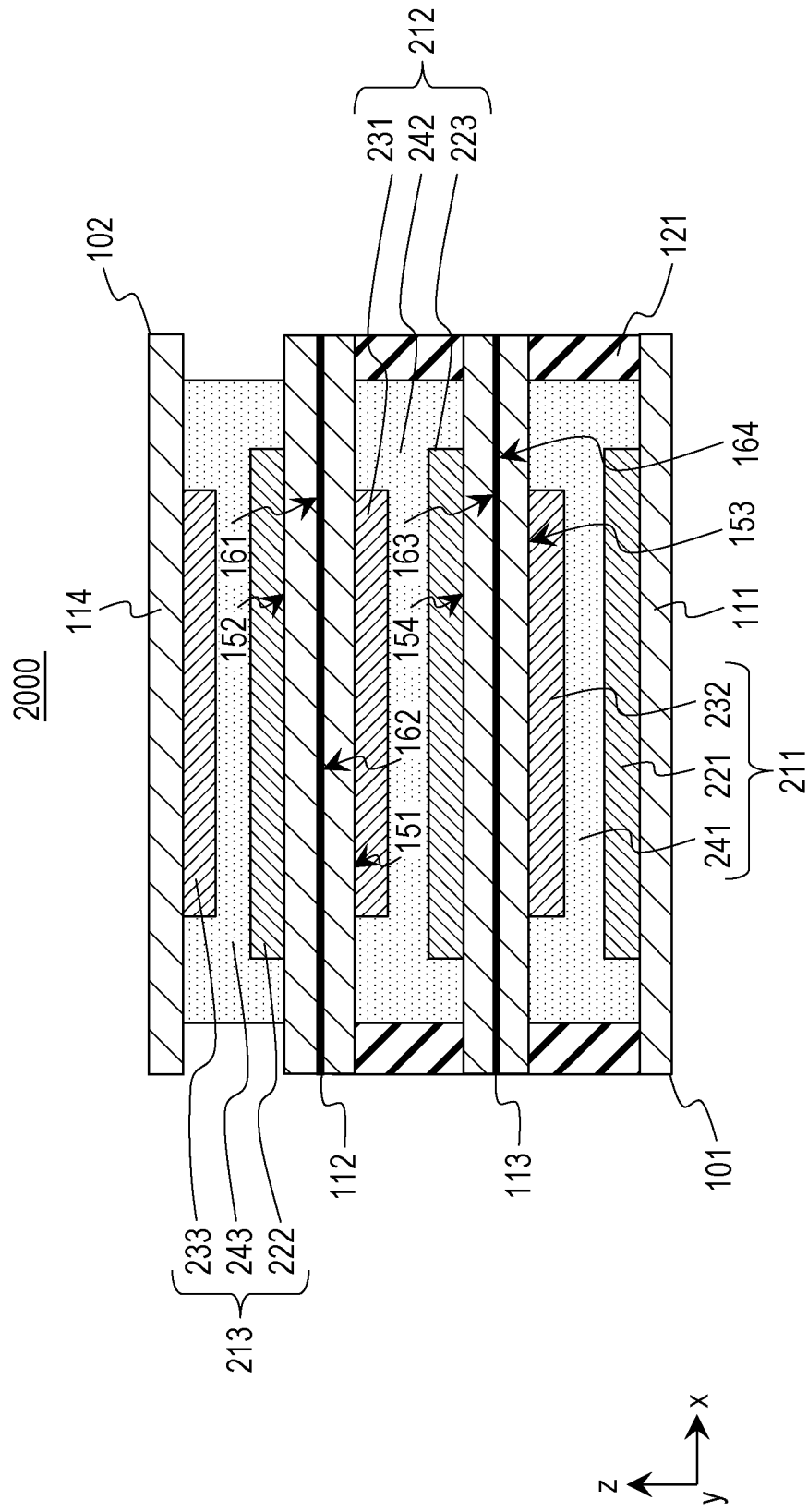
FIG. 15 is an x-z diagram (cross-sectional view taken along XV-XV in FIG. 14) of the battery according to the second embodiment.

FIG. 15 is an x-z diagram (cross-sectional view taken along XV-XV in FIG. 14) of the battery 2000 according to the second embodiment.

Figure 16:
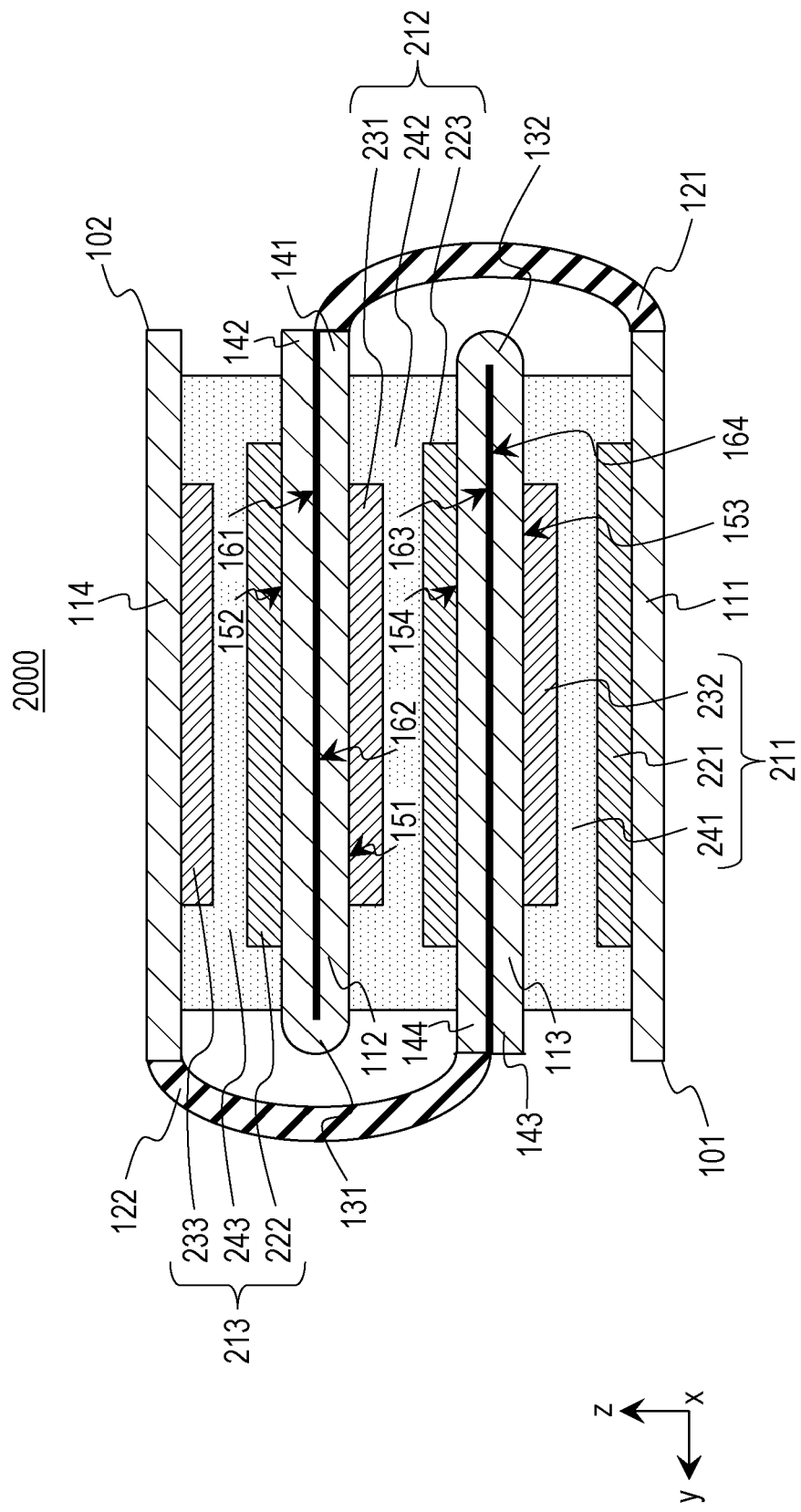
FIG. 16 is a y-z diagram (cross-sectional view taken along XVI-XVI in FIG. 14) of the battery according to the second embodiment.

FIG. 16 is a y-z diagram (cross-sectional view taken along XVI-XVI in FIG. 14) of the battery 2000 according to the second embodiment.

The battery 2000 according to the second embodiment further includes the following configuration, in addition to the configuration of the above-described battery 1000 according to the first embodiment.

That is to say, the battery 2000 according to the second embodiment includes a second current collector 102, the second counter electrode layer 232, the third electrode layer 223, and the third counter electrode layer 233.

The second counter electrode layer 232 and the third counter electrode layer 233 are counter electrodes of the first electrode layer 221, second electrode layer 222, and third electrode layer 223.

The second current collector 102 has the third electroconductive portion 113, second insulating portion 122, and fourth electroconductive portion 114.

The third electroconductive portion 113 has the third edge region 143, third front face region 153, third rear face region 163, second fold portion 132, fourth front face region 154, fourth rear face region 164, and fourth edge region 144.

The third front face region 153 is a region situated between the third edge region 143 and second fold portion 132.

The third rear face region 163 is a region situated on the rear face of the third front face region 153.

The fourth front face region 154 is a region situated between the fourth edge region 144 and second fold portion 132.

The fourth rear face region 164 is a region situated on the rear face of the fourth front face region 154.

The second current collector 102 is folded at the second fold portion 132, whereby the third rear face region 163 and fourth rear face region 164 are positioned facing each other.

The third electroconductive portion 113 is disposed between the first electroconductive portion 111 and second electroconductive portion 112.

The second counter electrode layer 232 is disposed in contact with the third front face region 153, at a position facing the first electrode layer 221.

The third electrode layer 223 is disposed in contact with the fourth front face region 154, at a position facing the first counter electrode layer 231.

The third counter electrode layer 233 is disposed in contact with the fourth electroconductive portion 114.

The second insulating portion 122 is a member linking the fourth edge region 144 and the fourth electroconductive portion 114.

The second the current collector 102 is folded at the second insulating portion 122, whereby the second electrode layer 222 and third counter electrode layer 233 are positioned facing each other.

According to the above configuration, the bonding strength among the component members of the battery can be further improved. That is to say, the third electrode layer 223 and third counter electrode layer 233 can be respectively disposed at the third electroconductive portion 113 and fourth electroconductive portion 114 linked to each other by the second insulating portion 122. Further, the second counter electrode layer 232 and third electrode layer 223 can respectively be disposed at the third front face region 153 and fourth front face region 154 (i.e., two regions that are partial regions of the second current collector 102 and are linked by the second fold portion 132). Accordingly, the respective electrode layers and counter electrode layers can be strongly linked by the first insulating portion 121 and second insulating portion 122, and the first fold portion 131 and second fold portion 132. Accordingly, a battery can be realized where the first power-generating element 211 (i.e., a power-generating element including the first electrode layer 221 and second counter electrode layer 232), second power-generating element 212 (i.e., a power-generating element including the third electrode layer 223 and first counter electrode layer 231), and the third power-generating element 213 (i.e., a power-generating element including the second electrode layer 222 and third counter electrode layer 233) are strongly linked, and these power-generating elements are serially connected.

According to the above configuration, of the side faces of the battery, the side face where the second insulating portion 122 is situated (a side face of the battery that is different from the side face where the first insulating portion 121 is situated) can be covered by the second insulating portion 122. Accordingly, more side faces of the battery can be covered by the first insulating portion 121 and second insulating portion 122. Thus, the reliability of the battery can be further improved.

Note that the battery 2000 according to the second embodiment may further be provided with the first solid electrolyte layer 241, second solid electrolyte layer 242, and third solid electrolyte layer 243, as illustrated in FIGS. 13 through 15.

The first solid electrolyte layer 241 is situated between the first electrode layer 221 and second counter electrode layer 232.

According to the above configuration, a single solid battery cell (first power-generating element 211) can be configured of the first electrode layer 221, second counter electrode layer 232, and first solid electrolyte layer 241.

The second solid electrolyte layer 242 is situated between the third electrode layer 223 and first counter electrode layer 231.

According to the above configuration, a single solid battery cell (second power-generating element 212) can be configured of the third electrode layer 223, first counter electrode layer 231, and second solid electrolyte layer 242.

The third solid electrolyte layer 243 is situated between the second electrode layer 222 and third counter electrode layer 233.

According to the above configuration, a single solid battery cell (third power-generating element 213) can be configured of the second electrode layer 222, third counter electrode layer 233, and third solid electrolyte layer 243.

Note that the first electrode layer 221, second electrode layer 222, third electrode layer 223, first counter electrode layer 231, second counter electrode layer 232, and third counter electrode layer 233, may each be formed in ranges narrower than the first electroconductive portion 111, second electroconductive portion 112, third electroconductive portion 113, and fourth electroconductive portion 114, as illustrated in FIGS. 13 through 15.

Also, the first solid electrolyte layer 241 may be disposed over a greater area than that of the first electrode layer 221 and second counter electrode layer 232, as illustrated in FIGS. 13 through 15. That is to say, the first solid electrolyte layer 241 may be formed covering the first electrode layer 221 and second counter electrode layer 232. Accordingly, short-circuiting of the first electrode layer 221 and second counter electrode layer 232 due to direct contact can be prevented.

The second solid electrolyte layer 242 may be disposed over a greater area than that of the third electrode layer 223 and first counter electrode layer 231, as illustrated in FIGS. 13 through 15. That is to say, the second solid electrolyte layer 242 may be formed covering the third electrode layer 223 and first counter electrode layer 231. Accordingly, short-circuiting of the third electrode layer 223 and first counter electrode layer 231 due to direct contact can be prevented.

The third solid electrolyte layer 243 may be disposed over a greater area than that of the second electrode layer 222 and third counter electrode layer 233, as illustrated in FIGS. 13 through 15. That is to say, the third solid electrolyte layer 243 may be formed covering the second electrode layer 222 and third counter electrode layer 233. Accordingly, short-circuiting of the second electrode layer 222 and third counter electrode layer 233 due to direct contact can be prevented.

Also, the first solid electrolyte layer 241, second solid electrolyte layer 242, and third solid electrolyte layer 243 may be disposed in a narrower range than the first electroconductive portion 111, second electroconductive portion 112, third electroconductive portion 113, and fourth electroconductive portion 114. Alternatively, the range of formation of the first solid electrolyte layer 241, second solid electrolyte layer 242, and third solid electrolyte layer 243 may be the same range as the first electroconductive portion 111, second electroconductive portion 112, third electroconductive portion 113, and fourth electroconductive portion 114.

The second insulating portion 122 is linked to the third electroconductive portion 113 and fourth electroconductive portion 114. That is to say, one end of the second insulating portion 122 is connected (e.g., bonded) to the fourth edge region 144 that is the end of the third electroconductive portion 113. Further, another end of the second insulating portion 122 is connected (e.g., bonded) to the fourth electroconductive portion 114 (e.g., an end of the fourth electroconductive portion 114).

A connection method of at least one (e.g., both) of the third electroconductive portion 113 and fourth electroconductive portion 114 to the second insulating portion 122 may be different from the connection method of at least one (e.g., both) of the first electroconductive portion 111 and second electroconductive portion 112 to the first insulating portion 121, or may be the same.

The side face where the second insulating portion 122 is situated (i.e., one of the side faces of the battery 2000) may be a side face situated facing the side face where the first insulating portion 121 is situated, as illustrated in FIGS. 13 through 15. Alternatively, the side face where the second insulating portion 122 is situated may be a side face adjacent to the side face where the first insulating portion 121 is situated.

Note that the first electrode layer 221, second electrode layer 222, and third electrode layer 223 may be negative active material layers. The electrode material here is a negative active material. The first electroconductive portion 111 is a negative current collector. The second electroconductive portion 112 and third electroconductive portion 113 are bipolar current collectors. The first counter electrode layer 231, second counter electrode layer 232, and third counter electrode layer 233 are positive active material layers. The counter electrode material is a positive active material. The fourth electroconductive portion 114 is a positive current collector.

Alternatively, that the first electrode layer 221, second electrode layer 222, and third electrode layer 223 may be positive active material layers. The electrode material here is a positive active material. The first electroconductive portion 111 is a positive current collector. The second electroconductive portion 112 and third electroconductive portion 113 are bipolar current collectors. The first counter electrode layer 231, second counter electrode layer 232, and third counter electrode layer 233 are negative active material layers. The counter electrode material is a negative active material. The fourth electroconductive portion 114 is a negative current collector.

Figure 17:
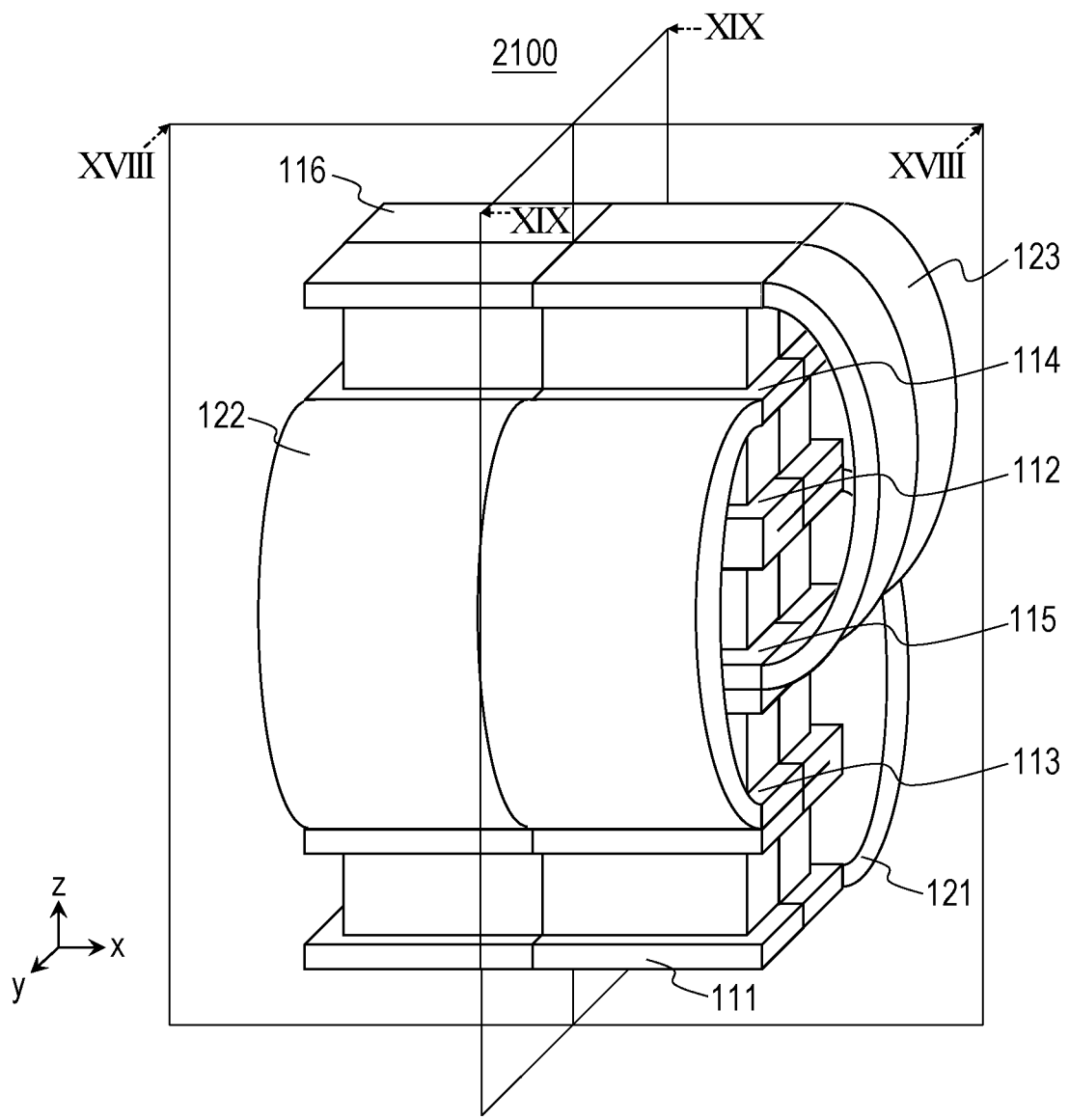
FIG. 17 is a perspective view illustrating a schematic configuration of a battery according to the second embodiment.

FIG. 17 is a perspective view illustrating a schematic configuration of a battery 2100 according to the second embodiment.

Figure 18:
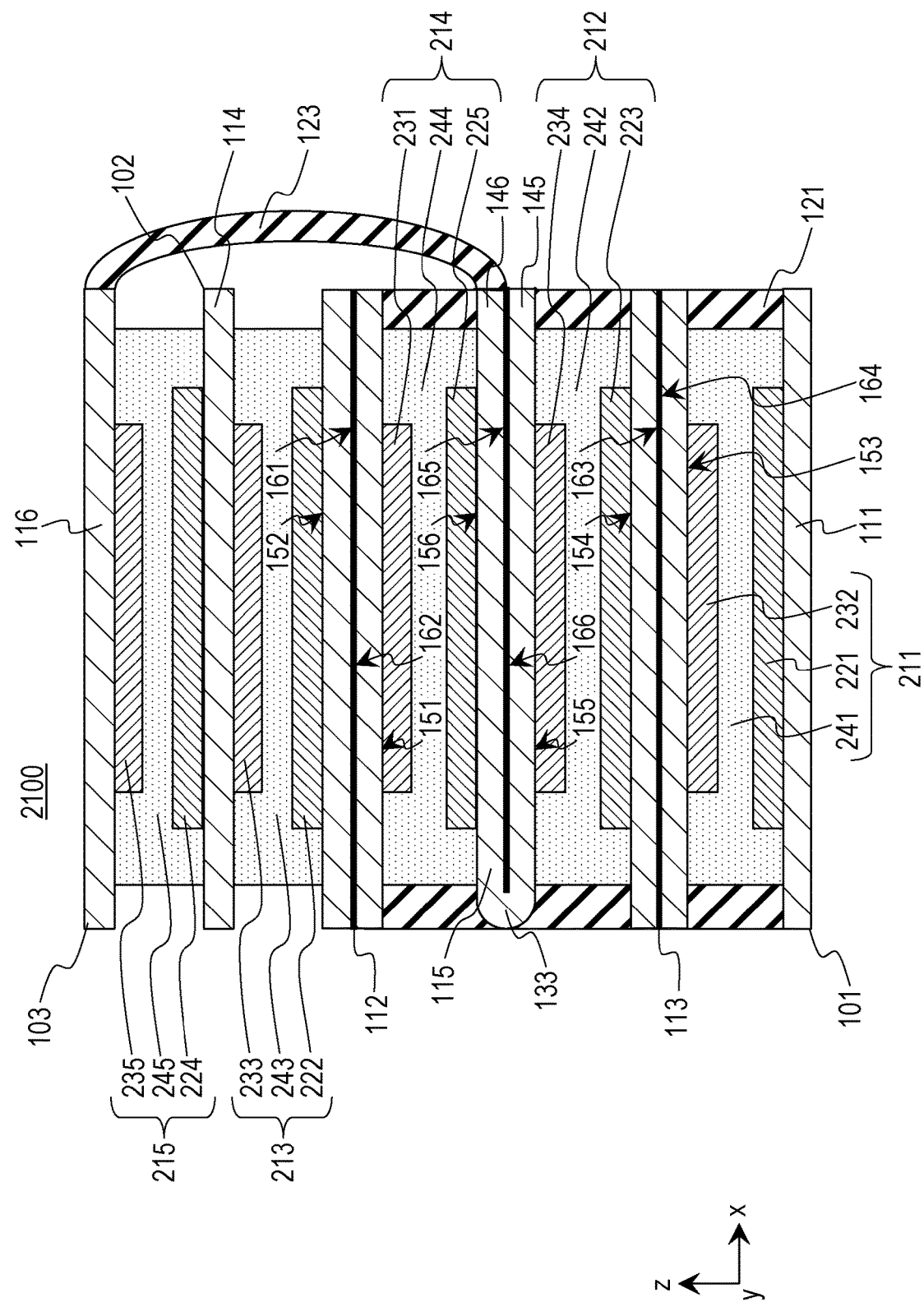
FIG. 18 is an x-z diagram (cross-sectional view taken along XVIII-XVIII in FIG. 17) illustrating a schematic configuration of the battery according to the second embodiment.

FIG. 18 is an x-z diagram (cross-sectional view taken along XVIII-XVIII in FIG. 17) illustrating a schematic configuration of the battery 2100 according to the second embodiment.

Figure 19:
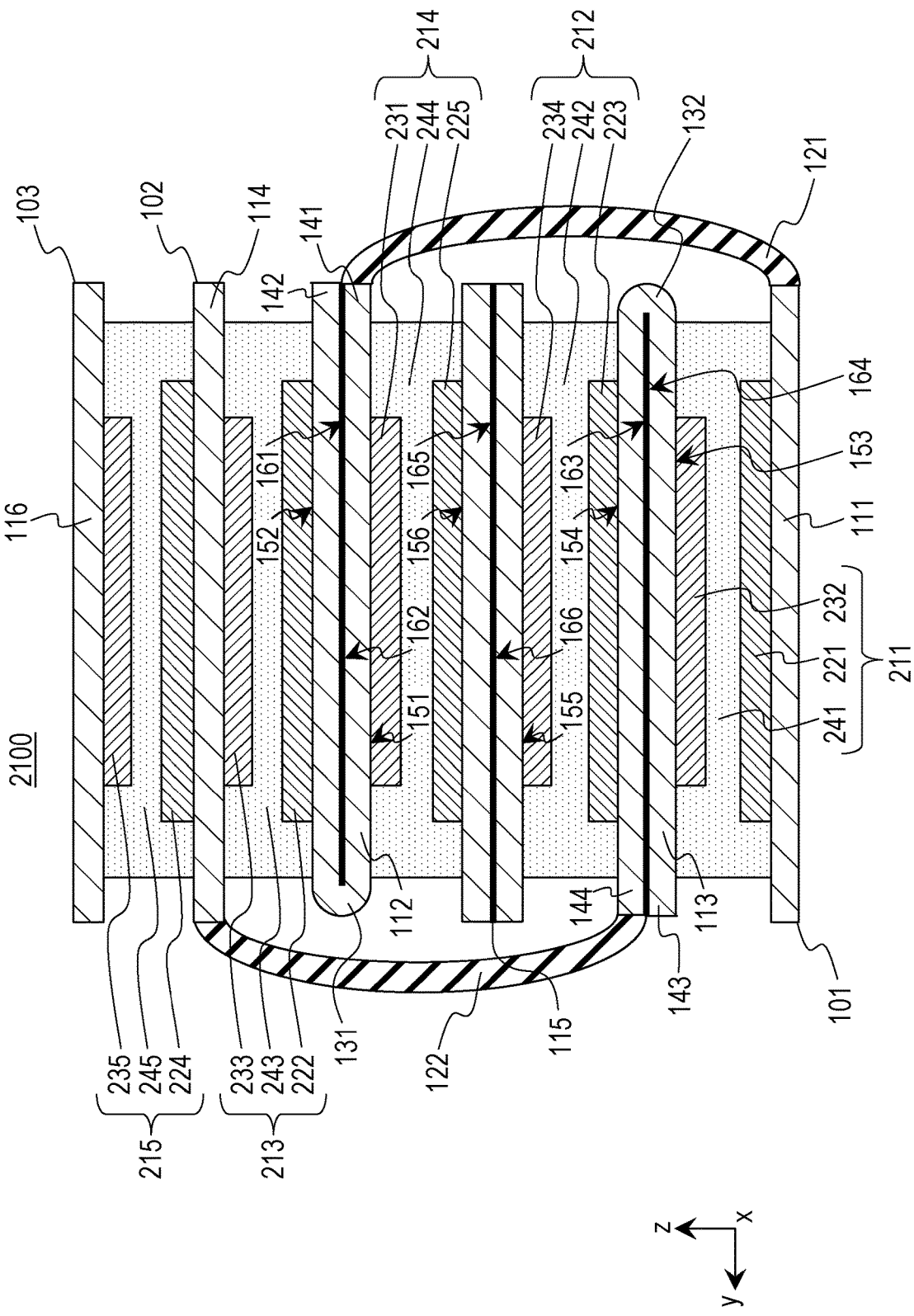
FIG. 19 is a y-z diagram (cross-sectional view taken along XIX-XIX in FIG. 17) illustrating a schematic configuration of the battery according to the second embodiment.

FIG. 19 is a y-z diagram (cross-sectional view taken along XIX-XIX in FIG. 17) illustrating a schematic configuration of the battery 2100 according to the second embodiment.

The battery 2100 according to the second embodiment further includes the following configuration, in addition to the configuration of the above-described battery 2000 according to the second embodiment.

That is to say, the battery 2100 according to the second embodiment is provided with a third current collector 103, a fourth electrode layer 224, a fourth counter electrode layer 234, a fifth electrode layer 225, and a fifth counter electrode layer 235.

The fourth counter electrode layer 234 and the fifth counter electrode layer 235 are counter electrodes of the first electrode layer 221, second electrode layer 222, third electrode layer 223, fourth electrode layer 224, and fifth electrode layer 225.

The third current collector 103 has a fifth electroconductive portion 115, the third insulating portion 123, and a sixth electroconductive portion 116.

The fifth electroconductive portion 115 has a fifth edge region 145, a fifth front face region 155, a fifth rear face region 165, a third fold portion 133, a sixth front face region 156, a sixth rear face region 166, and a sixth edge region 146.

The fifth front face region 155 is a region situated between the fifth edge region 145 and the third fold portion 133.

The fifth rear face region 165 is a region situated on the rear face of the fifth front face region 155.

The sixth front face region 156 is a region situated between the sixth edge region 146 and third fold portion 133.

The sixth rear face region 166 is a region situated on the rear face of the sixth front face region 156.

The third current collector 103 is folded at the third fold portion 133, whereby the fifth rear face region 165 and sixth rear face region 166 are positioned facing each other.

The fifth electroconductive portion 115 is disposed between the third electroconductive portion 113 and second electroconductive portion 112.

The fourth electrode layer 224 is disposed in contact with the fourth electroconductive portion 114.

The fourth counter electrode layer 234 is disposed in contact with the fifth front face region 155, at a position facing the third electrode layer 223.

The fifth electrode layer 225 is disposed in contact with the sixth front face region 156, at a position facing the first counter electrode layer 231.

The fifth counter electrode layer 235 is disposed in contact with the sixth electroconductive portion 116.

The third insulating portion 123 is a member linking the sixth edge region 146 and the sixth electroconductive portion 116.

The third current collector 103 is folded at the third insulating portion 123, whereby the fourth electrode layer 224 and fifth counter electrode layer 235 are positioned facing each other.

According to the above configuration, the bonding strength among the component members of the battery can be further improved. That is to say, the fifth electrode layer 225 and fifth counter electrode layer 235 can be respectively disposed at the fifth electroconductive portion 115 and sixth electroconductive portion 116 linked to each other by the third insulating portion 123. Further, the fourth counter electrode layer 234 and fifth electrode layer 225 can respectively be disposed at the fifth front face region 155 and sixth front face region 156 (i.e., two regions that are partial regions of the third current collector 103 and are linked by the third fold portion 133). Accordingly, the respective electrode layers and counter electrode layers can be strongly linked by the first insulating portion 121, second insulating portion 122, and third insulating portion 123, and the first fold portion 131, second fold portion 132, and third fold portion 133. Accordingly, a battery can be realized where the first power-generating element 211 (i.e., a power-generating element including the first electrode layer 221 and second counter electrode layer 232), second power-generating element 212 (i.e., a power-generating element including the third electrode layer 223 and fourth counter electrode layer 234), the third power-generating element 213 (i.e., a power-generating element including the second electrode layer 222 and third counter electrode layer 233), a fourth power-generating element 214 (i.e., a power-generating element including the fifth electrode layer 225 and first counter electrode layer 231), and a fifth power-generating element 215 (i.e., a power-generating element including the fourth electrode layer 224 and fifth counter electrode layer 235) are strongly linked, and these power-generating elements are serially connected.

According to the above configuration, of the side faces of the battery, the side face where the third insulating portion 123 is situated (a side face of the battery that is different from the side faces where the first insulating portion 121 and second insulating portion 122 are situated) can be covered by the third insulating portion 123. Accordingly, more side faces of the battery can be covered by the first insulating portion 121, second insulating portion 122, and third insulating portion 123. Thus, the reliability of the battery can be further improved.

Note that the battery 2100 according to the second embodiment may further be provided with a fourth solid electrolyte layer 244 and fifth solid electrolyte layer 245, as illustrated in FIGS. 17 through 19.

The fourth solid electrolyte layer 244 is situated between the fifth electrode layer 225 and the first counter electrode layer 231.

According to the above configuration, a single solid battery cell (fourth power-generating element 214) can be configured of the fifth electrode layer 225, first counter electrode layer 231, and fourth solid electrolyte layer 244.

The fifth solid electrolyte layer 245 is situated between the fourth electrode layer 224 and fifth counter electrode layer 235.

According to the above configuration, a single solid battery cell (fifth power-generating element 215) can be configured of the fourth electrode layer 224, fifth counter electrode layer 235, and fifth solid electrolyte layer 245.

Note that the second solid electrolyte layer 242 is situated between the third electrode layer 223 and the fourth counter electrode layer 234 in the battery 2100 according to the second embodiment.

Note that the first electrode layer 221, second electrode layer 222, third electrode layer 223, fourth electrode layer 224, fifth electrode layer 225, first counter electrode layer 231, second counter electrode layer 232, third counter electrode layer 233, fourth counter electrode layer 234, and fifth counter electrode layer 235 may each be formed in a range narrower than that of the first electroconductive portion 111, second electroconductive portion 112, third electroconductive portion 113, fourth electroconductive portion 114, fifth electroconductive portion 115, and sixth electroconductive portion 116, as illustrated in FIGS. 17 through 19.

The second solid electrolyte layer 242 may be disposed over a greater area than that of the third electrode layer 223 and fourth counter electrode layer 234, as illustrated in FIGS. 17 through 19. That is to say, the second solid electrolyte layer 242 may be formed covering the third electrode layer 223 and fourth counter electrode layer 234. Thus, short-circuiting of the third electrode layer 223 and fourth counter electrode layer 234 due to direct contact can be prevented.

Also, the fourth solid electrolyte layer 244 may be disposed over a greater area than that of the fifth electrode layer 225 and first counter electrode layer 231, as illustrated in FIGS. 17 through 19. That is to say, the fourth solid electrolyte layer 244 may be formed covering the fifth electrode layer 225 and first counter electrode layer 231. Thus, short-circuiting of the fifth electrode layer 225 and first counter electrode layer 231 due to direct contact can be prevented.

Also, the fifth solid electrolyte layer 245 may be disposed over a greater area than that of the fourth electrode layer 224 and fifth counter electrode layer 235, as illustrated in FIGS. 17 through 19. That is to say, the fifth solid electrolyte layer 245 may be formed covering the fourth electrode layer 224 and fifth counter electrode layer 235. Thus, short-circuiting of the fourth electrode layer 224 and fifth counter electrode layer 235 due to direct contact can be prevented.

The first solid electrolyte layer 241, second solid electrolyte layer 242, third solid electrolyte layer 243, fourth solid electrolyte layer 244, and fifth solid electrolyte layer 245 may be disposed in a range narrower than that of the first electroconductive portion 111, second electroconductive portion 112, third electroconductive portion 113, fourth electroconductive portion 114, fifth electroconductive portion 115, and sixth electroconductive portion 116, as illustrated in FIGS. 17 through 19. Alternatively, the range of formation of the first solid electrolyte layer 241, second solid electrolyte layer 242, third solid electrolyte layer 243, fourth solid electrolyte layer 244, and fifth solid electrolyte layer 245 may be the same range as the first electroconductive portion 111, second electroconductive portion 112, third electroconductive portion 113, fourth electroconductive portion 114, fifth electroconductive portion 115, and sixth electroconductive portion 116.

The third insulating portion 123 is linked to the fifth electroconductive portion 115 and sixth electroconductive portion 116. That is to say, one end of the third insulating portion 123 is connected (e.g., bonded) to the sixth edge region 146 that is an end of the fifth electroconductive portion 115. Further, another end of the third insulating portion 123 is connected (e.g., bonded) to the sixth electroconductive portion 116 (e.g., an end of the sixth electroconductive portion 116).

A connection method of at least one (e.g., both) of the fifth electroconductive portion 115 and sixth electroconductive portion 116 to the third insulating portion 123 may be different from the connection method of at least one (e.g., both) of the first electroconductive portion 111 and second electroconductive portion 112 to the first insulating portion 121, or may be the same.

Note that the first electrode layer 221, second electrode layer 222, third electrode layer 223, fourth electrode layer 224, and fifth electrode layer 225 may be negative active material layers. The electrode material here is a negative active material. The first electroconductive portion 111 is a negative current collector. The second electroconductive portion 112, third electroconductive portion 113, fourth electroconductive portion 114, and fifth electroconductive portion 115 are bipolar current collectors. The first counter electrode layer 231, second counter electrode layer 232, third counter electrode layer 233, fourth counter electrode layer 234, and fifth counter electrode layer 235 are positive active material layers. The counter electrode material is a positive active material. The sixth electroconductive portion 116 is a positive current collector.

Alternatively, the first electrode layer 221, second electrode layer 222, third electrode layer 223, fourth electrode layer 224, and fifth electrode layer 225 may be positive active material layers. The electrode material here is a positive active material. The first electroconductive portion 111 is a positive current collector. The second electroconductive portion 112, third electroconductive portion 113, fourth electroconductive portion 114, and fifth electroconductive portion 115 are bipolar current collectors. The first counter electrode layer 231, second counter electrode layer 232, third counter electrode layer 233, fourth counter electrode layer 234, and fifth counter electrode layer 235 are negative active material layers. The counter electrode material is a negative active material. The sixth electroconductive portion 116 is a negative current collector.

Figure 20:
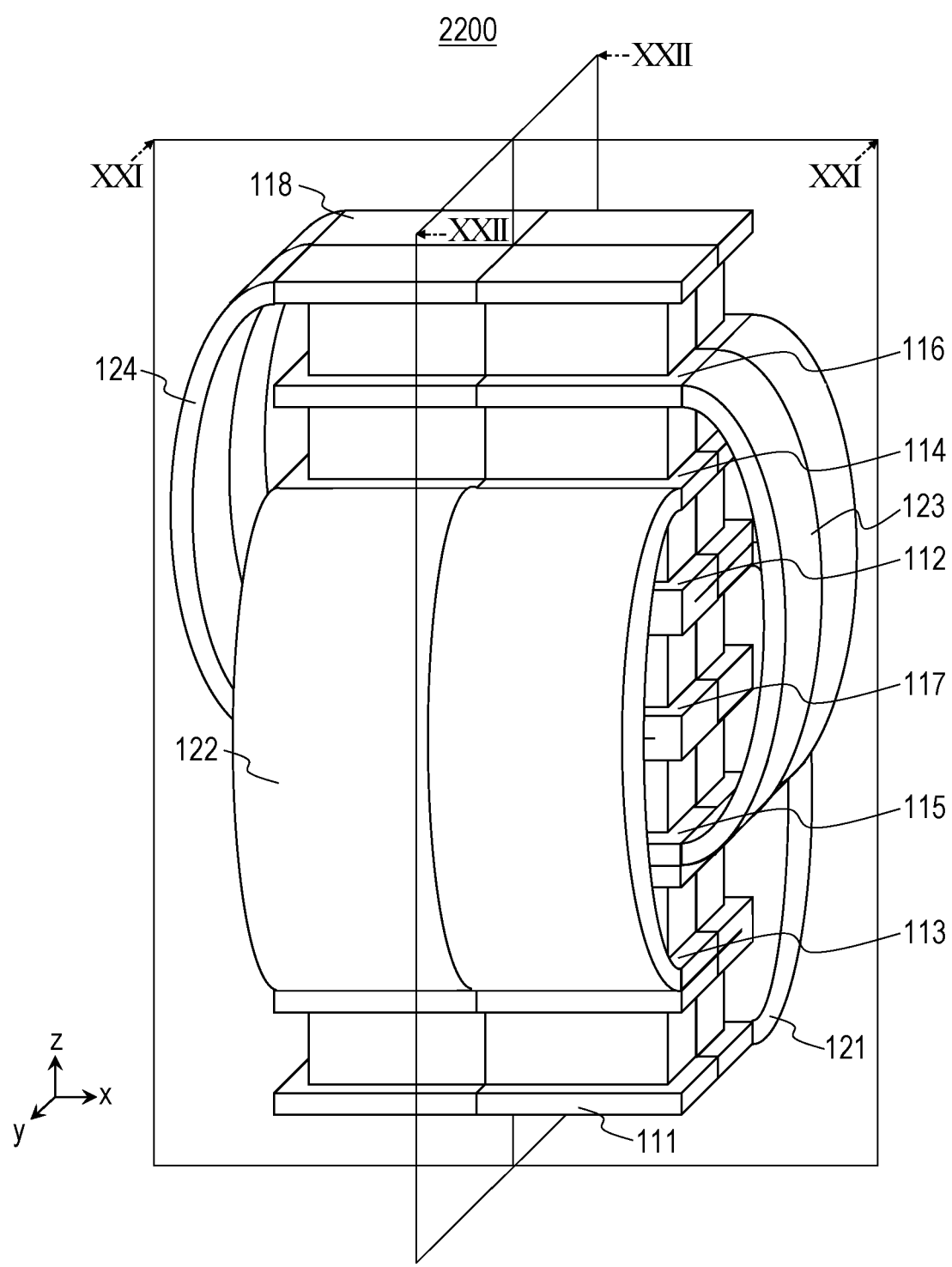
FIG. 20 is a perspective view illustrating a schematic configuration of a battery according to the second embodiment.

FIG. 20 is a perspective view illustrating a schematic configuration of a battery 2200 according to the second embodiment.

Figure 21:
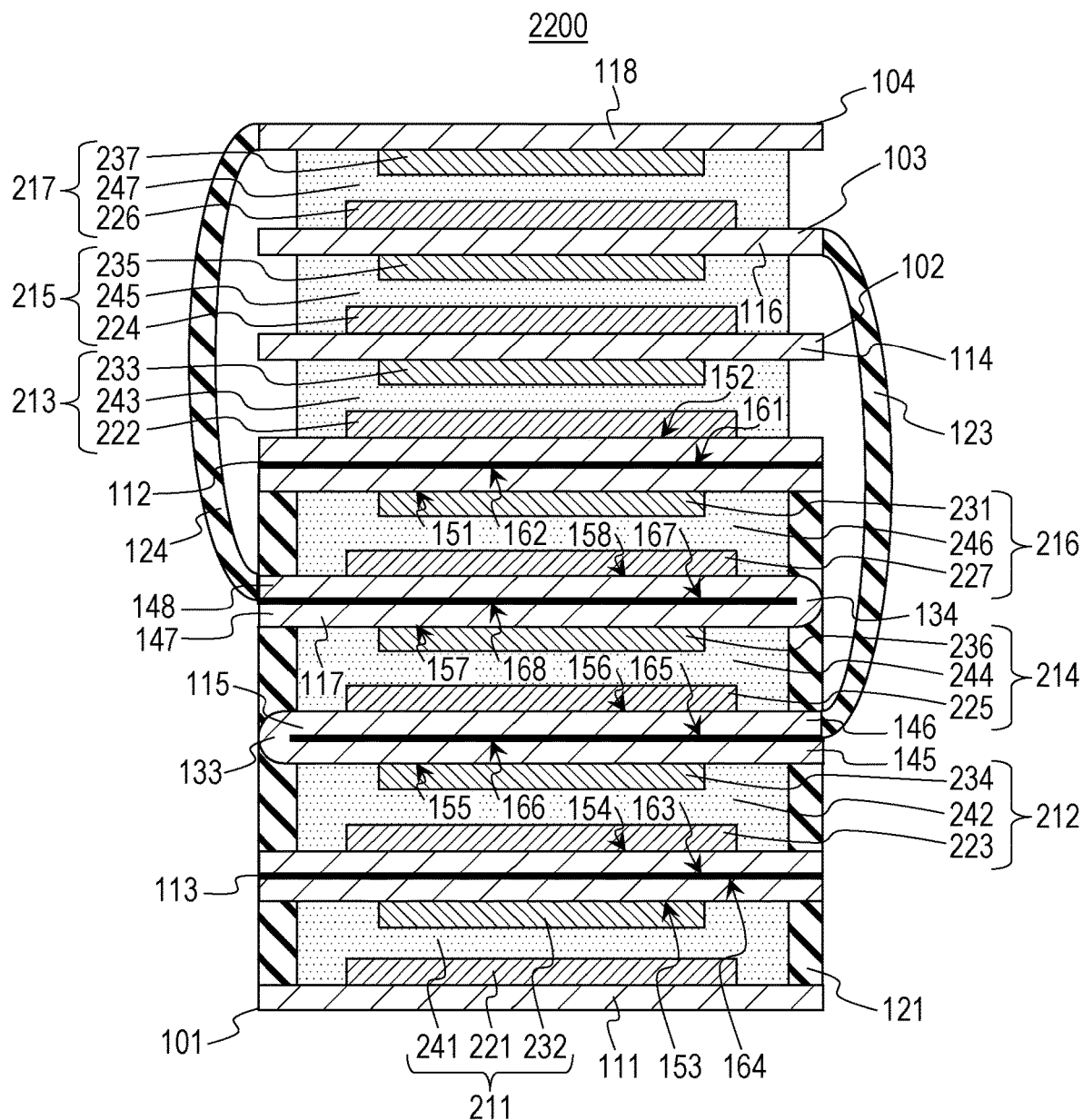
FIG. 21 is an x-z diagram (cross-sectional view taken along XXI-XXI in FIG. 20) illustrating a schematic configuration of the battery according to the second embodiment.

FIG. 21 is an x-z diagram (cross-sectional view taken along XXI-XXI in FIG. 20) illustrating a schematic configuration of the battery 2200 according to the second embodiment.

Figure 22:
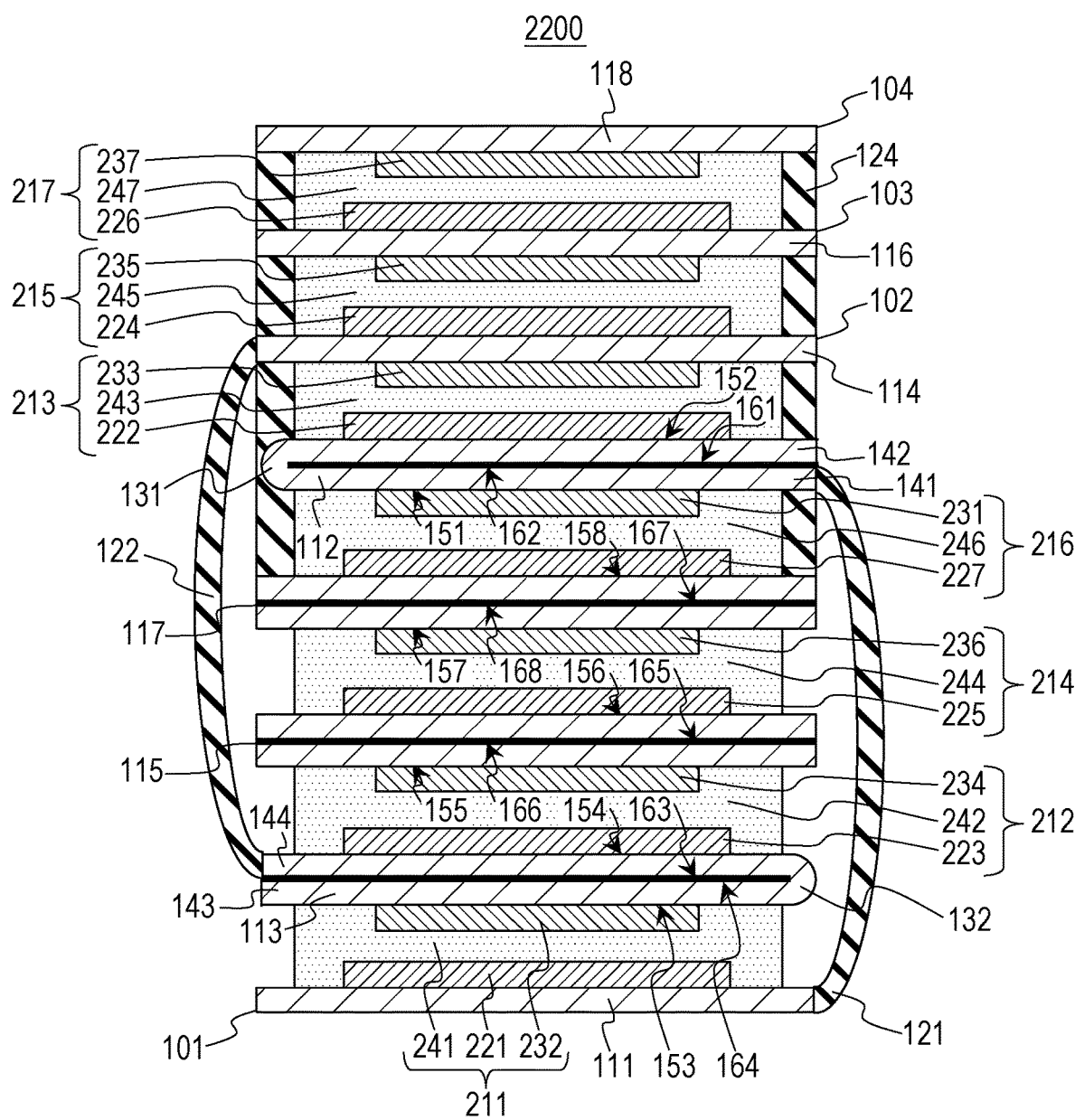
FIG. 22 is a y-z diagram (cross-sectional view taken along XXII-XXII in FIG. 20) illustrating a schematic configuration of the battery according to the second embodiment.

FIG. 22 is a y-z diagram (cross-sectional view taken along XXII-XXII in FIG. 20) illustrating a schematic configuration of the battery 2200 according to the second embodiment.

The battery 2200 according to the second embodiment further includes the following configuration, in addition to the configuration of the above-described battery 2100 according to the second embodiment.

That is to say, the battery 2200 according to the second embodiment is provided with a fourth current collector 104, a sixth electrode layer 226, a sixth counter electrode layer 236, a seventh electrode layer 227, and a seventh counter electrode layer 237.

The sixth counter electrode layer 236 and seventh counter electrode layer 237 are counter electrodes of the first electrode layer 221, second electrode layer 222, third electrode layer 223, fourth electrode layer 224, fifth electrode layer 225, sixth electrode layer 226, and seventh electrode layer 227.

The fourth current collector 104 includes a seventh electroconductive portion 117, a fourth insulating portion 124, and an eighth electroconductive portion 118.

The seventh electroconductive portion 117 includes a seventh edge region 147, a seventh front face region 157, a seventh rear face region 167, a fourth fold portion 134, an eighth front face region 158, an eighth rear face region 168, and an eighth edge region 148.

The seventh front face region 157 is a region situated between the seventh edge region 147 and fourth fold portion 134.

The seventh rear face region 167 is a region situated on the rear face of the seventh front face region 157.

The eighth front face region 158 is a region situated between the eighth edge region 148 and fourth fold portion 134.

The eighth rear face region 168 is a region situated on the rear face of the eighth front face region 158.

The fourth current collector 104 is folded at the fourth fold portion 134, whereby the seventh rear face region 167 and eighth rear face region 168 are positioned facing each other.

The seventh electroconductive portion 117 is disposed between the fifth electroconductive portion 115 and the second electroconductive portion 112.

The sixth electrode layer 226 is disposed in contact with the sixth electroconductive portion 116.

The sixth counter electrode layer 236 is disposed in contact with the seventh front face region 157, at a position facing the fifth electrode layer 225.

The seventh electrode layer 227 is disposed in contact with the eighth front face region 158, at a position facing the first counter electrode layer 231.

The seventh counter electrode layer 237 is disposed in contact with the eighth electroconductive portion 118.

The fourth insulating portion 124 is a member linking the eighth edge region 148 and the eighth electroconductive portion 118.

The fourth current collector 104 is folded at the fourth insulating portion 124, whereby the sixth electrode layer 226 and seventh counter electrode layer 237 are positioned facing each other.

According to the above configuration, the bonding strength among the component members of the battery can be further improved. That is to say, the seventh electrode layer 227 and seventh counter electrode layer 237 can be respectively disposed at the seventh electroconductive portion 117 and eighth electroconductive portion 118 linked to each other by the fourth insulating portion 124. Further, the sixth counter electrode layer 236 and seventh electrode layer 227 can respectively be disposed at the seventh front face region 157 and eighth front face region 158 (i.e., two regions that are partial regions of the fourth current collector 104 and are linked by the fourth fold portion 134). Accordingly, the respective electrode layers and counter electrode layers can be strongly linked by the first insulating portion 121, second insulating portion 122, third insulating portion 123 and fourth insulating portion 124, and the first fold portion 131, second fold portion 132, third fold portion 133, and fourth fold portion 134. Accordingly, a battery can be realized where the first power-generating element 211 (i.e., a power-generating element including the first electrode layer 221 and second counter electrode layer 232), the second power-generating element 212 (i.e., a power-generating element including the third electrode layer 223 and fourth counter electrode layer 234), the third power-generating element 213 (i.e., a power-generating element including the second electrode layer 222 and third counter electrode layer 233), the fourth power-generating element 214 (i.e., a power-generating element including the fifth electrode layer 225 and sixth counter electrode layer 236), the fifth power-generating element 215 (i.e., a power-generating element including the fourth electrode layer 224 and third counter electrode layer 233), a sixth power-generating element 216 (i.e., a power-generating element including the seventh electrode layer 227 and first counter electrode layer 231), and a seventh power-generating element 217 (i.e., a power-generating element including the sixth electrode layer 226 and seventh counter electrode layer 237) are strongly linked, and these power-generating elements are serially connected.

According to the above configuration, of the side faces of the battery, the side face where the fourth insulating portion 124 is situated (a side face of the battery that is different from the side faces where the first insulating portion 121, second insulating portion 122, and third insulating portion 123 are situated) can be covered by the fourth insulating portion 124. Accordingly, more side faces of the battery can be covered by the first insulating portion 121, second insulating portion 122, third insulating portion 123, and fourth insulating portion 124. Thus, the reliability of the battery can be further improved.

Note that the battery 2200 according to the second embodiment may further be provided with a sixth solid electrolyte layer 246 and a seventh solid electrolyte layer 247, as illustrated in FIGS. 20 through 22.

The sixth solid electrolyte layer 246 is situated between the seventh electrode layer 227 and the first counter electrode layer 231.

According to the above configuration, a single solid battery cell (sixth power-generating element 216) can be configured of the seventh electrode layer 227, first counter electrode layer 231, and sixth solid electrolyte layer 246.

The seventh solid electrolyte layer 247 is situated between the sixth electrode layer 226 and seventh counter electrode layer 237.

According to the above configuration, a single solid battery cell (seventh power-generating element 217) can be configured of the sixth electrode layer 226, seventh counter electrode layer 237, and seventh solid electrolyte layer 247.

Note that the fourth solid electrolyte layer 244 is situated between the fifth electrode layer 225 and the sixth counter electrode layer 236 in the battery 2200 according to the second embodiment.

Note that the first electrode layer 221, second electrode layer 222, third electrode layer 223, fourth electrode layer 224, fifth electrode layer 225, sixth electrode layer 226, seventh electrode layer 227, first counter electrode layer 231, second counter electrode layer 232, third counter electrode layer 233, fourth counter electrode layer 234, fifth counter electrode layer 235, sixth counter electrode layer 236, and seventh counter electrode layer 237 may each be formed in a range narrower than that of the first electroconductive portion 111, second electroconductive portion 112, third electroconductive portion 113, fourth electroconductive portion 114, fifth electroconductive portion 115, sixth electroconductive portion 116, seventh electroconductive portion 117, and eighth electroconductive portion 118, as illustrated in FIGS. 20 through 22.

The fourth solid electrolyte layer 244 may be disposed over a greater area than that of the fifth electrode layer 225 and sixth counter electrode layer 236, as illustrated in FIGS. 20 through 22. That is to say, the fourth solid electrolyte layer 244 may be formed covering the fifth electrode layer 225 and sixth counter electrode layer 236. Thus, short-circuiting of the fifth electrode layer 225 and sixth counter electrode layer 236 due to direct contact can be prevented.

Also, the sixth solid electrolyte layer 246 may be disposed over a greater area than that of the seventh electrode layer 227 and first counter electrode layer 231, as illustrated in FIGS. 20 through 22. That is to say, the sixth solid electrolyte layer 246 may be formed covering the seventh electrode layer 227 and first counter electrode layer 231. Thus, short-circuiting of the seventh electrode layer 227 and first counter electrode layer 231 due to direct contact can be prevented.

Also, the seventh solid electrolyte layer 247 may be disposed over a greater area than that of the sixth electrode layer 226 and seventh counter electrode layer 237, as illustrated in FIGS. 20 through 22. That is to say, the seventh solid electrolyte layer 247 may be formed covering the sixth electrode layer 226 and seventh counter electrode layer 237. Thus, short-circuiting of the sixth electrode layer 226 and seventh counter electrode layer 237 due to direct contact can be prevented.

The first solid electrolyte layer 241, second solid electrolyte layer 242, third solid electrolyte layer 243, fourth solid electrolyte layer 244, fifth solid electrolyte layer 245, sixth solid electrolyte layer 246, and seventh solid electrolyte layer 247 may be disposed in a range narrower than that of the first electroconductive portion 111, second electroconductive portion 112, third electroconductive portion 113, fourth electroconductive portion 114, fifth electroconductive portion 115, sixth electroconductive portion 116, seventh electroconductive portion 117, and eighth electroconductive portion 118, as illustrated in FIGS. 20 through 22. Alternatively, the range of formation of the first solid electrolyte layer 241, second solid electrolyte layer 242, third solid electrolyte layer 243, fourth solid electrolyte layer 244, fifth solid electrolyte layer 245, sixth solid electrolyte layer 246, and seventh solid electrolyte layer 247 may be the same range as the first electroconductive portion 111, second electroconductive portion 112, third electroconductive portion 113, fourth electroconductive portion 114, fifth electroconductive portion 115, sixth electroconductive portion 116, seventh electroconductive portion 117, and eighth electroconductive portion 118.

The fourth insulating portion 124 is linked to the seventh electroconductive portion 117 and eighth electroconductive portion 118. That is to say, one end of the fourth insulating portion 124 is connected (e.g., bonded) to the eighth edge region 148 that is an end of the seventh electroconductive portion 117. Further, another end of the fourth insulating portion 124 is connected (e.g., bonded) to the eighth electroconductive portion 118 (e.g., an end of the eighth electroconductive portion 118).

A connection method of at least one (e.g., both) of the seventh electroconductive portion 117 and eighth electroconductive portion 118 to the fourth insulating portion 124 may be different from the connection method of at least one (e.g., both) of the first electroconductive portion 111 and second electroconductive portion 112 to the first insulating portion 121, or may be the same.

Note that the first electrode layer 221, second electrode layer 222, third electrode layer 223, fourth electrode layer 224, fifth electrode layer 225, and seventh electrode layer 227 may be negative active material layers. The electrode material here is a negative active material. The first electroconductive portion 111 is a negative current collector. The second electroconductive portion 112, third electroconductive portion 113, fourth electroconductive portion 114, fifth electroconductive portion 115, sixth electroconductive portion 116, and seventh electroconductive portion 117 are bipolar current collectors. The first counter electrode layer 231, second counter electrode layer 232, third counter electrode layer 233, fourth counter electrode layer 234, fifth counter electrode layer 235, sixth counter electrode layer 236, and seventh counter electrode layer 237 are positive active material layers. The counter electrode material is a positive active material. The eighth electroconductive portion 118 is a positive current collector.

Alternatively, the first electrode layer 221, second electrode layer 222, third electrode layer 223, fourth electrode layer 224, fifth electrode layer 225, sixth electrode layer 226, and seventh electrode layer 227 may be positive active material layers. The electrode material here is a positive active material. The first electroconductive portion 111 is a positive current collector. The second electroconductive portion 112, third electroconductive portion 113, fourth electroconductive portion 114, fifth electroconductive portion 115, sixth electroconductive portion 116, and seventh electroconductive portion 117 are bipolar current collectors. The first counter electrode layer 231, second counter electrode layer 232, third counter electrode layer 233, fourth counter electrode layer 234, fifth counter electrode layer 235, sixth counter electrode layer 236, and seventh counter electrode layer 237 are negative active material layers. The counter electrode material is a negative active material. The eighth electroconductive portion 118 is a negative current collector.

Note that the third electroconductive portion 113, fourth electroconductive portion 114, fifth electroconductive portion 115, sixth electroconductive portion 116, seventh electroconductive portion 117, and eighth electroconductive portion 118 are members having electroconductivity. The configurations of the first electroconductive portion 111, second electroconductive portion 112, the third electroconductive portion 113, fourth electroconductive portion 114, fifth electroconductive portion 115, sixth electroconductive portion 116, seventh electroconductive portion 117, and eighth electroconductive portion 118 (e.g., thicknesses, area, shape, materials included, etc.) may be the same as each other, or may be different.

An adhesion portion similar to that of the second electroconductive portion 112 (i.e., the second adhesion portion) may be disposed on the third electroconductive portion 113. That is to say, the second adhesion portion may be disposed between the third rear face region 163 and fourth rear face region 164. The second adhesion portion is a member that adheres the third rear face region 163 and fourth rear face region 164 to each other.

An adhesion portion similar to that of the second electroconductive portion 112 (i.e., a third adhesion portion) may be disposed on the fifth electroconductive portion 115. That is to say, the third adhesion portion may be disposed between the fifth rear face region 165 and sixth rear face region 166. The third adhesion portion is a member that adheres the fifth rear face region 165 and sixth rear face region 166 to each other.

An adhesion portion similar to that of the second electroconductive portion 112 (i.e., a fourth adhesion portion) may be disposed on the seventh electroconductive portion 117. That is to say, the fourth adhesion portion may be disposed between the seventh rear face region 167 and eighth rear face region 168. The fourth adhesion portion is a member that adheres the seventh rear face region 167 and eighth rear face region 168 to each other.

The second insulating portion 122, third insulating portion 123, and fourth insulating portion 124 are members formed of insulating material (i.e., material having no electroconductivity or sufficiently low electroconductivity). Configurations of the first insulating portion 121, second insulating portion 122, third insulating portion 123, and fourth insulating portion 124 (e.g., thicknesses, area, shape, materials included, etc.) may be the same as each other, or may be different.

The third power-generating element 213, fourth power-generating element 214, fifth power-generating element 215, sixth power-generating element 216, and seventh power-generating element 217 are power-generating units having charging and discharging properties (e.g., a secondary battery), for example. The third power-generating element 213, fourth power-generating element 214, fifth power-generating element 215, sixth power-generating element 216, and seventh power-generating element 217 may be battery cells, or fully-solid batteries, for example. Configurations of the first power-generating element 211, fourth power-generating element 214, fifth power-generating element 215, sixth power-generating element 216, and seventh power-generating element 217 (e.g., thicknesses, area of formation, shape, materials included, etc.) may be the same as each other, or may be different.

The third electrode layer 223, fourth electrode layer 224, fifth electrode layer 225, and seventh electrode layer 227 are layers including electrode material (e.g., active material). Configurations of the first electrode layer 221, second electrode layer 222, third electrode layer 223, fourth electrode layer 224, fifth electrode layer 225, and seventh electrode layer 227 (e.g., thicknesses, area of formation, shape, materials included, etc.) may be the same as each other, or may be different.

The third counter electrode layer 233, fourth counter electrode layer 234, fifth counter electrode layer 235, sixth counter electrode layer 236, and seventh counter electrode layer 237 are layers including counter electrode material (e.g., active material). Counter electrode material is material making up counter electrodes to the electrode material. Configurations of the first counter electrode layer 231, second counter electrode layer 232, third counter electrode layer 233, fourth counter electrode layer 234, fifth counter electrode layer 235, sixth counter electrode layer 236, and seventh counter electrode layer 237 (e.g., thicknesses, area, shape, materials included, etc., of the layers) may be the same as each other, or may be different.

The third solid electrolyte layer 243, fourth solid electrolyte layer 244, fifth solid electrolyte layer 245, sixth solid electrolyte layer 246, and seventh solid electrolyte layer 247 are solid electrolyte layers including a solid electrolyte. Configurations of the first solid electrolyte layer 241, second solid electrolyte layer 242, third solid electrolyte layer 243, fourth solid electrolyte layer 244, fifth solid electrolyte layer 245, sixth solid electrolyte layer 246, and seventh solid electrolyte layer 247 (e.g., thicknesses, area, shape, materials included, etc., of the layers) may be the same as each other, or may be different.

Figure 23:
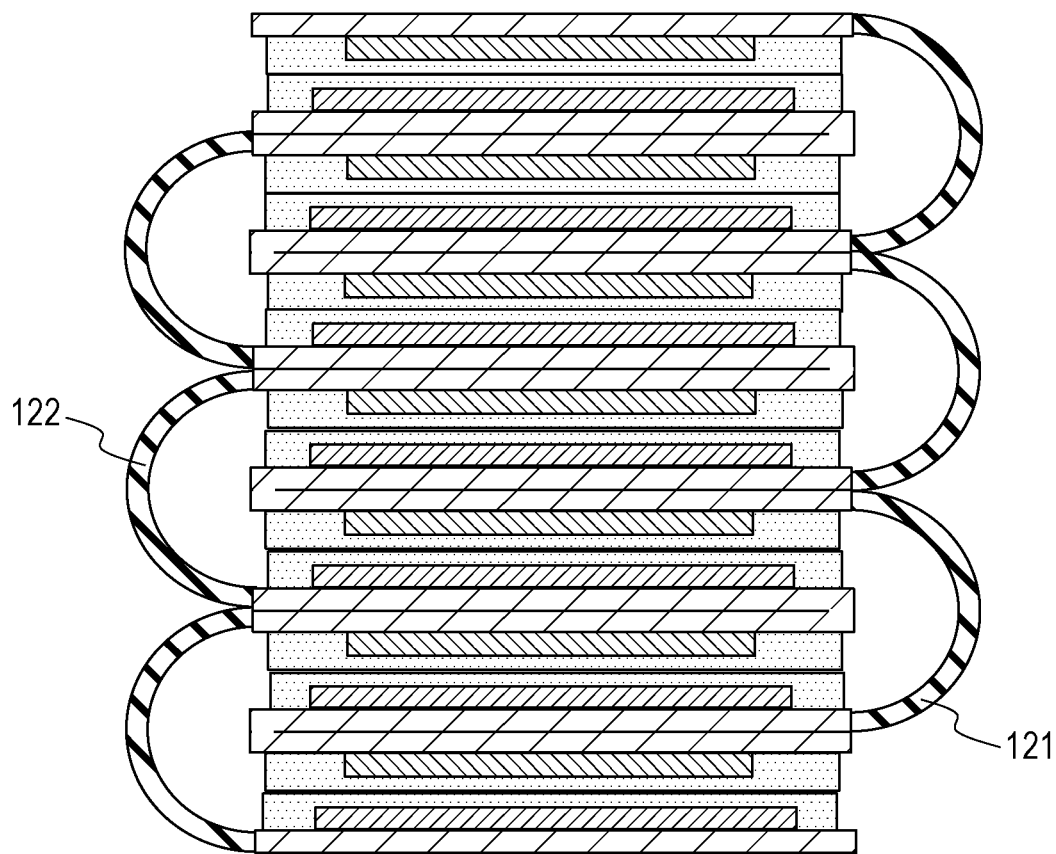
FIG. 23 is an x-z diagram (cross-sectional view) illustrating a schematic configuration of a battery according to the second embodiment.

FIG. 23 is an x-z diagram (cross-sectional view) illustrating a schematic configuration of a battery 2300 according to the second embodiment.

The battery 2300 according to the second embodiment has multiple insulating portions on a side face where the first insulating portion 121 is situated (i.e., one of the side faces of the battery 2300). Further provided are multiple electroconductive portions linked to each other by the multiple insulating portions. These multiple electroconductive portions and multiple insulating portions make up the first current collector 101 along with the first electroconductive portion 111, second electroconductive portion 112, and first insulating portion 121.

The battery 2300 according to the second embodiment also has multiple insulating portions on a side face where the second insulating portion 122 is situated (i.e., one of the side faces of the battery 2300). Further provided are multiple electroconductive portions linked to each other by the multiple insulating portions. These multiple electroconductive portions and multiple insulating portions make up the second current collector 102 along with the third electroconductive portion 113, fourth electroconductive portion 114, and second insulating portion 122.

The third current collector 103 and fourth current collector 104 also may be configured having multiple electroconductive portions and multiple insulating portions in the second embodiment.

FIGS. 24A through 24D are perspective views illustrating schematic configurations of a battery according to the second embodiment.

Figure 24B:
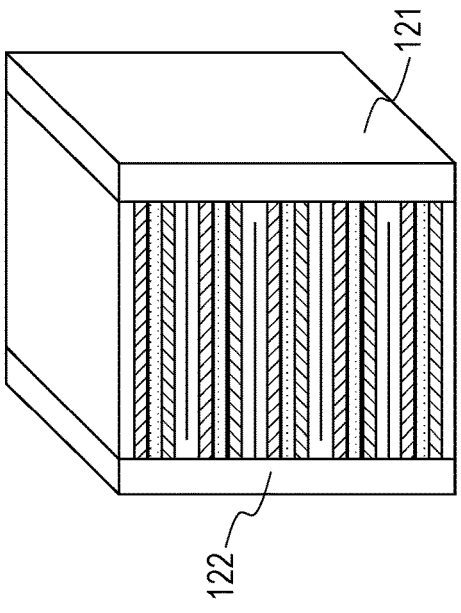
FIGS. 24A through 24D are perspective views illustrating schematic configurations of a battery according to the second embodiment.
Figure 24D:
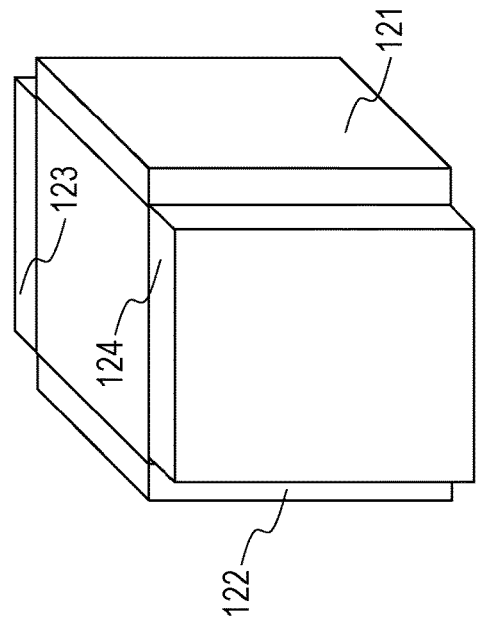
Figure 24A:
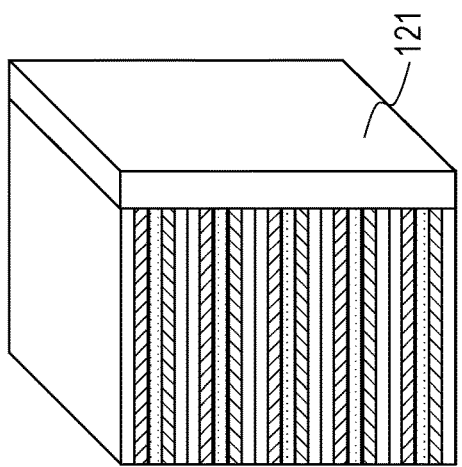

FIG. 24A illustrates a configuration where multiple insulating portions at a side face where the first insulating portion 121 is situated are folded and bonded so as to be bonded to each other.

FIG. 24B illustrates a configuration where multiple insulating portions at a side face where the second insulating portion 122 is situated are folded and bonded so as to be bonded to each other.

Figure 24C:
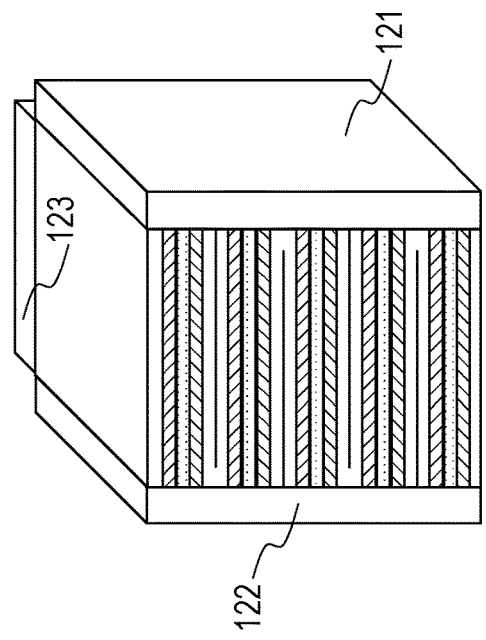

FIG. 24C illustrates a configuration where multiple insulating portions at a side face where the third insulating portion 123 is situated are folded and bonded so as to be bonded to each other.

FIG. 24D illustrates a configuration where multiple insulating portions at a side face where the fourth insulating portion 124 is situated are folded and bonded so as to be bonded to each other.

As described above, in a case where two, three, or four electrode strips (current collectors) are used, the side faces of the serially-laminated battery can be further covered by walls of integrated insulating portions from multiple directions, as illustrated in FIGS. 24A through 24D. Accordingly, a stronger serially-laminated battery can be obtained.

A manufacturing method of the battery according to the second embodiment will be described later as a third embodiment.

Third Embodiment

A third embodiment will be described below. Description that is redundant with that of the above-described first and second embodiments will be omitted as appropriate.

Figure 25:
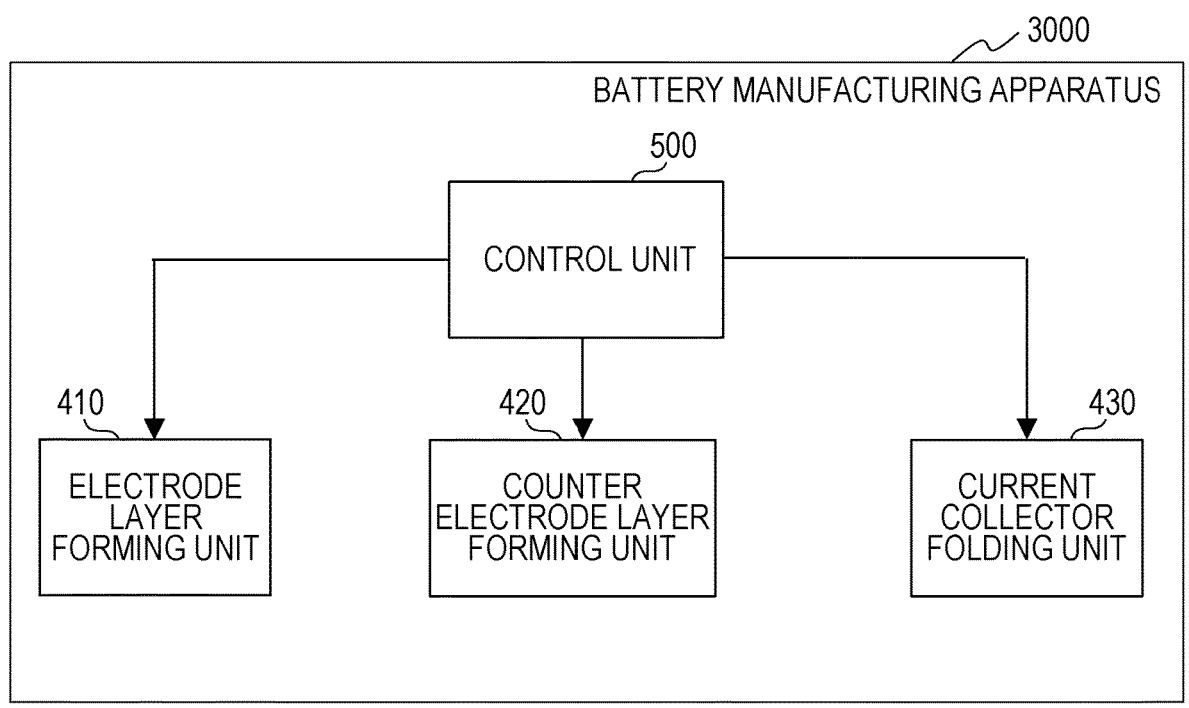
FIG. 25 is a diagram illustrating a schematic configuration of a battery manufacturing apparatus according to a third embodiment.

FIG. 25 is a diagram illustrating a schematic configuration of a battery manufacturing apparatus 3000 according to the third embodiment.

The battery manufacturing apparatus 3000 according to the third embodiment is provided with an electrode layer forming unit 410, a counter electrode layer forming unit 420, and a current collector folding unit 430.

The current collector folding unit 430 folds the first current collector 101.

The first current collector 101 has the first electroconductive portion 111, first insulating portion 121, and second electroconductive portion 112.

The second electroconductive portion 112 has the first edge region 141, the first front face region 151, the first rear face region 161, a first fold region 171, the second front face region 152, the second rear face region 162, and the second edge region 142.

The first front face region 151 is situated between the first edge region 141 and first fold region 171.

The first rear face region 161 is a region situated on the rear face of the first front face region 151.

The second front face region 152 is a region situated between the second edge region 142 and the first fold region 171.

The second rear face region 162 is a region situated on the rear face of the second front face region 152.

The first insulating portion 121 is a member linking the first electroconductive portion 111 and first edge region 141.

The electrode layer forming unit 410 forms the first electrode layer 221 in contact with the first electroconductive portion 111. The electrode layer forming unit 410 also forms the second electrode layer 222 in contact with the second front face region 152.

The counter electrode layer forming unit 420 forms the first counter electrode layer 231, which is the counter electrode of the first electrode layer 221, in contact with the first front face region 151.

The current collector folding unit 430 folds the first fold region 171. The current collector folding unit 430 also folds the first insulating portion 121.

Figure 26:
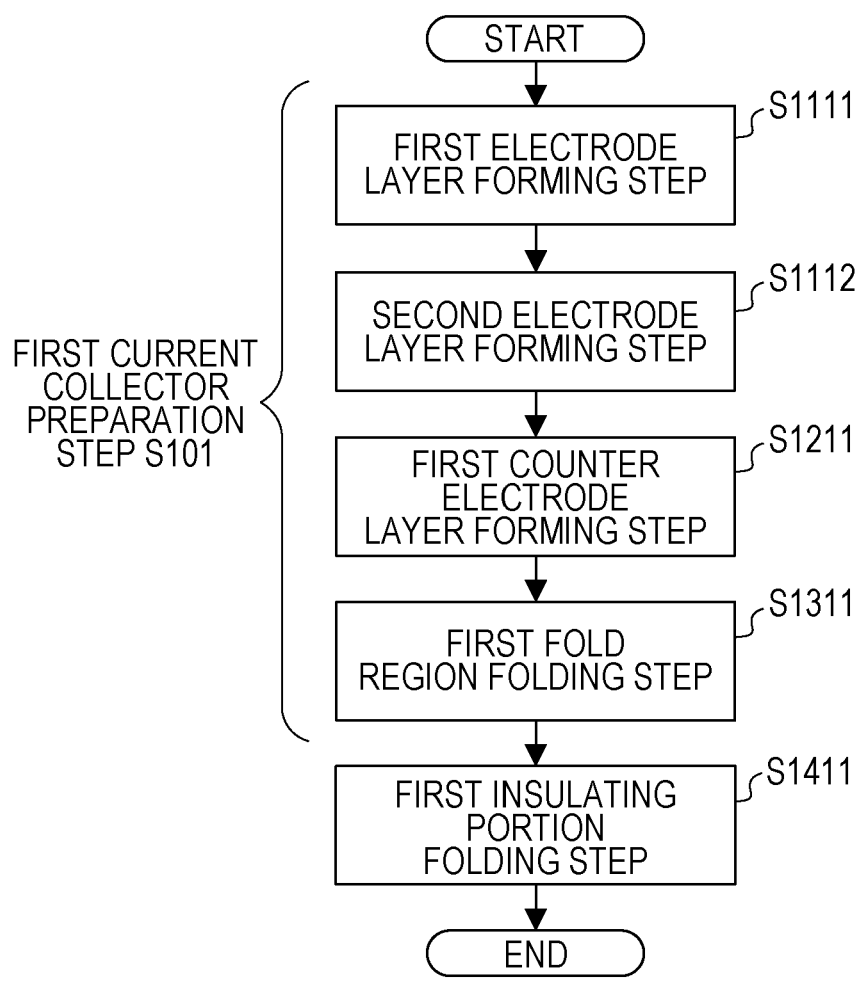
FIG. 26 is a flowchart illustrating an example of a battery manufacturing method according to the third embodiment.

FIG. 26 is a flowchart illustrating an example of a battery manufacturing method according to the third embodiment.

The battery manufacturing method according to the third embodiment is a battery manufacturing method using the battery manufacturing apparatus according to the third embodiment. For example, the battery manufacturing method according to the third embodiment is a battery manufacturing method executed at the battery manufacturing apparatus according to the third embodiment.

The battery manufacturing method according to the third embodiment includes a first electrode layer forming step S1111 (i.e., a step (a11)), a second electrode layer forming step S1112 (i.e., a step (a12)), a first counter electrode layer forming step S1211 (i.e., a step (b11)), a first fold region folding step S1311 (i.e., a step (c11)), and a first insulating portion folding step S1411 (i.e., a step (d11)).

The first electrode layer forming step S1111 is a step in which the first electrode layer 221 is formed in contact with the first electroconductive portion 111 by the electrode layer forming unit 410.

The second electrode layer forming step S1112 is a step where the second electrode layer 222 is formed in contact with the second front face region 152 by the electrode layer forming unit 410.

The first counter electrode layer forming step S1211 is a step where the first counter electrode layer 231, which is the counter electrode of the first electrode layer 221, is formed in contact with the first front face region 151 by the counter electrode layer forming unit 420.

The first fold region folding step S1311 is a step of folding at the first fold region 171 by the current collector folding unit 430.

In the first fold region folding step S1311, the first rear face region 161 and second rear face region 162 are positioned facing each other, due to the first current collector 101 being folded at the first fold region 171 by the current collector folding unit 430.

The first insulating portion folding step S1411 is a step of folding at the first insulating portion 121 by the current collector folding unit 430.

In the first insulating portion folding step S1411, the first electrode layer 221 and first counter electrode layer 231 are positioned facing each other, due to the first current collector 101 being folded at the first insulating portion 121 by the current collector folding unit 430.

According to the above configuration, the bonding strength among the component members of the battery can be further improved. That is to say, the first electrode layer 221 and first counter electrode layer 231 can each be formed on the first electroconductive portion 111 and second electroconductive portion 112 that are linked to each other by the first insulating portion 121. Accordingly, the positional relationship between the first electrode layer 221 disposed on the first electroconductive portion 111 and the first counter electrode layer 231 disposed on the second electroconductive portion 112 can be strongly maintained by the first insulating portion 121 (in other words, by the first current collector 101 that is a single component member). Also, the first counter electrode layer 231 and second electrode layer 222 can each be formed on the first front face region 151 and second front face region 152 (i.e., two regions that are partial regions of the first current collector 101 and are linked by the first fold portion 131). Accordingly, the positional relationship between the first counter electrode layer 231 disposed on the first front face region 151 and the second electrode layer 222 disposed on the second front face region 152 can be strongly maintained by the first fold portion 131 (in other words, by the first current collector 101 that is a single component member). Accordingly, the layers (or cells) making up the battery can be prevented from exhibiting positional shifting or separation due to shock, vibration, and so forth, when manufacturing the battery, for example. That is to say, the strength of bonding of the layers (e.g., the first electrode layer 221 and first counter electrode layer 231) making up the battery can be improved by the first current collector 101. Thus, reliability of the battery can be improved.

According to the above configuration, electrodes having a bipolar structure can be fabricated by a convenient single-face film formation process. That is to say, a bipolar current collector having the two poles of the first counter electrode layer 231 and second electrode layer 222 can be fabricated by the step of forming the first counter electrode layer 231 and second electrode layer 222 on one face of the first current collector 101 (i.e., the front face of the current collector where the first front face region 151 and second front face region 152 are situated), and the step of folding at the first fold region 171. Thus, bipolar-structure electrodes can be fabricated more conveniently and less expensively as compared to a case of using a process of forming films on both faces of the current collector.

The configurations illustrated as the first current collector 101 in the above-described first and second embodiments may be used for the configuration of the first current collector 101 (e.g., materials, thicknesses, etc.) as appropriate. Part of the first current collector 101 may have the configurations (materials) illustrated in any of FIGS. 7 through 10 described above.

A step encompassing the first electrode layer forming step S1111, second electrode layer forming step S1112, first counter electrode layer forming step S1211 and first fold region folding step S1311 will be referred to as "first current collector preparation step S101", as illustrated in FIG. 26. The order in which the steps making up the first current collector preparation step S101 are executed may be the same as the order of execution illustrated in FIG. 26, or may be different.

Note that in the first fold region folding step S1311, the first rear face region 161 and second rear face region 162 may come into contact with each other, due to the first current collector 101 being folded at the first fold region 171 by the current collector folding unit 430.

According to the above-described configuration, the first rear face region 161 and second rear face region 162 can be brought into contact by a convenient process (folding step). This enables electric conduction between the first rear face region 161 and second rear face region 162 that are in contact. Accordingly, electron mobility is realized at the first fold region 171 and also electron mobility is realized between the first rear face region 161 and second rear face region 162 in contact with each other, while improving the bonding strength among the component members of the battery by the first fold region 171.

Figure 27:
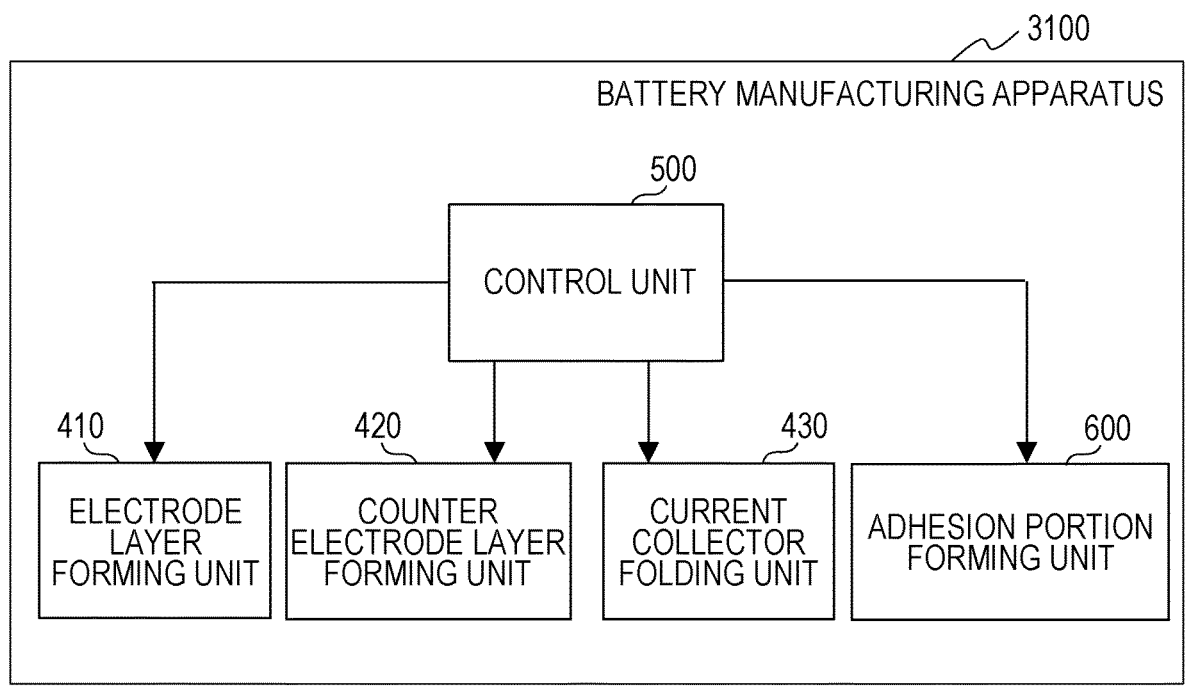
FIG. 27 is a diagram illustrating a schematic configuration of a battery manufacturing apparatus according to the third embodiment.

FIG. 27 is a diagram illustrating a schematic configuration of a battery manufacturing apparatus 3100 according to the third embodiment.

The battery manufacturing apparatus 3100 according to the third embodiment further has the following configuration, in addition to the configuration of the above-described battery manufacturing apparatus 3000 according to the third embodiment.

That is to say, the battery manufacturing apparatus 3100 according to the third embodiment is provided with an adhesion portion forming unit 600.

The adhesion portion forming unit 600 forms the first adhesion portion 301 for adhesion of the first rear face region 161 and second rear face region 162.

Figure 28:
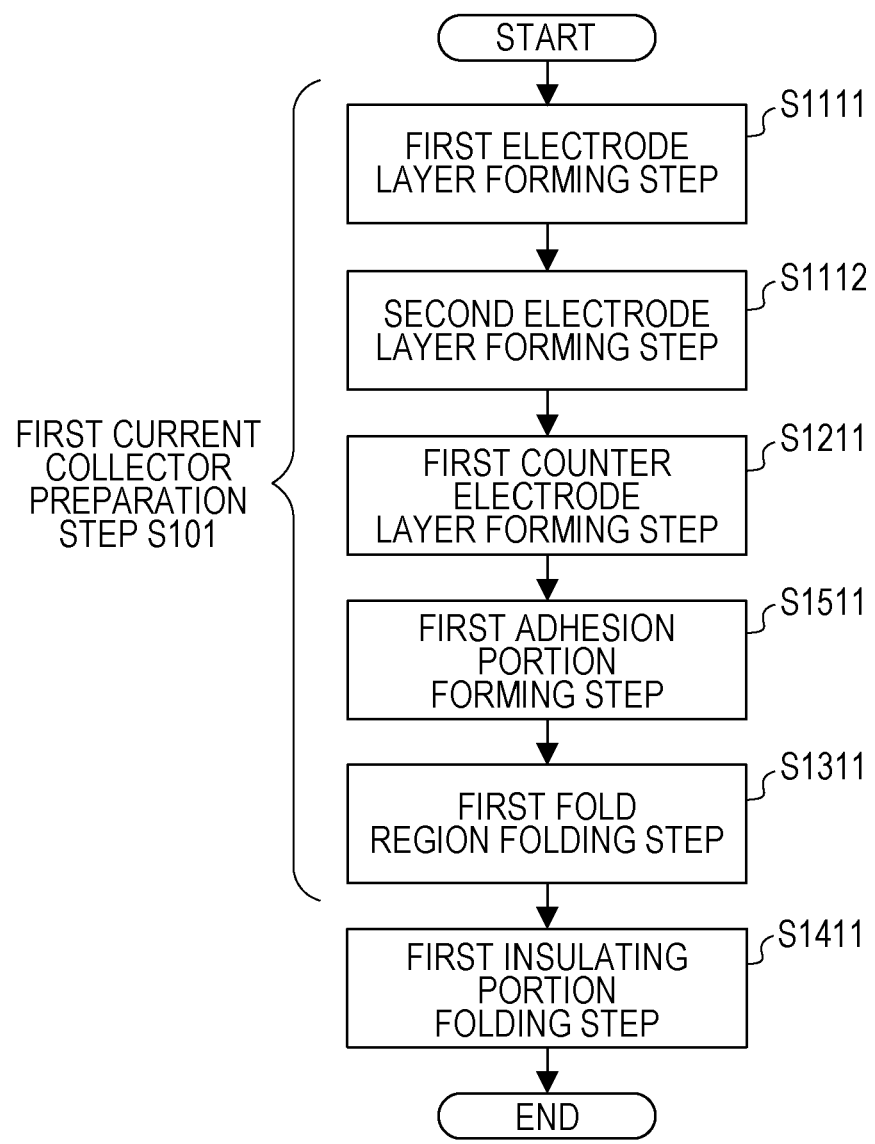
FIG. 28 is a flowchart illustrating an example of a battery manufacturing method according to the third embodiment.

FIG. 28 is a flowchart illustrating an example of a battery manufacturing method according to the third embodiment.

The battery manufacturing method illustrated in FIG. 28 includes the following step, in addition to the steps of the above-described battery manufacturing method illustrated in FIG. 26.

That is to say, the battery manufacturing method illustrated in FIG. 28 further includes a first adhesion portion forming step S1511 (i.e., a step (e1)).

The first adhesion portion forming step S1511 is a step of forming the first adhesion portion 301 in contact with at least one of the first rear face region 161 and second rear face region 162.

According to the above configuration, the bonding strength among the component members of the battery can be further strengthened. That is to say, the positional relationship between the first counter electrode layer 231 disposed on the first front face region 151 and the second electrode layer 222 disposed on the second front face region 152 can be more strongly maintained by the first adhesion portion 301, in addition to the first fold region 171. Accordingly, the layers (or cells) making up the battery can be prevented from exhibiting positional shifting or separation due to shock, vibration, and so forth, when manufacturing the battery or using the battery, for example. Thus, reliability of the battery can be improved.

Note that the first adhesion portion forming step S1511 may be performed before the first fold region folding step S1311, as illustrated in FIG. 28. In this case, the first adhesion portion 301 is formed in contact with at least one of the first rear face region 161 and second rear face region 162 by the adhesion portion forming unit 600, due to the first adhesion portion forming step S1511 being performed. The adhesion portion forming unit 600 may coat at least one of the first rear face region 161 and second rear face region 162 with a coating material (i.e., an adhesive agent making up the first adhesion portion 301) for example. Note that in the first adhesion portion forming step S1511, the adhesion portion forming unit 600 may form the first adhesion portion 301 in contact with both of the first rear face region 161 and second rear face region 162. Alternatively, the first adhesion portion 301 may be formed by the adhesion portion forming unit 600, in contact with only one of the first rear face region 161 and second rear face region 162. The first adhesion portion 301 can be disposed between the first rear face region 161 and second rear face region 162 by folding at the first current collector 101 on which the first adhesion portion 301 has been formed.

Alternatively, the first adhesion portion forming step S1511 may be performed after the first fold region folding step S1311. At this time, the first adhesion portion forming step S1511 may be a step of forming the first adhesion portion 301 by injecting adhesive material between the first rear face region 161 and the second rear face region 162.

Note that in the first adhesion portion forming step S1511, the first adhesion portion 301 may be formed non-continuously (e.g., in the form of islands) in contact with at least one of the first rear face region 161 and second rear face region 162, by the adhesion portion forming unit 600.

Note that the first current collector preparation step S101 may encompass the first adhesion portion forming step S1511, as illustrated in FIG. 28. The order in which the steps making up the first current collector preparation step S101 are executed may be the same as the order of execution illustrated in FIG. 28, or may be different.

Note that the first current collector 101 may include the second insulating portion 122 and third electroconductive portion 113.

The second insulating portion 122 is a member linking the second edge region 142 and third electroconductive portion 113.

The counter electrode layer forming unit 420 may form the second counter electrode layer 232, which is a counter electrode of the second electrode layer 222, in contact with the third electroconductive portion 113.

Also, the current collector folding unit 430 may fold the second insulating portion 122.

Figure 29:
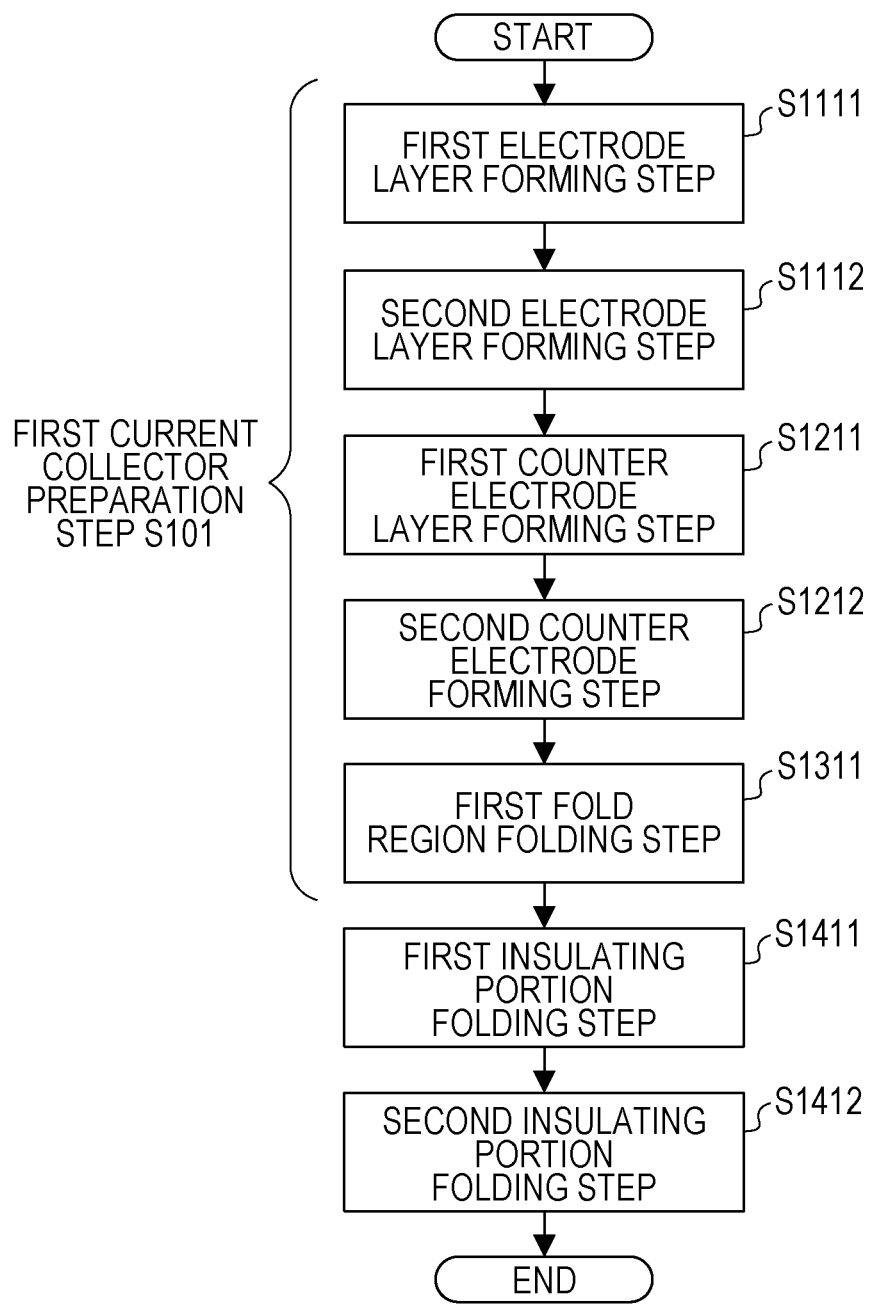
FIG. 29 is a flowchart illustrating an example of a battery manufacturing method according to the third embodiment.

FIG. 29 is a flowchart illustrating an example of a battery manufacturing method according to the third embodiment.

The battery manufacturing method illustrated in FIG. 29 further includes the following steps, in addition to the steps of the above-described battery manufacturing method illustrated in FIG. 26.

That is to say, the battery manufacturing method illustrated in FIG. 29 further includes a second counter electrode layer forming step S1212 (i.e., a step (b12)) and a second insulating portion folding step S1412 (i.e., a step (d12)).

The second counter electrode layer forming step S1212 is a step of forming the second counter electrode layer 232, which is the counter electrode of the second electrode layer 222, in contact with the third electroconductive portion 113, by the counter electrode layer forming unit 420.

The second insulating portion folding step S1412 is a step of folding at the second insulating portion 122 by the current collector folding unit 430.

In the second insulating portion folding step S1412, the second electrode layer 222 and second counter electrode layer 232 are positioned facing each other, due to the first current collector 101 being folded at the second insulating portion 122 by the current collector folding unit 430.

According to the above configuration, the bonding strength among the component members of the battery can be further improved. That is to say, the second electrode layer 222 and second counter electrode layer 232 can each be formed on the second electroconductive portion 112 and third electroconductive portion 113 that are linked to each other by the second insulating portion 122. Accordingly, the positional relationship between the second electrode layer 222 disposed on the second electroconductive portion 112 and the second counter electrode layer 232 disposed on the third electroconductive portion 113 can be strongly maintained by the second insulating portion 122 (in other words, by the first current collector 101 that is a single component member). Accordingly, the layers (or cells) making up the battery can be prevented from exhibiting positional shifting or separation due to shock, vibration, and so forth, when manufacturing the battery, for example. That is to say, the strength of bonding of the layers (e.g., the second electrode layer 222 and second counter electrode layer 232) making up the battery can be improved by the first current collector 101. Thus, reliability of the battery can be improved.

According to the above configuration, a laminated battery, where electrodes having a bipolar structure have been laminated, can be fabricated by a convenient folding process. That is to say, a laminated battery where power-generating elements are serially laminated can be fabricated by the step of folding at the first insulating portion 121 and second insulating portion 122 of the first current collector 101 where bipolar-structure electrodes (e.g., electrodes fabricated by the steps of forming the counter electrode layers and electrode layers on the first current collector 101) have been provided. Thus, a serial-structure laminated battery can be fabricated more conveniently and less expensively as compared to a case of using a process of laminating multiple individually separated bipolar-structure electrodes, while suppressing positional deviation of the component members.

Note that the first current collector preparation step S101 may encompass the second counter electrode layer forming step S1212. The order in which the steps making up the first current collector preparation step S101 are executed may be the same as the order of execution illustrated in FIG. 29, or may be different.

Figure 30:
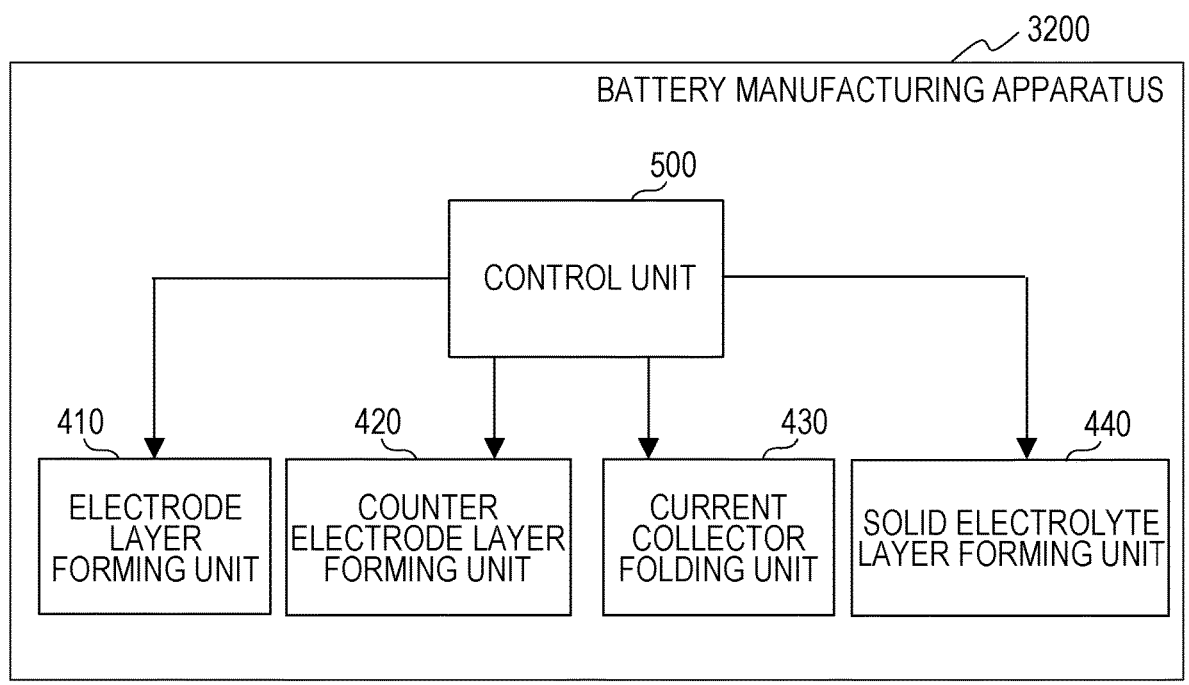
FIG. 30 is a diagram illustrating a schematic configuration of a battery manufacturing apparatus according to the third embodiment.

FIG. 30 is a diagram illustrating a schematic configuration of a battery manufacturing apparatus 3200 according to the third embodiment.

The battery manufacturing apparatus 3200 according to the third embodiment further includes the following configuration, in addition to the configuration of the above-described battery manufacturing apparatus 3000 according to the third embodiment.

That is to say, the battery manufacturing apparatus 3200 according to the third embodiment includes a solid electrolyte layer forming unit 440.

The solid electrolyte layer forming unit 440 forms the first solid electrolyte layer 241 on at least one of the first electrode layer 221 and first counter electrode layer 231. The solid electrolyte layer forming unit 440 also forms the second solid electrolyte layer 242 on at least one of the second electrode layer 222 and second counter electrode layer 232.

Figure 31:
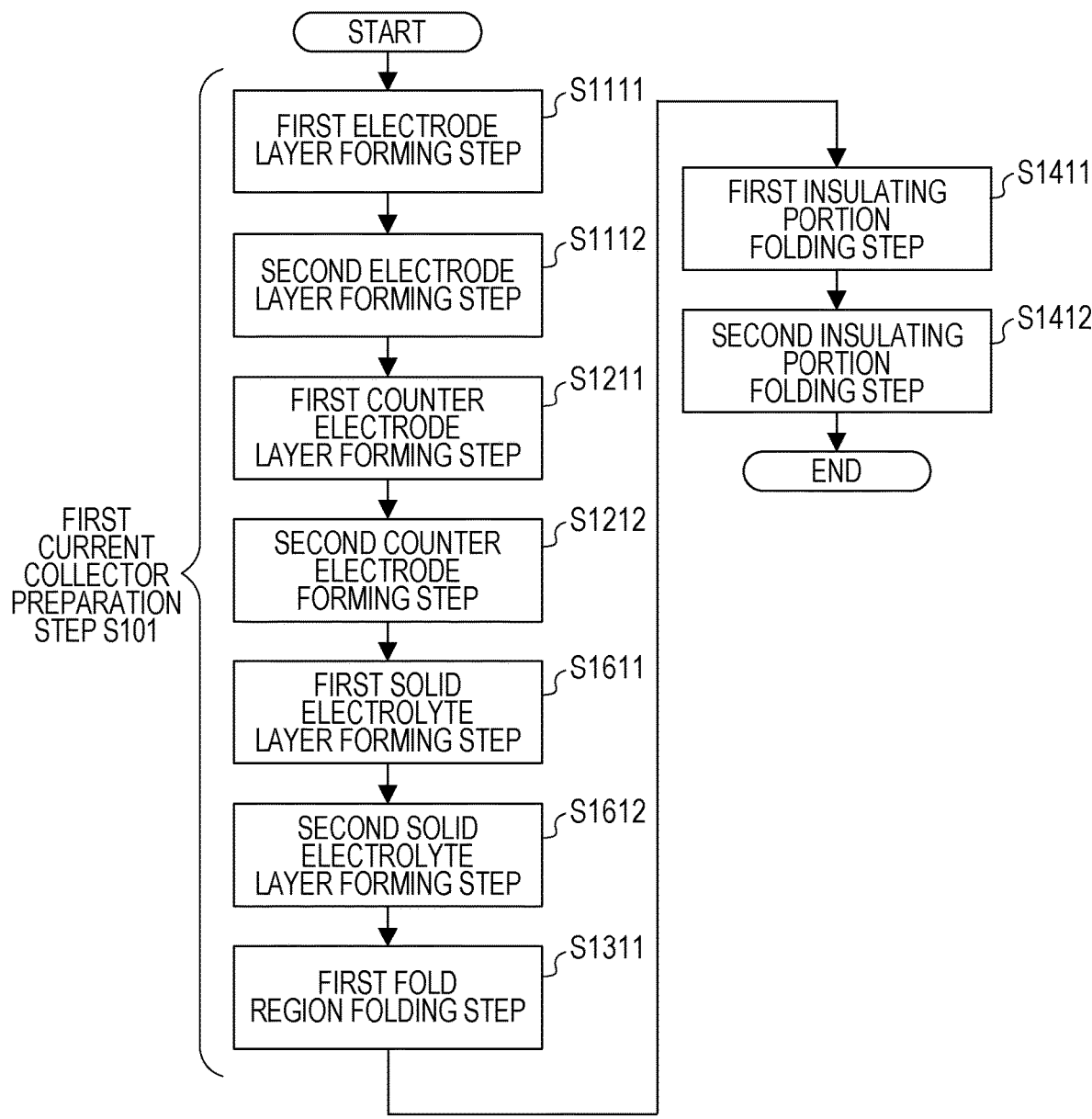
FIG. 31 is a flowchart illustrating an example of a battery manufacturing method according to the third embodiment.

FIG. 31 is a flowchart illustrating an example of a battery manufacturing method according to the third embodiment.

The battery manufacturing method illustrated in FIG. 31 further includes the following steps, in addition to the steps of the above-described battery manufacturing method illustrated in FIG. 29.

That is to say, the battery manufacturing method illustrated in FIG. 31 further includes a first solid electrolyte layer forming step S1611 (i.e., a step (f11)), and a second solid electrolyte layer forming step S1612 (i.e., a step (f12)).

The first solid electrolyte layer forming step S1611 is a step of forming the first solid electrolyte layer 241 on at least one of the first electrode layer 221 and first counter electrode layer 231 by the solid electrolyte layer forming unit 440.

The second solid electrolyte layer forming step S1612 is a step of forming the second solid electrolyte layer 242 on at least one of the second electrode layer 222 and second counter electrode layer 232 by the solid electrolyte layer forming unit 440.

According to the above configuration, a solid battery cell (first power-generating element 211 and second power-generating element 212) can be fabricated by a convenient folding process. Thus, the first power-generating element 211 and second power-generating element 212 can be fabricated with suppressed positional deviation of the component members, as compared with a case of using a process of laminating a great number of individual component members.

According to the above-described manufacturing apparatus or manufacturing method, the battery 1000 according to the first embodiment can be manufactured.

Note that the first current collector preparation step S101 may encompass the first solid electrolyte layer forming step S1611 and second solid electrolyte layer forming step S1612, as illustrated in FIG. 31. The order in which the steps making up the first current collector preparation step S101 are executed may be the same as the order of execution illustrated in FIG. 31, or may be different.

A specific example of the battery manufacturing method according to the third embodiment will be described below.

Figure 32:
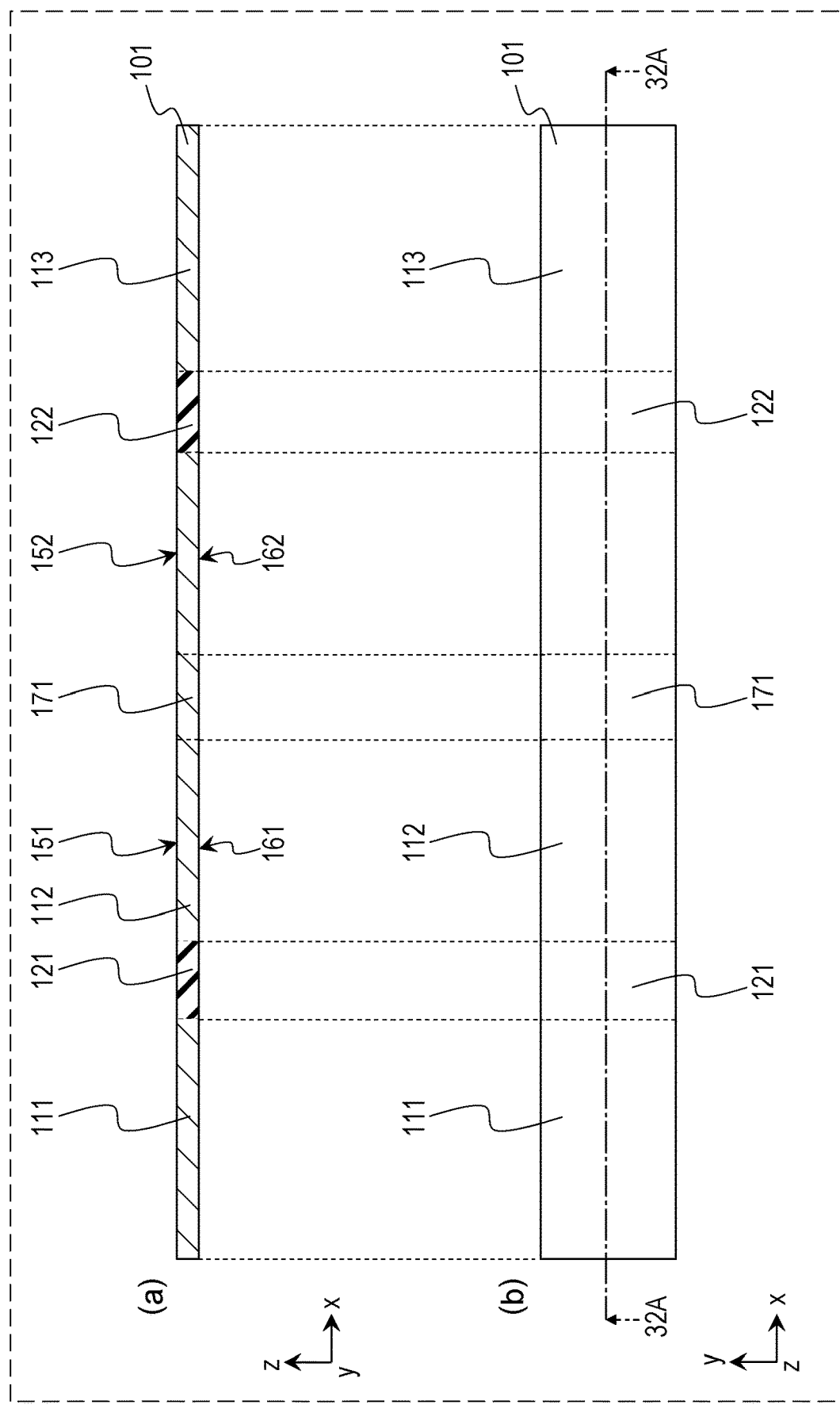
FIG. 32 is a diagram illustrating an example of a first current collector according to the third embodiment.

FIG. 32 is a diagram illustrating an example of the first current collector 101 according to the third embodiment.

Indicated by (a) in FIG. 32 is an x-z view (cross-sectional view taken along 32A in FIG. 32) illustrating a schematic configuration of an example of the first current collector 101 according to the third embodiment.

Indicated by (b) in FIG. 32 is an x-y view (plan view) illustrating a schematic configuration of an example of the first current collector 101 according to the third embodiment.

Figure 33:
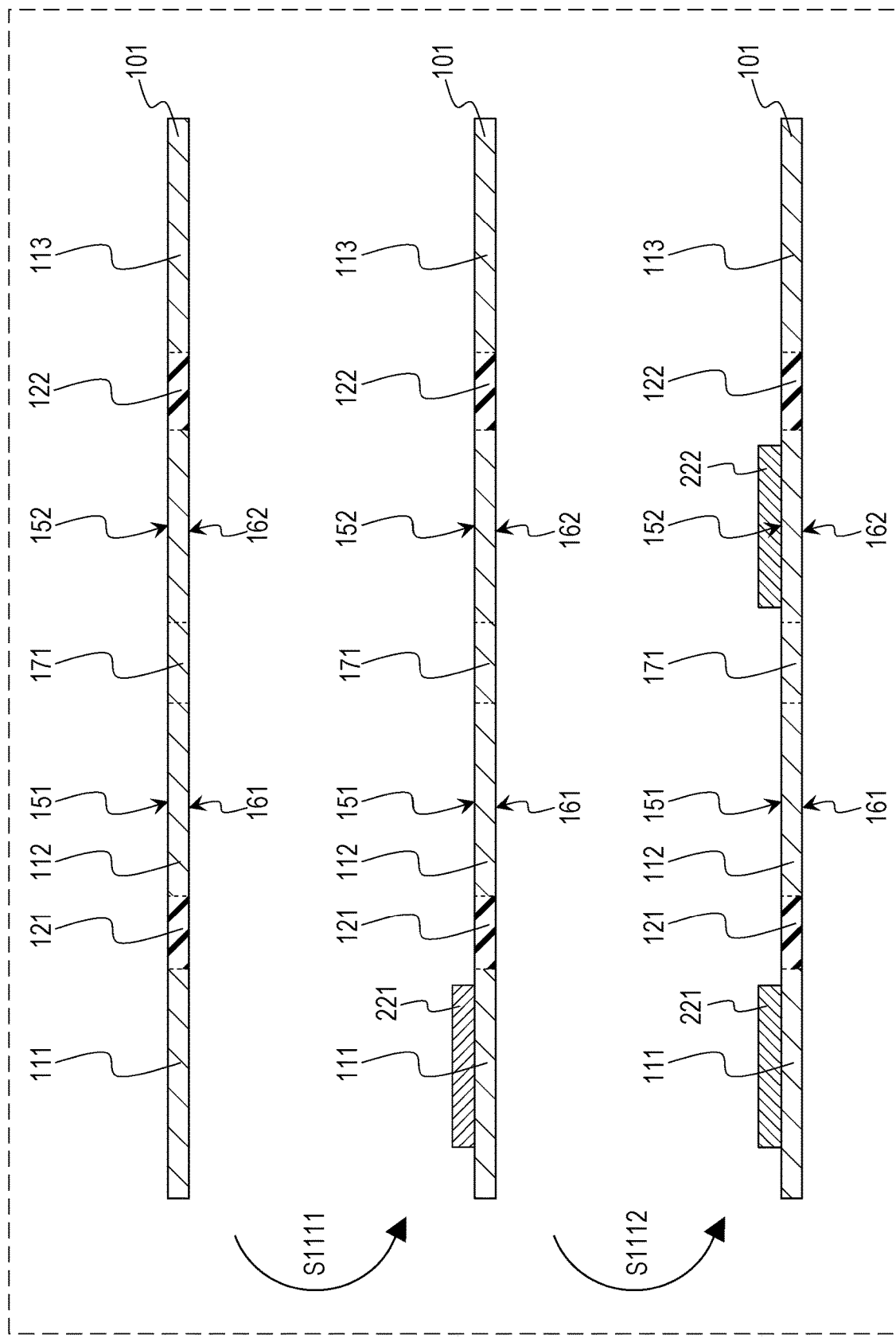
FIG. 33 is a diagram illustrating an example of a first electrode layer forming step and a second electrode layer forming step.

FIG. 33 is a diagram illustrating an example of the first electrode layer forming step S1111 and second electrode layer forming step S1112.

The first electrode layer 221 and second electrode layer 222 are each formed in contact with one principal face (e.g., the front face) of the first current collector 101, by the first electrode layer forming step S1111 and second electrode layer forming step S1112 being performed.

The electrode layer forming unit 410 may apply a coating material (a paste-like coating agent, in which the electrode materials making up the electrode layers have been kneaded with a solvent) on a principal face of the first current collector 101 prepared beforehand. The coating material may then be dried. The coating material may be pressed after drying. This enables the density of the material of the electrode layers to be increased.

Note that the order in which the first electrode layer forming step S1111 and second electrode layer forming step S1112 are executed may be optionally decided.

Thus, the electrode layers may be intermittently formed, having a regularity, on the principal face of the first current collector 101. For example, the electrode layers may be formed in rectangular regions at predetermined intervals, as illustrated in FIG. 33.

Figure 34:
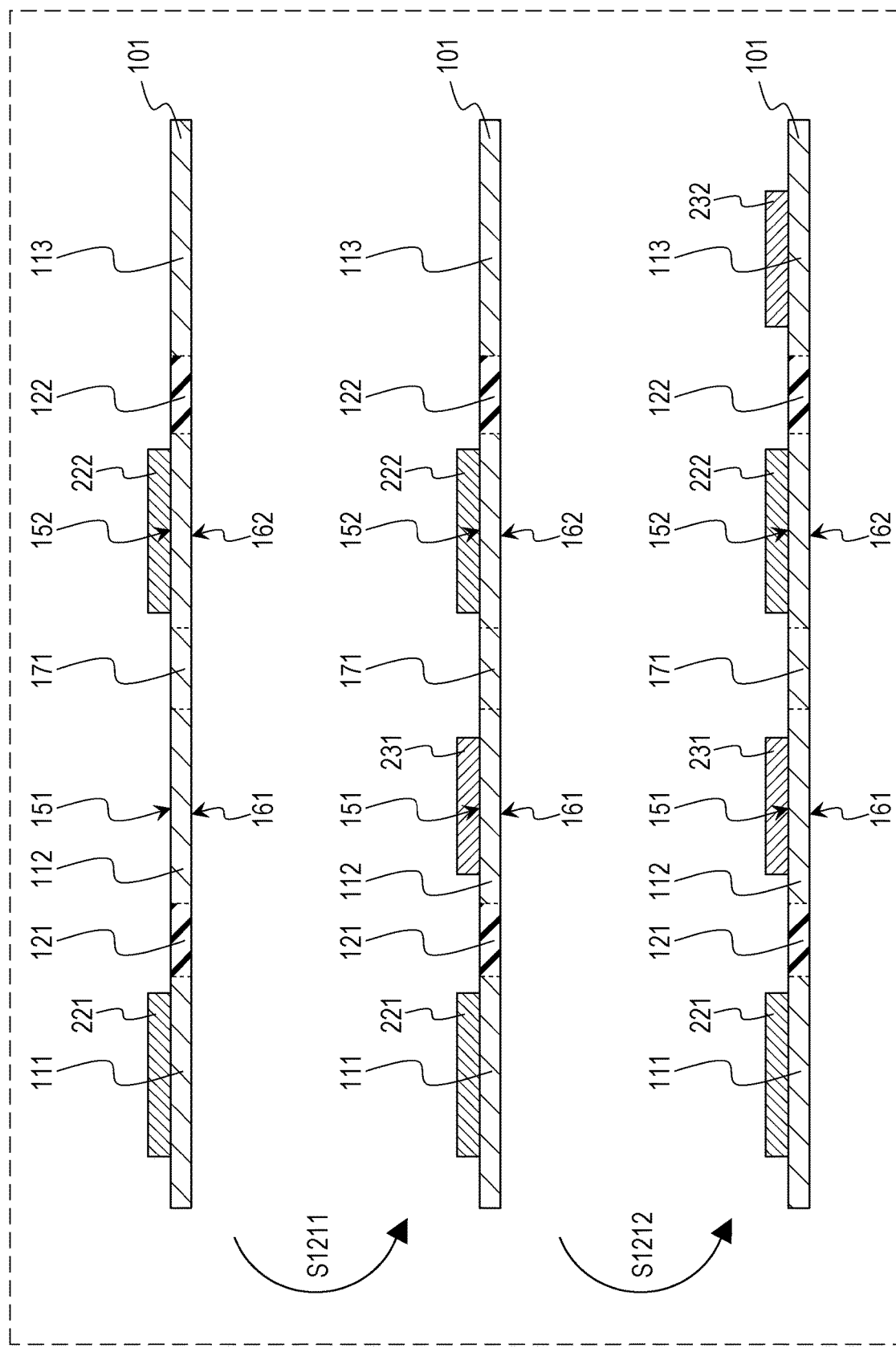
FIG. 34 is a diagram illustrating an example of a first counter electrode layer forming step and a second counter electrode layer forming step.

FIG. 34 is a diagram illustrating an example of the first counter electrode layer forming step S1211 and second counter electrode layer forming step S1212.

The first counter electrode layer 231 and second counter electrode layer 232 are each formed in contact with one principal face (e.g., the front face) of the first current collector 101, by the first counter electrode layer forming step S1211 and second counter electrode layer forming step S1212 being performed.

The counter electrode layer forming unit 420 may apply a coating material (a paste-like coating agent, in which the counter electrode materials making up the counter electrode layers have been kneaded with a solvent) on a principal face of the first current collector 101 prepared beforehand. The coating material may then be dried. The coating material may be pressed after drying. This enables the density of the material of the counter electrode layers to be increased.

Note that the order in which the first counter electrode layer forming step S1211 and second counter electrode layer forming step S1212 are executed may be optionally decided.

Thus, the counter electrode layers may be intermittently formed, having a regularity, on the principal face of the first current collector 101. For example, the counter electrode layers may be formed in rectangular regions at predetermined intervals, as illustrated in FIG. 34.

Note that the first counter electrode layer forming step S1211 and second counter electrode layer forming step S1212 may be executed before the first electrode layer forming step S1111 and second electrode layer forming step S1112, or may be executed after.

Figure 35:
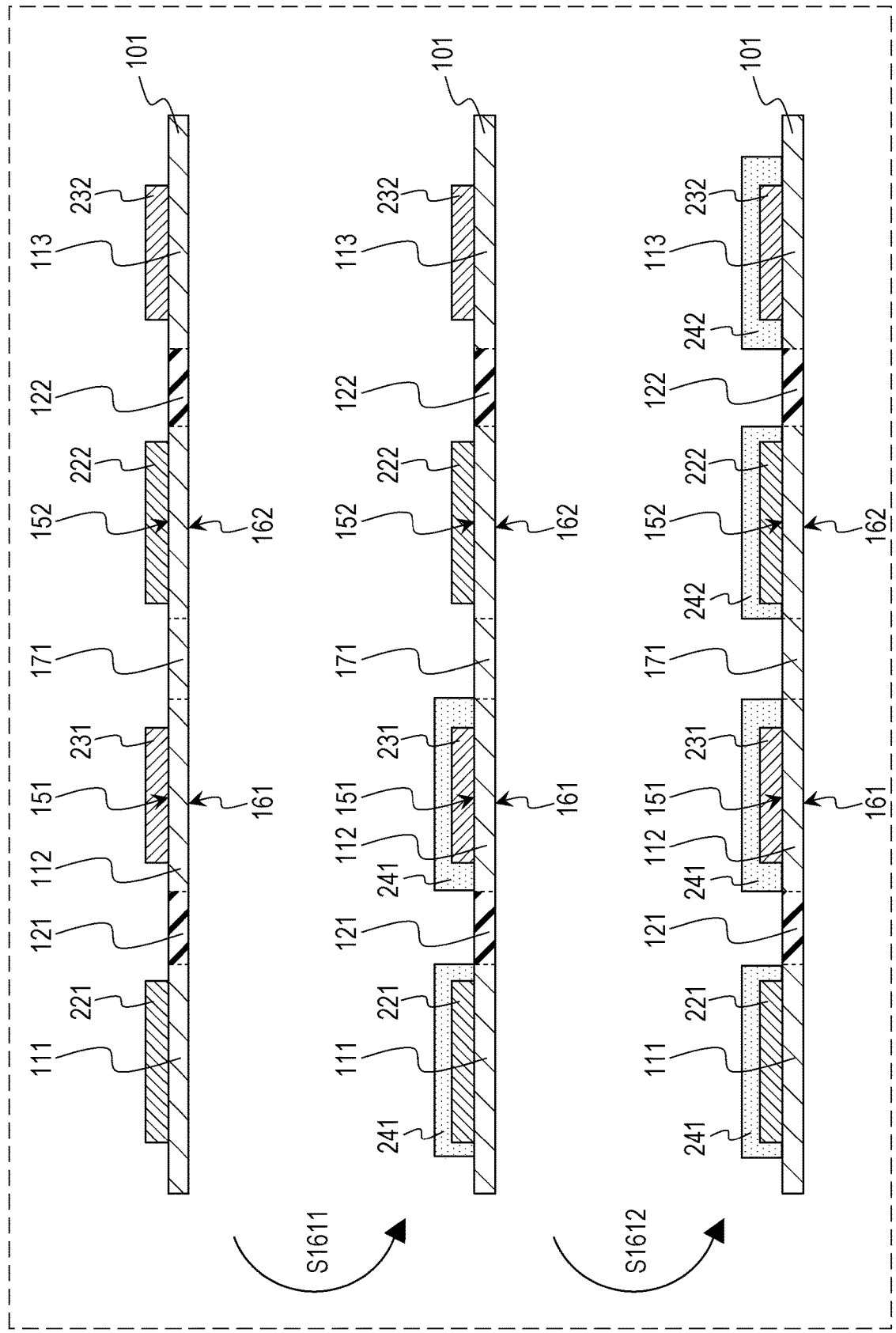
FIG. 35 is a diagram illustrating an example of a first solid electrolyte layer forming step and a second solid electrolyte layer forming step.

FIG. 35 is a diagram illustrating an example of the first solid electrolyte layer forming step S1611 and second solid electrolyte layer forming step S1612.

The solid electrolyte layer forming unit 440 may apply a coating material (a paste-like coating agent, in which the materials making up the solid electrolyte layers have been kneaded with a solvent) on at least one of the counter electrode layers and the electrode layers. The coating material may then be dried. The coating material may be pressed after drying. This enables the density of the solid electrolyte layers to be increased.

Note that in the first solid electrolyte layer forming step S1611, the first solid electrolyte layer 241 may be formed over a greater area than the first electrode layer 221 and first counter electrode layer 231. Accordingly, the first solid electrolyte layer 241 can be disposed in contact with the first electroconductive portion 111 and second electroconductive portion 112.

Also note that in the second solid electrolyte layer forming step S1612, the second solid electrolyte layer 242 may be formed over a greater area than the second electrode layer 222 and second counter electrode layer 232, as illustrated in FIG. 35. Accordingly, the second solid electrolyte layer 242 can be disposed in contact with the second electroconductive portion 112 and third electroconductive portion 113.

Note that the order in which the first solid electrolyte layer forming step S1611 and second solid electrolyte layer forming step S1612 are executed may be optionally decided.

FIG. 36 is an x-z diagram (cross-sectional view) illustrating an example of the first fold region folding step S1311, first insulating portion folding step S1411, and second insulating portion folding step S1412.

The current collector folding unit 430 may have a first folding member 611, a second folding member 612, and a third folding member 613 (e.g., rod members, wire members, etc.), for example. The current collector folding unit 430 may at this time apply the folding members against the first fold region 171, first insulating portion 121, and second insulating portion 122, and move at least one of the first current collector 101 and the folding members, thereby folding at the first fold region 171, first insulating portion 121, and second insulating portion 122.

Folding at the first fold region 171 in the first fold region folding step S1311 forms the first fold portion 131 illustrated in the first and second embodiments described above.

The order of executing the first fold region folding step S1311, first insulating portion folding step S1411, and second insulating portion folding step S1412 may be optionally decided. For example, the first fold region folding step S1311, first insulating portion folding step S1411, and second insulating portion folding step S1412 may be executed at the same time, as illustrated in FIG. 36.

According to a specific example of the above-described battery manufacturing method according to the third embodiment, the above-described battery 1000 according to the first embodiment can be fabricated.

Note that the solid electrolyte layers may be formed on both the electrode layers and counter electrode layers due to the solid electrolyte layer forming steps being executed, as illustrated in FIG. 35. In this case, the solid electrolyte layer forming steps are executed after the electrode layer forming steps and counter electrode layer forming steps.

FIGS. 37A through 37C are x-z diagrams (cross-sectional views) illustrating schematic configurations of the first current collector 101 where electrode layers, counter electrode layers, and solid electrolyte layers have been formed.

The solid electrolyte layers may be formed on only the electrode layers due to the solid electrolyte layer forming steps being executed, as illustrated in FIG. 37A. In this case, the solid electrolyte layer forming steps are executed after the electrode layer forming steps.

Alternatively, the solid electrolyte layers may be formed on only the counter electrode layers due to the solid electrolyte layer forming steps being executed, as illustrated in FIG. 37B. In this case, the solid electrolyte layer forming steps are executed after counter electrode layer forming steps.

Alternatively, the solid electrolyte layers may be formed on both the electrode layers and counter electrode layers, and moreover upon the first fold region 171, the electroconductive portions, and the insulating portions, due to the solid electrolyte layer forming steps being executed, as illustrated in FIG. 37C. In this case, the solid electrolyte layer forming steps are executed after the electrode layer forming steps and counter electrode layer forming steps. Thus, the solid electrolyte layers can be consecutively formed. Accordingly, the steps of forming the solid electrolyte layers can be further simplified. Moreover, in a case where the material making up the first solid electrolyte layer 241 and the second solid electrolyte layer 242 is the same (i.e., the coating material to become the first solid electrolyte layer 241 and the second solid electrolyte layer 242 is the same), The first solid electrolyte layer forming step S1611 and second solid electrolyte layer forming step S1612 may be executed consecutively. This enables the steps for forming the solid electrolyte layers to be further simplified.

In a case where the solid electrolyte layers are non-continuously formed, as illustrated in FIGS. 37A and 37B, the amount of material being coated can be reduced. Further, by not coating the solid electrolyte layers on the insulating portions, cracks occur less readily in the solid electrolyte layers when folding at the insulating portions.

Note that in the third embodiment, the first solid electrolyte layer 241 may be formed on a portion of the first fold region 171 by the solid electrolyte layer forming unit 440 in the first solid electrolyte layer forming step S1611, or alternatively, the second solid electrolyte layer 242 may be formed on a portion of the first fold region 171 by the solid electrolyte layer forming unit 440 in the second solid electrolyte layer forming step S1612.

According to the above-described configuration, processing to prevent the first fold region 171 from being exposed can be executed in the steps of forming the solid electrolyte layers (at least one of the first solid electrolyte layer 241 and second solid electrolyte layer 242). That is to say, exposure of the first fold region 171 can be prevented with a simple process.

Note that both the first solid electrolyte layer 241 and second solid electrolyte layer 242 may be formed on part of the first fold region 171, as illustrated in FIG. 37C.

According to the above-described battery manufacturing method, the above-described battery 1100 according to the first embodiment can be fabricated.

Note that the first current collector 101 may have the third insulating portion 123 and the fourth electroconductive portion 114.

Also, the third electroconductive portion 113 may have the third edge region 143, the third front face region 153, the third rear face region 163, a second fold region 172, the fourth front face region 154, the fourth rear face region 164, and the fourth edge region 144.

The third front face region 153 is a region situated between the third edge region 143 and second fold region 172.

The third rear face region 163 is a region situated on the rear face of the third front face region 153.

The fourth front face region 154 is a region situated between the fourth edge region 144 and the second fold region 172.

The fourth rear face region 164 is a region situated on the rear face of the fourth front face region 154.

The second insulating portion 122 is a member linking the second edge region 142 and third edge region 143.

The third insulating portion 123 is a member linking the fourth edge region 144 and the fourth electroconductive portion 114.

The electrode layer forming unit 410 may form the third electrode layer 223 in contact with the fourth front face region 154.

The counter electrode layer forming unit 420 may form the third counter electrode layer 233, which is the counter electrode of the third electrode layer 223, in contact with the fourth electroconductive portion 114.

The current collector folding unit 430 may fold at the second fold region 172. The current collector folding unit 430 may also fold at the third insulating portion 123.

Figure 38:
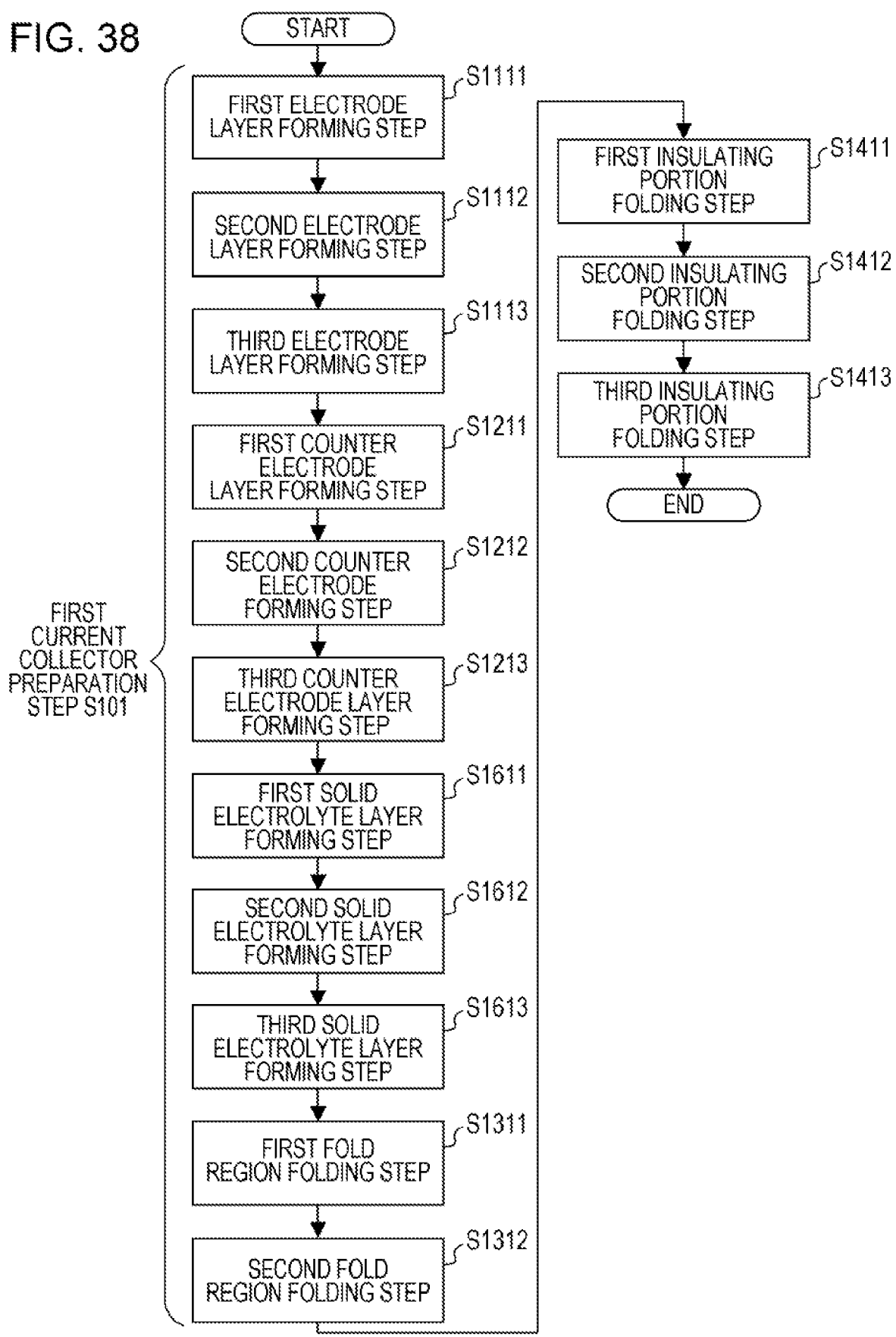
FIG. 38 is a flowchart illustrating an example of a battery manufacturing method according to the third embodiment.

FIG. 38 is a flowchart illustrating an example of a battery manufacturing method according to the third embodiment.

The battery manufacturing method illustrated in FIG. 38 further includes the following steps, in addition to the steps of the above-described battery manufacturing method illustrated in FIG. 31.

The battery manufacturing method illustrated in FIG. 38 further includes a third electrode layer forming step S1113 (i.e., a step (a13)), a third counter electrode layer forming step S1213 (i.e., a step (b13)), a third solid electrolyte layer forming step S1613 (i.e., a step (f13)), a second fold region folding step S1312 (i.e., a step (c12)), and a third insulating portion folding step S1413 (i.e., a step (d13)).

The third electrode layer forming step S1113 is a step of forming the third electrode layer 223 in contact with the fourth front face region 154 by the electrode layer forming unit 410.

The third counter electrode layer forming step S1213 is a step of forming the third counter electrode layer 233, which is a counter electrode of the third electrode layer 223, in contact with the fourth electroconductive portion 114, by the counter electrode layer forming unit 420.

The second fold region folding step S1312 is a step of folding at the second fold region 172 by the current collector folding unit 430.

The third rear face region 163 and fourth rear face region 164 are positioned facing each other, due to the first current collector 101 being folded at the second fold region 172 by the current collector folding unit 430 in the second fold region folding step S1312.

The third insulating portion folding step S1413 is a step of folding at the third insulating portion 123 by the current collector folding unit 430.

The third electrode layer 223 and third counter electrode layer 233 are positioned facing each other, due to the first current collector 101 being folded at the third insulating portion 123 by the current collector folding unit 430 in the third insulating portion folding step S1413.

According to the above configuration, the bonding strength among the component members of the battery can be further improved. That is to say, the third electrode layer 223 and third counter electrode layer 233 can each be formed on the third electroconductive portion 113 and fourth electroconductive portion 114 that are linked to each other by the third insulating portion 123. Accordingly, the positional relationship between the third electrode layer 223 disposed on the third electroconductive portion 113 and the third counter electrode layer 233 disposed on the fourth electroconductive portion 114 can be strongly maintained by the third insulating portion 123 (in other words, by the first current collector 101 that is a single component member). Also, the second counter electrode layer 232 and third electrode layer 223 can each be formed on the third front face region 153 and fourth front face region 154 (i.e., two regions that are partial regions of the first current collector 101 and are linked by the second fold portion 132). Accordingly, the positional relationship between the second counter electrode layer 232 disposed on the third front face region 153 and the third electrode layer 223 disposed on the fourth front face region 154 can be strongly maintained by the second fold portion 132 (in other words, by the first current collector 101 that is a single component member). Accordingly, the layers (or cells) making up the battery can be prevented from exhibiting positional shifting or separation due to shock, vibration, and so forth, when manufacturing the battery, for example. That is to say, the strength of bonding of the layers (e.g., the third electrode layer 223 and third counter electrode layer 233) making up the battery can be improved by the first current collector 101. Thus, reliability of the battery can be improved.

According to the above configuration, electrodes having a bipolar structure can be fabricated by a convenient single-face film formation process. That is to say, a bipolar current collector having the two poles of the second counter electrode layer 232 and third electrode layer 223 can be fabricated by the step of forming the second counter electrode layer 232 and third electrode layer 223 on one face of the first current collector 101 (i.e., the front face of the current collector where the third front face region 153 and fourth front face region 154 are situated), and the step of folding at the second fold region 172. Thus, bipolar-structure electrodes can be fabricated more conveniently and less expensively as compared to a case of using a process of forming films on both faces of the current collector.

The second fold region 172 is folded in the second fold region folding step S1312, thereby forming the second fold portion 132 illustrated in the above-described irst and second embodiments.

The third solid electrolyte layer forming step S1613 is a step of forming the third solid electrolyte layer 243 on at least one of the third electrode layer 223 and third counter electrode layer 233 by the solid electrolyte layer forming unit 440.

According to the above configuration, the respective solid battery cells (the respective power-generating elements) can be fabricated by a convenient folding process. Thus, a laminated battery where multiple solid battery cells are serially laminated can be fabricated with suppressed positional deviation of the component members, as compared with a case of using a process of laminating a great number of individual component members.

According to the above-described manufacturing apparatus or manufacturing method, the battery 1300 according to the first embodiment can be manufactured.

Note that the first current collector preparation step S101 may encompass third electrode layer forming step S1113, third counter electrode layer forming step S1213, third solid electrolyte layer forming step S1613, and the second fold region folding step S1312, as illustrated in FIG. 38. The order in which the steps making up the first current collector preparation step S101 are executed may be the same as the order of execution illustrated in FIG. 38, or may be different.

Figure 39:
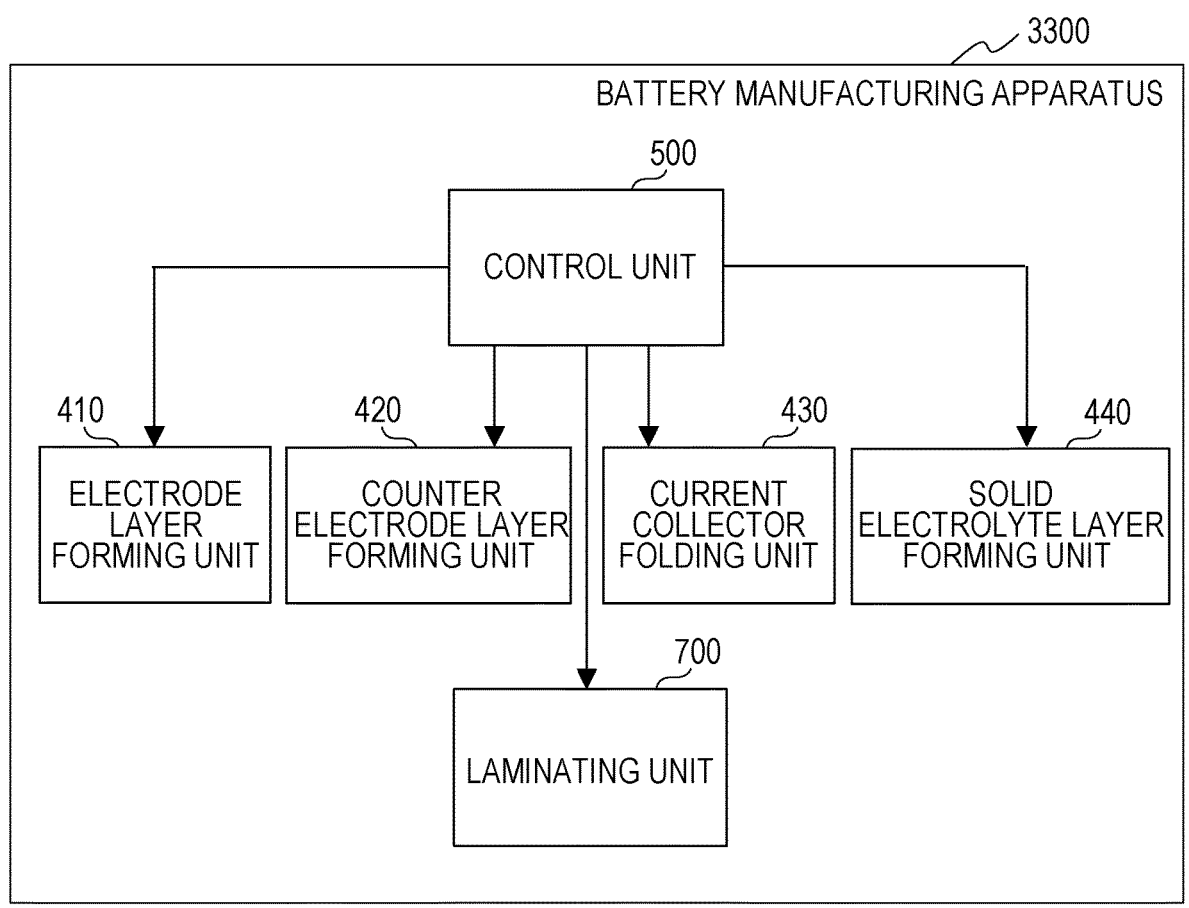
FIG. 39 is a diagram illustrating a schematic configuration of a battery manufacturing apparatus according to the third embodiment.

FIG. 39 is a diagram illustrating a schematic configuration of a battery manufacturing apparatus 3300 according to the third embodiment.

The battery manufacturing apparatus 3300 according to the third embodiment further includes the following configuration, in addition to the configuration of the above-described battery manufacturing apparatus 3200 according to the third embodiment.

That is to say, the battery manufacturing apparatus 3300 according to the third embodiment further includes a laminating unit 700.

The laminating unit 700 laminates the first current collector 101 and second current collector 102.

The second current collector 102 has the third electroconductive portion 113, second insulating portion 122, and fourth electroconductive portion 114.

The third electroconductive portion 113 has the third edge region 143, third front face region 153, third rear face region 163, second fold region 172, fourth front face region 154, fourth rear face region 164, and fourth edge region 144.

The third front face region 153 is a region situated between the third edge region 143 and second fold region 172.

The third rear face region 163 is a region situated on the rear face of the third front face region 153.

The fourth front face region 154 is a region situated between the fourth edge region 144 and the second fold region 172.

The fourth rear face region 164 is a region situated on the rear face of the fourth front face region 154.

The second insulating portion 122 is a member linking the fourth edge region 144 and fourth electroconductive portion 114.

The electrode layer forming unit 410 may form the third electrode layer 223 in contact with the fourth front face region 154.

The counter electrode layer forming unit 420 may form the second counter electrode layer 232, which is the counter electrode of the third electrode layer 223, in contact with the third front face region 153. The counter electrode layer forming unit 420 may also form the third counter electrode layer 233, which is the counter electrode of the third electrode layer 223, in contact with the fourth electroconductive portion 114.

The current collector folding unit 430 may fold at the second fold region 172. The current collector folding unit 430 may also fold at the second insulating portion 122.

The laminating unit 700 laminates the first current collector 101 and second current collector 102 with the first electrode layer 221 and second counter electrode layer 232 facing each other.

Figure 40:
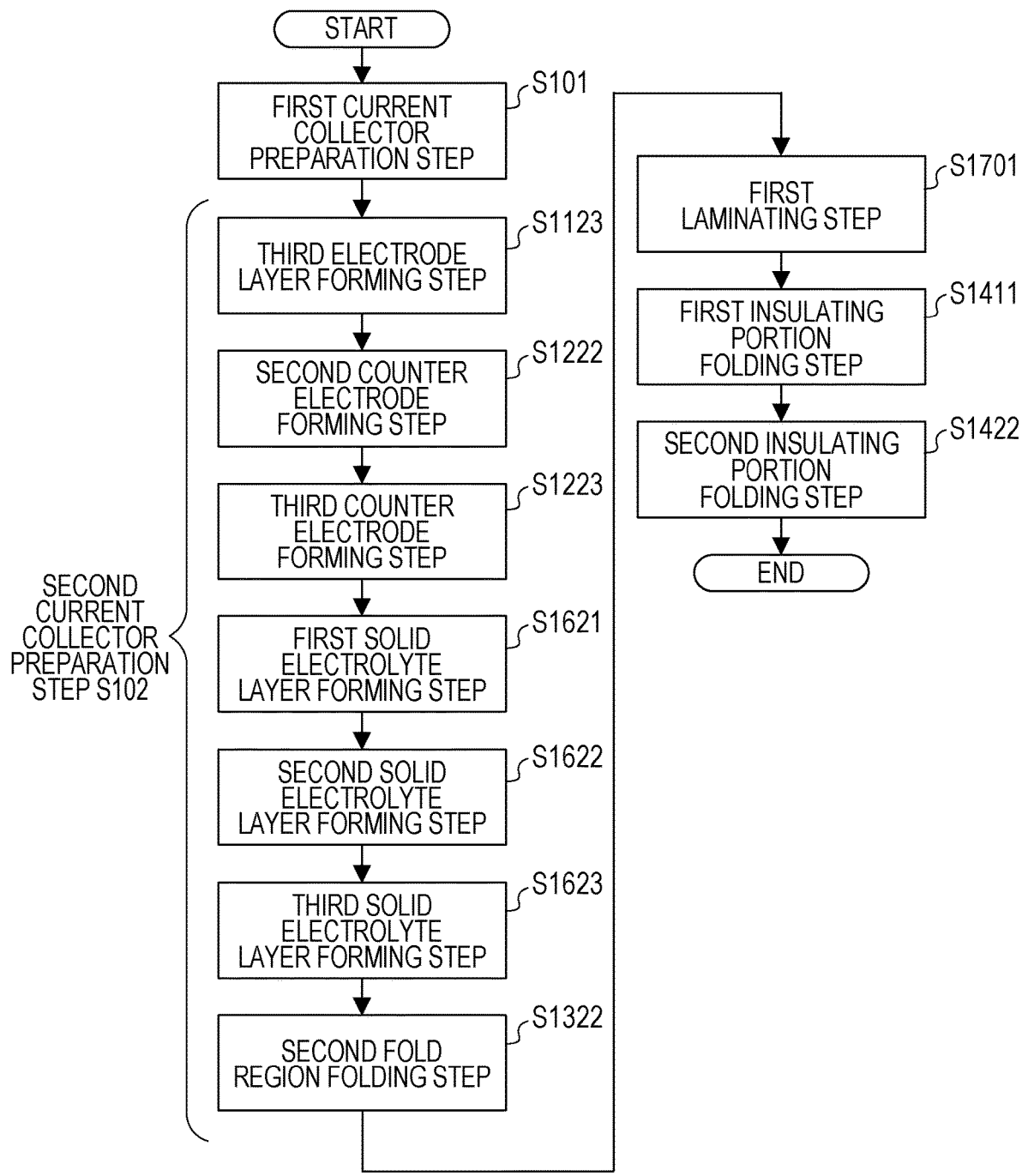
FIG. 40 is a flowchart illustrating an example of a battery manufacturing method according to the third embodiment.

FIG. 40 is a flowchart illustrating an example of a battery manufacturing method according to the third embodiment.

The battery manufacturing method illustrated in FIG. 40 includes the above-described first current collector preparation step S101, a second current collector preparation step S102, a first laminating step S1701 (i.e., a step (s1)), the first insulating portion folding step S1411 (i.e., the step (s11)), and a second insulating portion folding step S1422 (i.e., a step (d22)).

The second current collector preparation step S102 encompasses a third electrode layer forming step S1123 (i.e., a step (a23)), a second counter electrode layer forming step S1222 (i.e., a step (b22)), a third counter electrode layer forming step S1223 (i.e., a step (b23)), and a second fold region folding step S1322 (i.e., a step (c22)).

The third electrode layer forming step S1123 is a step of forming the third electrode layer 223 in contact with the fourth front face region 154 by the electrode layer forming unit 410.

The second counter electrode layer forming step S1222 is a step of forming the second counter electrode layer 232, which is the counter electrode of the third electrode layer 223, in contact with the third front face region 153, by the counter electrode layer forming unit 420.

The third counter electrode layer forming step S1223 is a step of forming the third counter electrode layer 233, which is the counter electrode of the third electrode layer 223, in contact with the fourth electroconductive portion 114, by the counter electrode layer forming unit 420.

The second fold region folding step S1322 is a step of folding at the second fold region 172 by the current collector folding unit 430.

The third rear face region 163 and fourth rear face region 164 are positioned facing each other, due to the second current collector 102 being folded at the second fold region 172 by the current collector folding unit 430 in the second fold region folding step S1322.

The second insulating portion folding step S1422 is a step of folding at the second insulating portion 122 by the current collector folding unit 430.

The third electrode layer 223 and third counter electrode layer 233 are positioned facing each other, due to the second current collector 102 being folded at the second insulating portion 122 by the current collector folding unit 430 in the second insulating portion folding step S1422.

The first laminating step S1701 is a step of laminating the first current collector 101 and second current collector 102 with the first electrode layer 221 and second counter electrode layer 232 facing each other, by the laminating unit 700.

According to the above configuration, the bonding strength among the component members of the battery can be further improved. That is to say, the third electrode layer 223 and third counter electrode layer 233 can each be formed on the third electroconductive portion 113 and fourth electroconductive portion 114 that are linked to each other by the second insulating portion 122. Accordingly, the positional relationship between the third electrode layer 223 disposed on the third electroconductive portion 113 and the third counter electrode layer 233 disposed on the fourth electroconductive portion 114 can be strongly maintained by the second insulating portion 122 (in other words, by the second current collector 102 that is a single component member). Accordingly, the layers (e.g., the third electrode layer 223 and third counter electrode layer 233) making up the battery can be prevented from exhibiting positional shifting or separation due to shock, vibration, and so forth, when manufacturing the battery, for example.

According to the above configuration, a laminated battery where bipolar-structure electrodes are laminated can be fabricated by a convenient folding process. That is to say, a laminated battery where the power-generating elements have been serially laminated can be fabricated by a folding step of the first insulating portion 121 of the first current collector 101 where bipolar-structure electrodes have been provided, and the second insulating portion 122 of the second current collector 102 where bipolar-structure electrodes have been provided. Accordingly, a serial-structure laminated battery can be fabricated more conveniently and less expensively as compared to a case of using a process of laminating multiple bipolar-structure electrodes that have been individually separated, while suppressing positional deviation of the component members.

The second fold region 172 is folded in the second fold region folding step S1322, thereby forming the second fold portion 132 illustrated in the above-described first and second embodiments.

The first insulating portion folding step S1411 may be executed after then first laminating step S1701 and second fold region folding step S1322, as illustrated in FIG. 40.

Here, the third electrode layer 223 and first counter electrode layer 231 are positioned facing each other, due to the first current collector 101 being folded at the first insulating portion 121 by the current collector folding unit 430, in the first insulating portion folding step S1411.

Further, the second insulating portion folding step S1422 may be executed after the first insulating portion folding step S1411.

At this time, the second electrode layer 222 and third counter electrode layer 233 are positioned facing each other due to the second current collector 102 being folded at the second insulating portion 122 by the current collector folding unit 430 in the second insulating portion folding step S1422.

According to the above configuration, a laminated battery where bipolar-structure electrodes are laminated can be fabricated by a convenient folding process. That is to say, by sequentially folding the first insulating portion 121 and second insulating portion 122, steps of forming electrode layers, counter electrode layers, solid electrolyte layers, and so forth, can be executed between the folding steps. Accordingly, a serial-structure laminated battery can be fabricated conveniently and inexpensively, while suppressing positional deviation of the component members.

Figure 41:
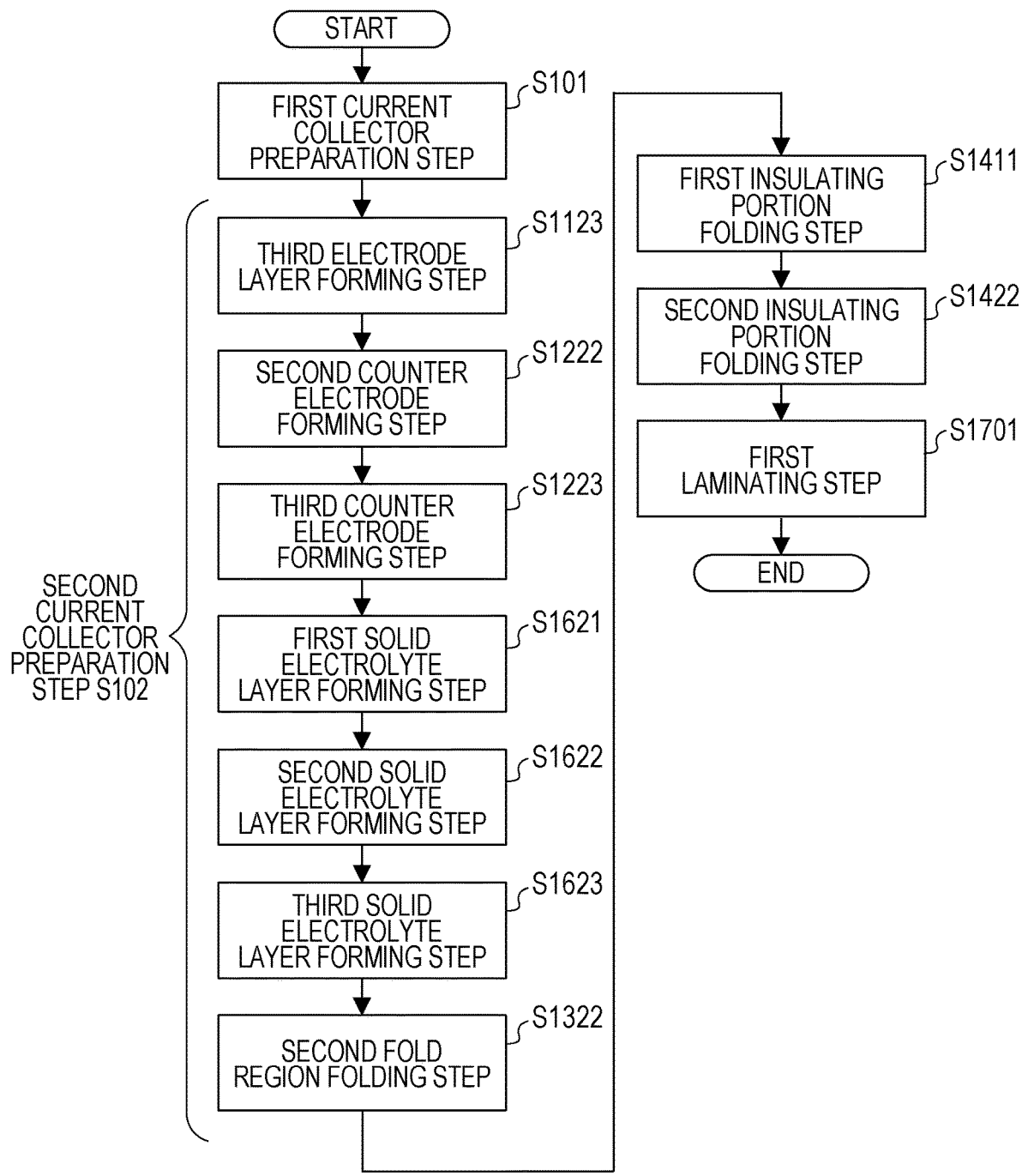
FIG. 41 is a flowchart illustrating an example of a battery manufacturing method according to the third embodiment.

FIG. 41 is a flowchart illustrating an example of a battery manufacturing method according to the third embodiment.

In the battery manufacturing method illustrated in FIG. 41, the first laminating step S1701 is executed after the first fold region folding step S1311, second fold region folding step S1322, first insulating portion folding step S1411, and second insulating portion folding step S1422.

In the first laminating step S1701 here, the third electroconductive portion 113 is inserted between the first electroconductive portion 111 and second electroconductive portion 112, and the second electroconductive portion 112 is inserted between the third electroconductive portion 113 and fourth electroconductive portion 114, whereby the first current collector 101 and second current collector 102 are laminated.

According to the above configuration, a laminated battery where bipolar-structure electrodes are laminated can be fabricated by a convenient folding process and laminating process (insertion process). That is to say, process takt time can be shortened as compared to the method where long electrode strips are orthogonally and alternately folded, by using the insertion process. Thus, high-speed folding to reduce the process takt time is unnecessary. Accordingly, positional deviation in folding can be suppressed in high-speed folding. Damage to the battery members to be folded can also be suppressed.

Figure 42:
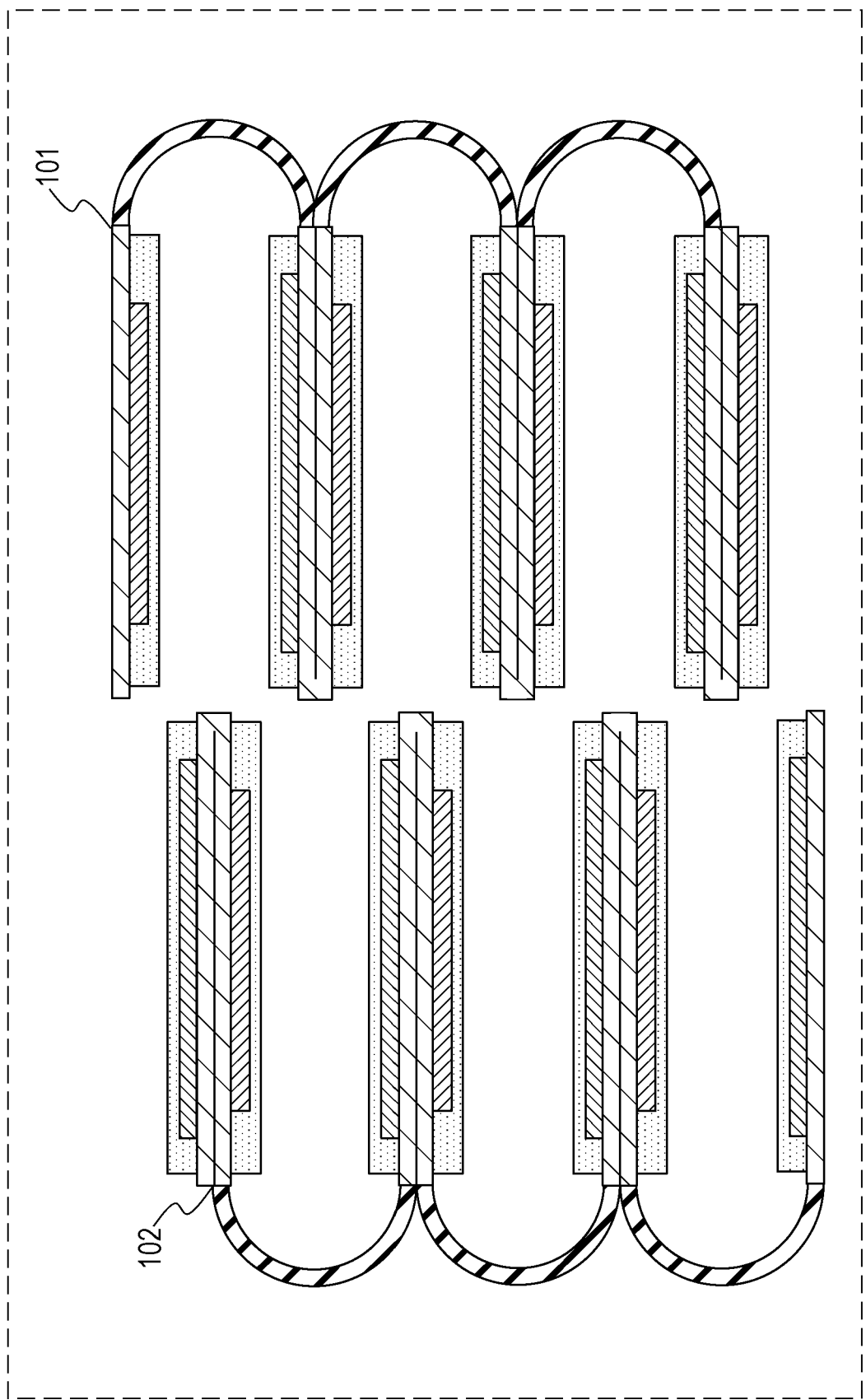
FIG. 42 is a diagram illustrating an example of a first laminating step according to the third embodiment.

FIG. 42 is a diagram illustrating an example of the first laminating step S1701 according to the third embodiment.

Two comb-shaped electrode strips (the first current collector 101 and second current collector 102) may be inserted into each other, in the vertical relationship illustrated in FIG. 42, and also shifted by 90 degrees or 180 degrees for example, as illustrated in FIG. 42, and bonded by pressing. Movement of the current collectors for insertion may be realized using the above-described folding members (e.g., rod members, wire members, etc.), for example. Using two electrode strips that each are individual members enables the number of necessary bipolar electrodes per electrode strip to be reduced. Accordingly, the manufacturing process can be simplified. Further, the strength of the laminated battery can be improved. For example, the strength of the laminated battery as to mechanical shock from a side face can be further improved.

The second current collector preparation step S102 may be executed after the first current collector preparation step S101. Alternatively, the second current collector preparation step S102 may be executed before the first current collector preparation step S101. Alternatively, the first current collector preparation step S101 and the second current collector preparation step S102 may be executed at the same time.

As for specific methods of the steps encompassed by the second current collector preparation step S102, methods shown as specific methods of the steps encompassed by the first current collector preparation step S101 may be employed as appropriate.

Note that the second current collector preparation step S102 may further include a first solid electrolyte layer forming step S1621 (i.e., a step (f21)), a second solid electrolyte layer forming step S1622 (i.e., a step (f22)), and a third solid electrolyte layer forming step S1623 (i.e., a step (f23)), as illustrated in FIGS. 40 and 41.

The first solid electrolyte layer forming step S1621 is a step of forming the first solid electrolyte layer 241 on at least one of the first electrode layer 221 and second counter electrode layer 232 by the solid electrolyte layer forming unit 440.

The second solid electrolyte layer forming step S1622 is a step of forming the second solid electrolyte layer 242 on at least one of the third electrode layer 223 and first counter electrode layer 231 by the solid electrolyte layer forming unit 440.

The third solid electrolyte layer forming step S1623 is a step of forming the third solid electrolyte layer 243 on at least one of the second electrode layer 222 and third counter electrode layer 233 by the solid electrolyte layer forming unit 440.

According to the above configuration, individual solid battery cells (individual power-generating elements) can be fabricated by a convenient folding process. Thus, a laminated battery where multiple solid battery cells are serially laminated can be fabricated with suppressed positional deviation of the component members, as compared with a case of using a process of laminating a great number of individual component members.

In a case where the solid electrolyte layer forming steps are encompassed by the second current collector preparation step S102, the solid electrolyte layers are formed on the electrode layers and counter electrode layers formed on the second current collector 102.

Note that the first solid electrolyte layer forming step S1621, second solid electrolyte layer forming step S1622, and third solid electrolyte layer forming step S1623 may be encompassed by the first current collector preparation step S101. In this case, the solid electrolyte layers are formed on the electrode layers and counter electrode layers formed on the first current collector 101.

Note that the solid electrolyte layers may be formed on the electrode layers and counter electrode layers formed on the first current collector 101 and second current collector 102.

According to the above-described manufacturing method illustrated in FIGS. 40 and 41, the battery 2000 according to the second embodiment can be manufactured.

The laminating unit 700 may laminate the first current collector 101, second current collector 102, and third current collector 103.

The third current collector 103 includes the fifth electroconductive portion 115, third insulating portion 123, and sixth electroconductive portion 116.

The fifth electroconductive portion 115 includes the fifth edge region 145, the fifth front face region 155, the fifth rear face region 165, a third fold region 173, the sixth front face region 156, the sixth rear face region 166, and the sixth edge region 146.

The fifth front face region 155 is a region situated between the fifth edge region 145 and third fold region 173.

The fifth rear face region 165 is a region situated on the rear face of the fifth front face region 155.

The sixth front face region 156 is a region situated between the sixth edge region 146 and the third fold region 173.

The sixth rear face region 166 is a region situated on the rear face of the sixth front face region 156.

The third insulating portion 123 is a member linking the sixth edge region 146 and sixth electroconductive portion 116.

The electrode layer forming unit 410 may form the fourth electrode layer 224 in contact with the fourth electroconductive portion 114. The electrode layer forming unit 410 may also form the fifth electrode layer 225 in contact with the sixth front face region 156.

The counter electrode layer forming unit 420 may form the fourth counter electrode layer 234, which is the counter electrode of the fifth electrode layer 225, in contact with the fifth front face region 155. The counter electrode layer forming unit 420 may also form the fifth counter electrode layer 235, which is the counter electrode of the fifth electrode layer 225, in contact with the sixth electroconductive portion 116.

The current collector folding unit 430 may also fold at the third fold region 173. The current collector folding unit 430 may also fold at the third insulating portion 123.

The laminating unit 700 may laminate the second current collector 102 and third current collector 103 with the third electrode layer 223 and fourth counter electrode layer 234 facing each other.

Figure 43:
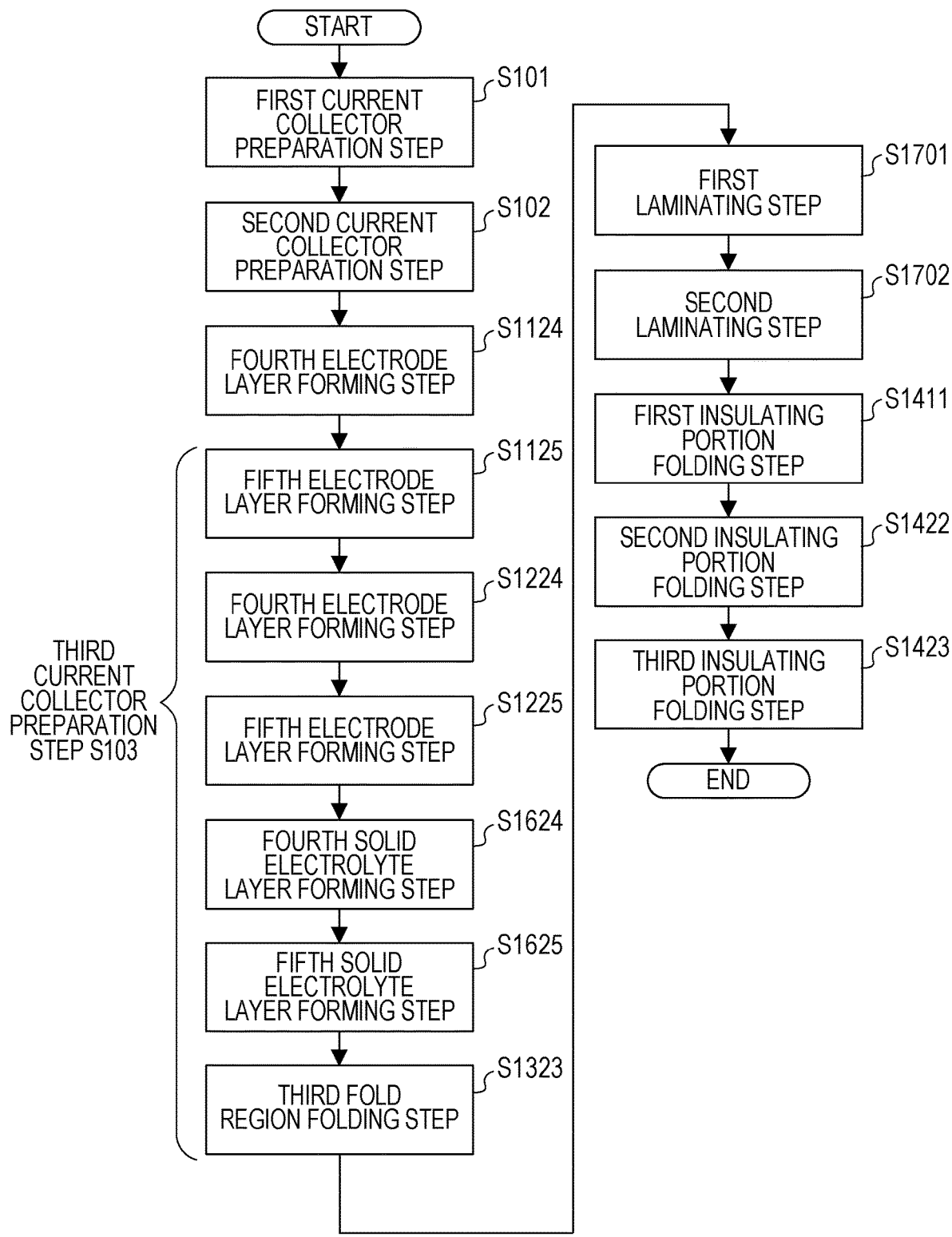
FIG. 43 is a flowchart illustrating an example of a battery manufacturing method according to the third embodiment.

FIG. 43 is a flowchart illustrating an example of a battery manufacturing method according to the third embodiment.

The battery manufacturing method illustrated in FIG. 43 further includes the following steps, in addition to the steps of the above-described battery manufacturing method illustrated in FIG. 40.

That is to say, the battery manufacturing method illustrated in FIG. 43 further includes a fourth electrode layer forming step S1124 (i.e., a step (a24)), a third current collector preparation step S103, a second laminating step S1702 (i.e., a step (s2)), and a third insulating portion folding step S1423 (i.e., a step (d23)).

The third current collector preparation step S103 includes a fifth electrode layer forming step S1125 (i.e., a step (a25)), a fourth counter electrode layer forming step S1224 (i.e., a step (b24)), a fifth counter electrode layer forming step S1225 (i.e., a step (b25)), and a third fold region folding step S1323 (i.e., a step (c23)).

The fourth electrode layer forming step S1124 is a step of forming the fourth electrode layer 224 in contact with the fourth electroconductive portion 114 by the electrode layer forming unit 410.

The fifth electrode layer forming step S1125 is a step of forming the fifth electrode layer 225 in contact with the sixth front face region 156 by the electrode layer forming unit 410.

The fourth counter electrode layer forming step S1224 is a step of forming the fourth counter electrode layer 234, which is the counter electrode of the fifth electrode layer 225, in contact with the fifth front face region 155, by the counter electrode layer forming unit 420.

The fifth counter electrode layer forming step S1225 is a step of forming the fifth counter electrode layer 235, which is the counter electrode of the fifth electrode layer 225, in contact with the sixth electroconductive portion 116, by the counter electrode layer forming unit 420.

The third fold region folding step S1323 is a step of folding at the third fold region 173 by the current collector folding unit 430.

The fifth rear face region 165 and sixth rear face region 166 are positioned facing each other due to the third current collector 103 being folded at the third fold region 173, by the current collector folding unit 430 in the third fold region folding step S1323.

The third insulating portion folding step S1423 is a step of folding at the third insulating portion 123 by the current collector folding unit 430.

The fifth electrode layer 225 and fifth counter electrode layer 235 are positioned facing each other due to the third current collector 103 being folded at the third insulating portion 123, by the current collector folding unit 430 in the third insulating portion folding step S1423.

The second laminating step S1702 is a step of laminating the second current collector 102 and third current collector 103 by the laminating unit 700, with the third electrode layer 223 and fourth counter electrode layer 234 facing each other.

According to the above configuration, the bonding strength among the component members of the battery can be further improved. That is to say, the fifth electrode layer 225 and fifth counter electrode layer 235 can each be formed on the fifth electroconductive portion 115 and sixth electroconductive portion 116 that are linked to each other by the third insulating portion 123. Accordingly, the positional relationship between the fifth electrode layer 225 disposed on the fifth electroconductive portion 115 and the fifth counter electrode layer 235 disposed on the sixth electroconductive portion 116 can be strongly maintained by the third insulating portion 123 (in other words, by the third current collector 103 that is a single component member). Accordingly, the layers (e.g., the fifth electrode layer 225 and fifth counter electrode layer 235) making up the battery can be prevented from exhibiting positional shifting or separation due to shock, vibration, and so forth, when manufacturing the battery, for example.

According to the above configuration, a laminated battery where bipolar-structure electrodes are laminated can be fabricated by a convenient folding process. That is to say, a laminated battery where the power-generating elements have been serially laminated can be fabricated by a folding step of the first insulating portion 121 of the first current collector 101 where bipolar-structure electrodes have been provided, the second insulating portion 122 of the second current collector 102 where bipolar-structure electrodes have been provided, and the third insulating portion 123 of the third current collector 103 where bipolar-structure electrodes have been provided. Accordingly, a serial-structure laminated battery can be fabricated more conveniently and less expensively as compared to a case of using a process of laminating multiple bipolar-structure electrodes that have been individually separated, while suppressing positional deviation of the component members.

The third fold region 173 is folded in the third fold region folding step S1323, thereby forming the third fold portion 133 illustrated in the above-described first and second embodiments.

Note that the first insulating portion folding step S1411 may be executed after the first laminating step S1701, the second laminating step S1702, the second fold region folding step S1322, and the third fold region folding step S1323, as illustrated in FIG. 43.

At this time, the fifth electrode layer 225 and first counter electrode layer 231 are positioned facing each other, due to the first current collector 101 being folded at the first insulating portion 121 by the current collector folding unit 430 in the first insulating portion folding step S1411.

Further, the second insulating portion folding step S1422 may be executed after the first insulating portion folding step S1411.

At this time, the second electrode layer 222 and third counter electrode layer 233 are positioned facing each other, due to the second current collector 102 being folded at the second insulating portion 122 by the current collector folding unit 430 in the second insulating portion folding step S1422.

Further, the third insulating portion folding step S1423 may be executed after the second insulating portion folding step S1422.

At this time, the fourth electrode layer 224 and fifth counter electrode layer 235 are positioned facing each other, due to the third current collector 103 being folded at the third insulating portion 123 by the current collector folding unit 430 in the third insulating portion folding step S1423.

According to the above configuration, a laminated battery where bipolar-structure electrodes are laminated can be fabricated by a convenient folding process. That is to say, by sequentially folding the first insulating portion 121, second insulating portion 122, and third insulating portion 123, steps of forming electrode layers, counter electrode layers, solid electrolyte layers, and so forth, can be executed between the folding steps. Accordingly, a serial-structure laminated battery can be fabricated conveniently and inexpensively while suppressing positional deviation of the component members.

Figure 44:
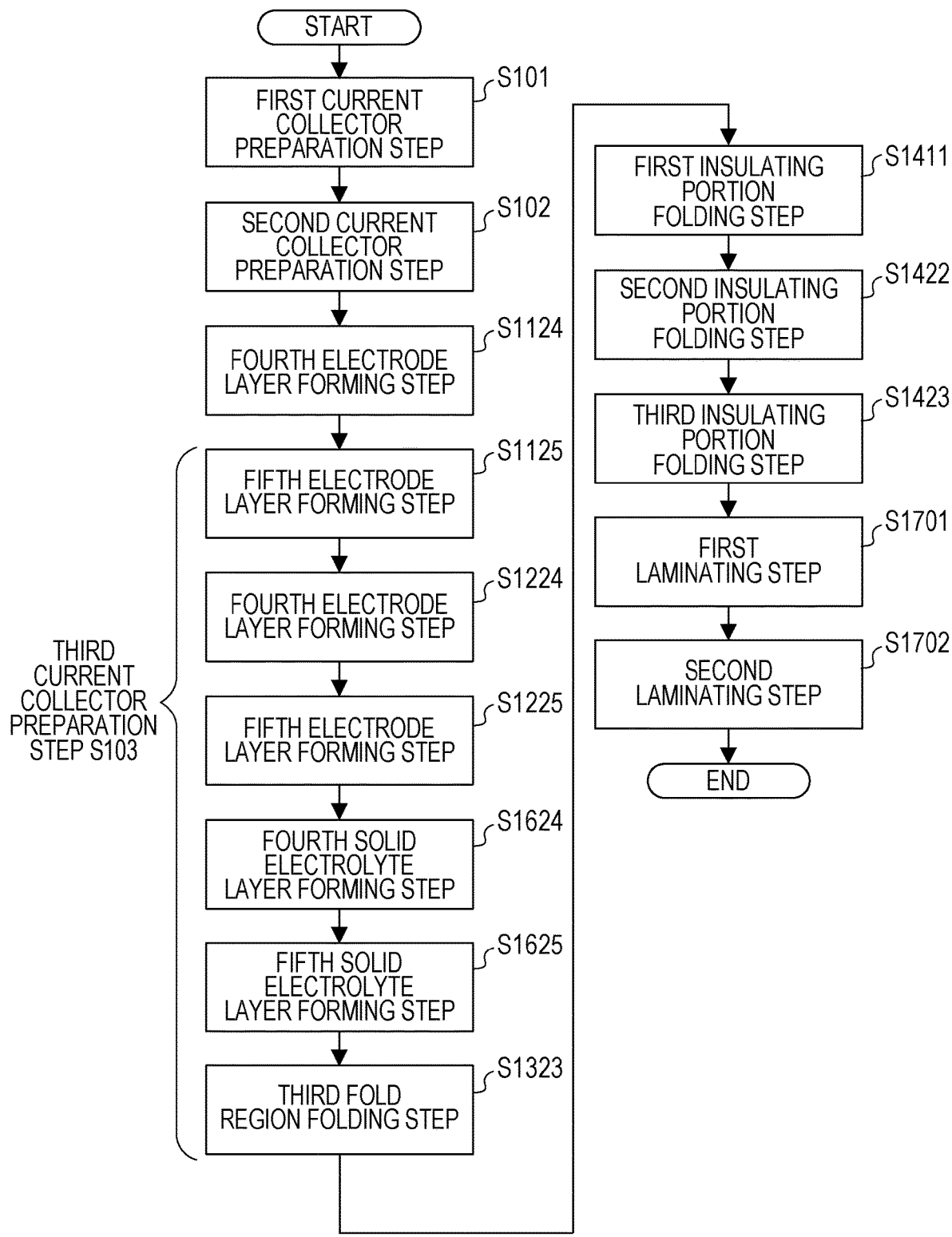
FIG. 44 is a flowchart illustrating an example of a battery manufacturing method according to the third embodiment.

FIG. 44 is a flowchart illustrating an example of a battery manufacturing method according to the third embodiment.

In the battery manufacturing method illustrated in FIG. 44, the first laminating step S1701 is executed after the first fold region folding step S1311, second fold region folding step S1322, first insulating portion folding step S1411, and second insulating portion folding step S1422.

In the first laminating step S1701 here, the third electroconductive portion 113 is inserted between the first electroconductive portion 111 and second electroconductive portion 112, and the second electroconductive portion 112 is inserted between the third electroconductive portion 113 and fourth electroconductive portion 114, whereby the first current collector 101 and second current collector 102 are laminated.

Further, in the battery manufacturing method illustrated in FIG. 44, the second laminating step S1702 is executed after first laminating step S1701, third fold region folding step S1323, and third insulating portion folding step S1423.

In the second laminating step S1702 here, the fifth electroconductive portion 115 is inserted between the third electroconductive portion 113 and second electroconductive portion 112, and the second electroconductive portion 112 and fourth electroconductive portion 114 are inserted between the fifth electroconductive portion 115 and sixth electroconductive portion 116, whereby the second current collector 102 and third current collector 103 are laminated.

According to the above configuration, a laminated battery where bipolar-structure electrodes are laminated can be fabricated by a convenient folding process and laminating process (insertion process). That is to say, process takt time can be shortened as compared to the method where long electrode strips are orthogonally and alternately folded, by using the insertion process. Thus, high-speed folding to reduce the process takt time is unnecessary. Accordingly, positional deviation in folding can be suppressed in high-speed folding. Damage to the battery members to be folded can also be suppressed.

Figure 45:
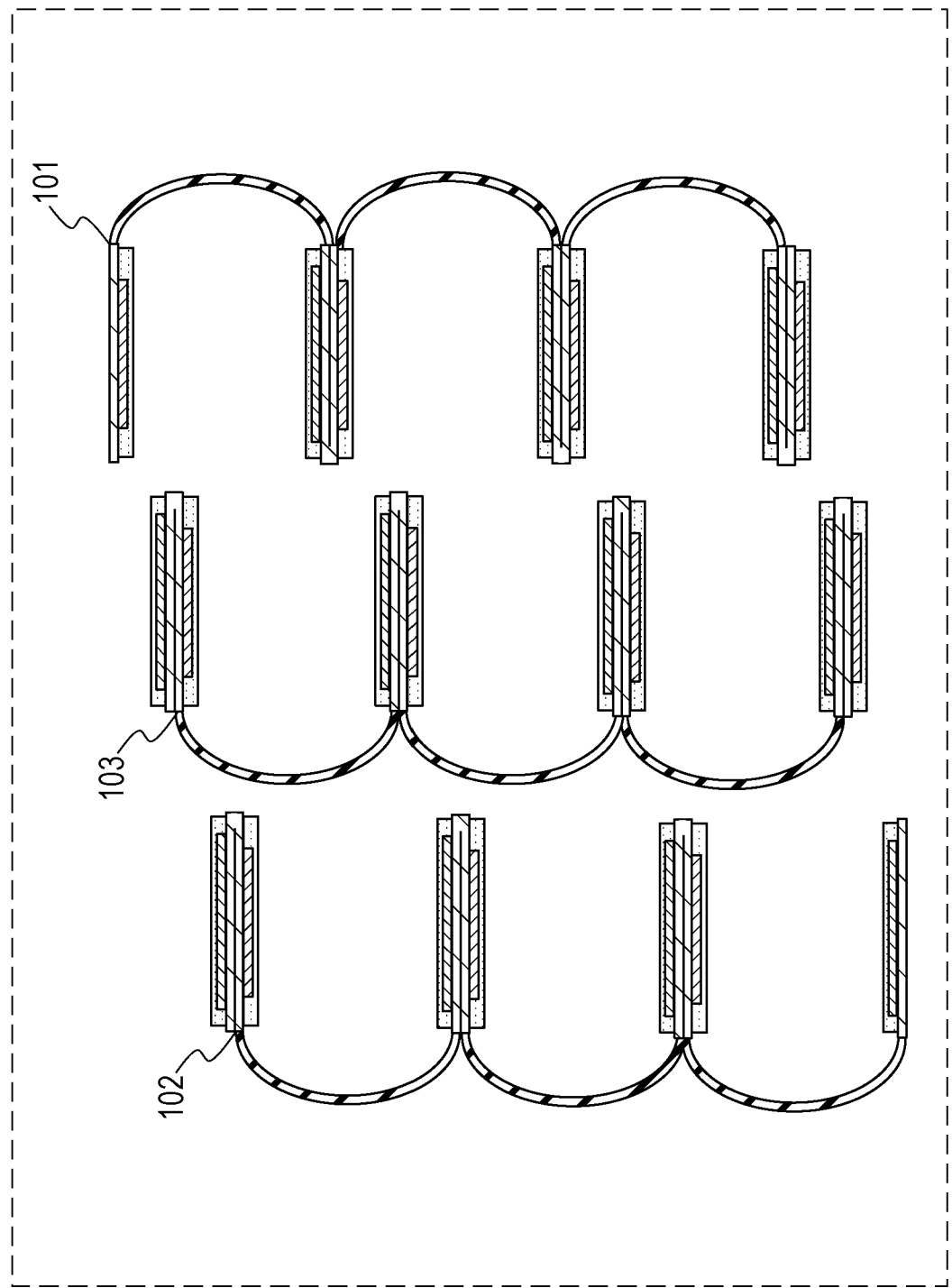
FIG. 45 is a diagram illustrating an example of the first laminating step and a second laminating step according to the third embodiment.

FIG. 45 is a diagram illustrating an example of the first laminating step S1701 and the second laminating step S1702 according to the third embodiment.

Three comb-shaped electrode strips (the first current collector 101, second current collector 102, and third current collector 103) may be inserted into each other, in the vertical relationship illustrated in FIG. 45, and also shifted by 90 degrees for example, as illustrated in FIG. 45, and bonded by pressing. Movement of the current collectors for insertion may be realized using the above-described folding members (e.g., rod members, wire members, etc.), for example. Using three electrode strips that each are individual members enables the number of necessary bipolar electrodes per electrode strip to be reduced. Accordingly, the manufacturing process can be simplified. Further, the strength of the laminated battery can be improved. For example, the strength of the laminated battery as to mechanical shock from a side face can be further improved.

The third current collector preparation step S103 may be executed after the first current collector preparation step S101 and the second current collector preparation step S102. Alternatively, third current collector preparation step S103 may be executed before the first current collector preparation step S101 and the second current collector preparation step S102. Alternatively, the first current collector preparation step S101, second current collector preparation step S102, and third current collector preparation step S103 may be executed at the same time.

As for specific methods of the steps encompassed by the third current collector preparation step S103, methods shown as specific methods of the steps encompassed by the first current collector preparation step S101 may be employed as appropriate.

The third current collector preparation step S103 includes a fourth solid electrolyte layer forming step S1624 (i.e., a step (f24)) and a fifth solid electrolyte layer forming step S1625 (i.e., a step (f25)), as illustrated in FIGS. 43 and 44.

The fourth solid electrolyte layer forming step S1624 is a step of forming the fourth solid electrolyte layer 244 on at least one of the fifth electrode layer 225 and first counter electrode layer 231 by the solid electrolyte layer forming unit 440.

The fifth solid electrolyte layer forming step S1625 is a step of forming the fifth solid electrolyte layer 245 on at least one of the fourth electrode layer 224 and fifth counter electrode layer 235 by the solid electrolyte layer forming unit 440.

According to the above configuration, individual solid battery cells (individual power-generating elements) can be fabricated by a convenient folding process. Thus, a laminated battery where multiple solid battery cells are serially laminated can be fabricated with suppressed positional deviation of the component members, as compared with a case of using a process of laminating a great number of individual component members.

In a case where the solid electrolyte layer forming steps are encompassed by the third current collector preparation step S103, the solid electrolyte layers are formed on the electrode layers and counter electrode layers formed on the third current collector 103.

Note that the fourth solid electrolyte layer forming step S1624 may be encompassed by the first current collector preparation step S101. In this case, the fourth solid electrolyte layer 244 is formed on the first counter electrode layer 231 formed on the first current collector 101.

Also, the fifth solid electrolyte layer forming step S1625 may be encompassed by the second current collector preparation step S102. In this case, the fifth solid electrolyte layer 245 is formed on the fourth electrode layer 224 formed on the second current collector 102.

Note that the solid electrolyte layers may be formed on the electrode layers and counter electrode layers formed on the first current collector 101, second current collector 102, and third current collector 103.

In the manufacturing method illustrated in FIGS. 43 and 44, the second solid electrolyte layer forming step S1622 is a step of forming the second solid electrolyte layer 242 on at least one of the third electrode layer 223 and fourth counter electrode layer 234 by the solid electrolyte layer forming unit 440.

According to the above-described manufacturing method illustrated in FIGS. 43 and 44, the battery 2100 according to the second embodiment can be manufactured.

The laminating unit 700 may laminate the first current collector 101, second current collector 102, third current collector 103, and fourth current collector 104.

The fourth current collector 104 includes the seventh electroconductive portion 117, the fourth insulating portion 124, and the eighth electroconductive portion 118.

The seventh electroconductive portion 117 includes the seventh edge region 147, the seventh front face region 157, the seventh rear face region 167, a fourth fold region 174, the eighth front face region 158, the eighth rear face region 168, and the eighth edge region 148.

The seventh front face region 157 is a region situated between the seventh edge region 147 and the fourth fold region 174.

The seventh rear face region 167 is a region situated on the rear face of the seventh front face region 157.

The eighth front face region 158 is a region situated between the eighth edge region 148 and the fourth fold region 174.

The eighth rear face region 168 is a region situated on the rear face of the eighth front face region 158.

The fourth insulating portion 124 is a member linking the eighth edge region 148 and the eighth electroconductive portion 118.

The electrode layer forming unit 410 may form the sixth electrode layer 226 in contact with the sixth electroconductive portion 116. The electrode layer forming unit 410 may also form the seventh electrode layer 227 in contact with the eighth front face region 158.

The counter electrode layer forming unit 420 may form the sixth counter electrode layer 236, which is the counter electrode of the seventh electrode layer 227, in contact with the seventh front face region 157. The counter electrode layer forming unit 420 may also form the seventh counter electrode layer 237, which is the counter electrode of the seventh electrode layer 227, in contact with the eighth electroconductive portion 118.

The current collector folding unit 430 may fold at the fourth fold region 174. The current collector folding unit 430 may also fold at the fourth insulating portion 124.

The laminating unit 700 may laminate the third current collector 103 and fourth current collector 104 with the fifth electrode layer 225 and sixth counter electrode layer 236 facing each other.

Figure 46:
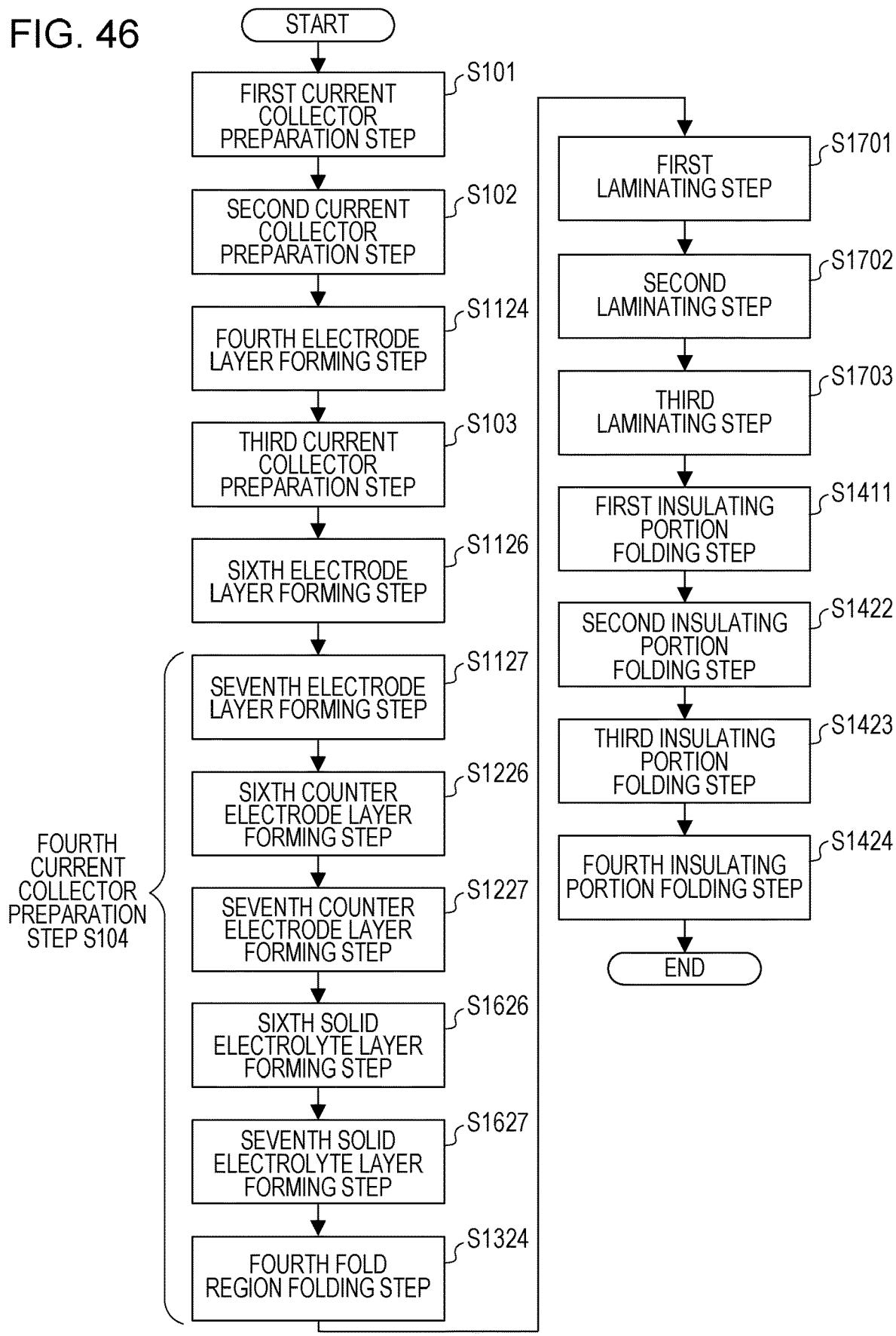
FIG. 46 is a flowchart illustrating an example of a battery manufacturing method according to the third embodiment.

FIG. 46 is a flowchart illustrating an example of a battery manufacturing method according to the third embodiment.

The battery manufacturing method illustrated in FIG. 46 further includes the following steps, in addition to the steps of the above-described battery manufacturing method illustrated in FIG. 43.

That is to say, the battery manufacturing method illustrated in FIG. 46 further includes a sixth electrode layer forming step S1126 (i.e., a step (a26)), a fourth current collector preparation step S104, a third laminating step S1703 (i.e., a step (s3)), and a fourth insulating portion folding step S1424 (i.e., a step (d24)).

The fourth current collector preparation step S104 includes a seventh electrode layer forming step S1127 (i.e., a step (a27)), a sixth counter electrode layer forming step S1226 (i.e., a step (b26)), a seventh counter electrode layer forming step S1227 (i.e., a step (b27)), and a fourth fold region folding step S1324 (i.e., a step (c24)).

The sixth electrode layer forming step S1126 is a step of forming the sixth electrode layer 226 in contact with the sixth electroconductive portion 116 by the electrode layer forming unit 410.

The seventh electrode layer forming step S1127 is a step of forming the seventh electrode layer 227 in contact with the eighth front face region 158 by the electrode layer forming unit 410.

The sixth counter electrode layer forming step S1226 is a step of forming the sixth counter electrode layer 236, which is the counter electrode of the seventh electrode layer 227, in contact with the seventh front face region 157, by the counter electrode layer forming unit 420.

The seventh counter electrode layer forming step S1227 is a step of forming the seventh counter electrode layer 237, which is the counter electrode of the seventh electrode layer 227, in contact with the eighth electroconductive portion 118, by the counter electrode layer forming unit 420.

The fourth fold region folding step S1324 is a step of folding at the fourth fold region 174 by the current collector folding unit 430.

The seventh rear face region 167 and eighth rear face region 168 are positioned facing each other, due to the fourth current collector 104 being folded at the fourth fold region 174 by the current collector folding unit 430 in the fourth fold region folding step S1324.

The fourth insulating portion folding step S1424 is a step of folding the fourth insulating portion 124 by the current collector folding unit 430.

The seventh electrode layer 227 and seventh counter electrode layer 237 are positioned facing each other, due to the fourth current collector 104 being folded at the fourth insulating portion 124 by the current collector folding unit 430 in the fourth insulating portion folding step S1424.

The third laminating step S1703 is a step of laminating the third current collector 103 and fourth current collector 104, with the fifth electrode layer 225 and sixth counter electrode layer 236 facing each other.

According to the above configuration, the bonding strength among the component members of the battery can be further improved. That is to say, the seventh electrode layer 227 and seventh counter electrode layer 237 can each be formed on the seventh electroconductive portion 117 and eighth electroconductive portion 118 that are linked to each other by the fourth insulating portion 124. Accordingly, the positional relationship between the seventh electrode layer 227 disposed on the seventh electroconductive portion 117 and the seventh counter electrode layer 237 disposed on the eighth electroconductive portion 118 can be strongly maintained by the fourth insulating portion 124 (in other words, by the fourth current collector 104 that is a single component member). Accordingly, the layers (e.g., the seventh electrode layer 227 and seventh counter electrode layer 237) making up the battery can be prevented from exhibiting positional shifting or separation due to shock, vibration, and so forth, when manufacturing the battery, for example.

According to the above configuration, a laminated battery where bipolar-structure electrodes are laminated can be fabricated by a convenient folding process. That is to say, a laminated battery where the power-generating elements have been serially laminated can be fabricated by a folding process of the first insulating portion 121 of the first current collector 101 where bipolar-structure electrodes have been provided, the second insulating portion 122 of the second current collector 102 where bipolar-structure electrodes have been provided, the third insulating portion 123 of the third current collector 103 where bipolar-structure electrodes have been provided, and the fourth insulating portion 124 of the fourth current collector 104 where bipolar-structure electrodes have been provided. Accordingly, a serial-structure laminated battery can be fabricated more conveniently and less expensively as compared to a case of using a process of laminating multiple bipolar-structure electrodes that have been individually separated, while suppressing positional deviation of the component members.

The fourth fold region 174 is folded in the fourth fold region folding step S1324, thereby forming the fourth fold portion 134 illustrated in the above-described first and second embodiments.

Note that the first insulating portion folding step S1411 may be executed after the first laminating step S1701, the second laminating step S1702, the third laminating step S1703, the second fold region folding step S1322, the third fold region folding step S1323, and the fourth fold region folding step S1324, as illustrated in FIG. 46.

At this time, the seventh electrode layer 227 and first counter electrode layer 231 are positioned facing each other, due to the first current collector 101 being folded at the first insulating portion 121 by the current collector folding unit 430 in the first insulating portion folding step S1411.

Further, the second insulating portion folding step S1422 may be executed after the first insulating portion folding step S1411.

At this time, the second electrode layer 222 and third counter electrode layer 233 are positioned facing each other, due to the second current collector 102 being folded at the second insulating portion 122 by the current collector folding unit 430 in the second insulating portion folding step S1422.

Further, the third insulating portion folding step S1423 may be executed after the second insulating portion folding step S1422.

At this time, the fourth electrode layer 224 and fifth counter electrode layer 235 are positioned facing each other, due to the third current collector 103 being folded at the third insulating portion 123 by the current collector folding unit 430 in the third insulating portion folding step S1423.

Further, the fourth insulating portion folding step S1424 may be executed after the third insulating portion folding step S1423.

At this time, the sixth electrode layer 226 and seventh counter electrode layer 237 are positioned facing each other, due to the fourth current collector 104 being folded at the fourth insulating portion 124 by the current collector folding unit 430 in the fourth insulating portion folding step S1424.

According to the above configuration, a laminated battery where bipolar-structure electrodes are laminated can be fabricated by a convenient folding process. That is to say, by sequentially folding the first insulating portion 121, second insulating portion 122, third insulating portion 123, and fourth insulating portion 124, steps of forming electrode layers, counter electrode layers, solid electrolyte layers, and so forth, can be executed between the folding steps, for example. Accordingly, a serial-structure laminated battery can be fabricated conveniently and inexpensively while suppressing positional deviation of the component members.

Figure 47:
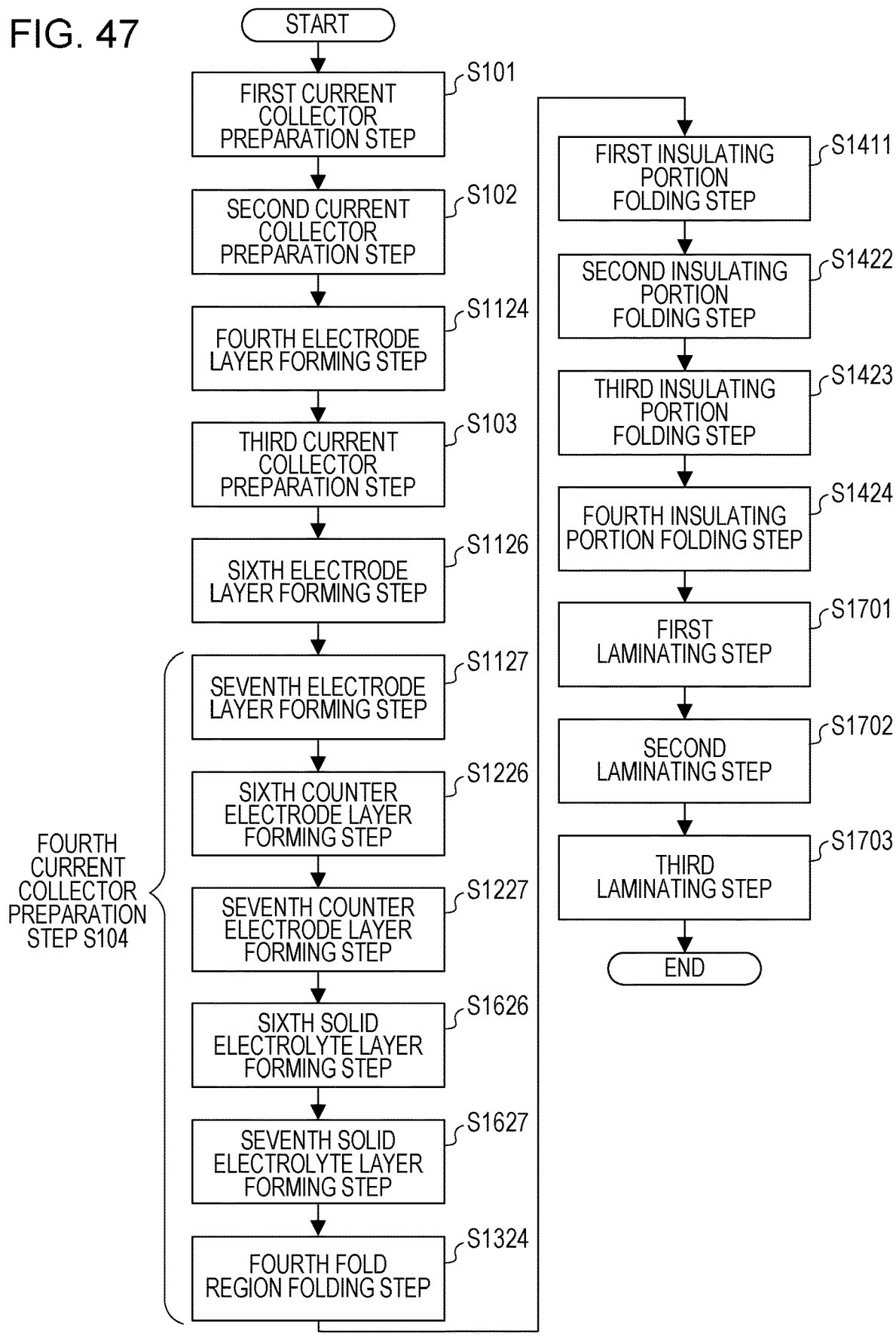
FIG. 47 is a flowchart illustrating an example of a battery manufacturing method according to the third embodiment.

FIG. 47 is a flowchart illustrating an example of a battery manufacturing method according to the third embodiment.

In the battery manufacturing method illustrated in FIG. 47, the first laminating step S1701 is executed after the first fold region folding step S1311, second fold region folding step S1322, first insulating portion folding step S1411, and second insulating portion folding step S1422.

In the first laminating step S1701 here, the third electroconductive portion 113 is inserted between the first electroconductive portion 111 and second electroconductive portion 112, and the second electroconductive portion 112 is inserted between the third electroconductive portion 113 and fourth electroconductive portion 114, whereby the first current collector 101 and second current collector 102 are laminated.

Further, in the battery manufacturing method illustrated in FIG. 47, the second laminating step S1702 is executed after first laminating step S1701, third fold region folding step S1323, and third insulating portion folding step S1423.

In the second laminating step S1702 here, the fifth electroconductive portion 115 is inserted between the third electroconductive portion 113 and second electroconductive portion 112, and the second electroconductive portion 112 and fourth electroconductive portion 114 are inserted between the fifth electroconductive portion 115 and sixth electroconductive portion 116, whereby the second current collector 102 and third current collector 103 are laminated.

Further, in the battery manufacturing method illustrated in FIG. 47, the third laminating step S1703 is executed after the second laminating step S1702, fourth fold region folding step S1324, and fourth insulating portion folding step S1424.

In the third laminating step S1703 here, the seventh electroconductive portion 117 is inserted between the fifth electroconductive portion 115 and second electroconductive portion 112, and the second electroconductive portion 112, fourth electroconductive portion 114, and sixth electroconductive portion 116 are inserted between the seventh electroconductive portion 117 and eighth electroconductive portion 118, whereby the third current collector 103 and fourth current collector 104 are laminated.

According to the above configuration, a laminated battery where bipolar-structure electrodes are laminated can be fabricated by a convenient folding process and laminating process (insertion process). That is to say, process takt time can be shortened as compared to the method where long electrode strips are orthogonally and alternately folded, by using the insertion process. Thus, high-speed folding to reduce the process takt time is unnecessary. Accordingly, positional deviation in folding can be suppressed in high-speed folding. Damage to the electrode members to be folded can also be suppressed.

Figure 48:
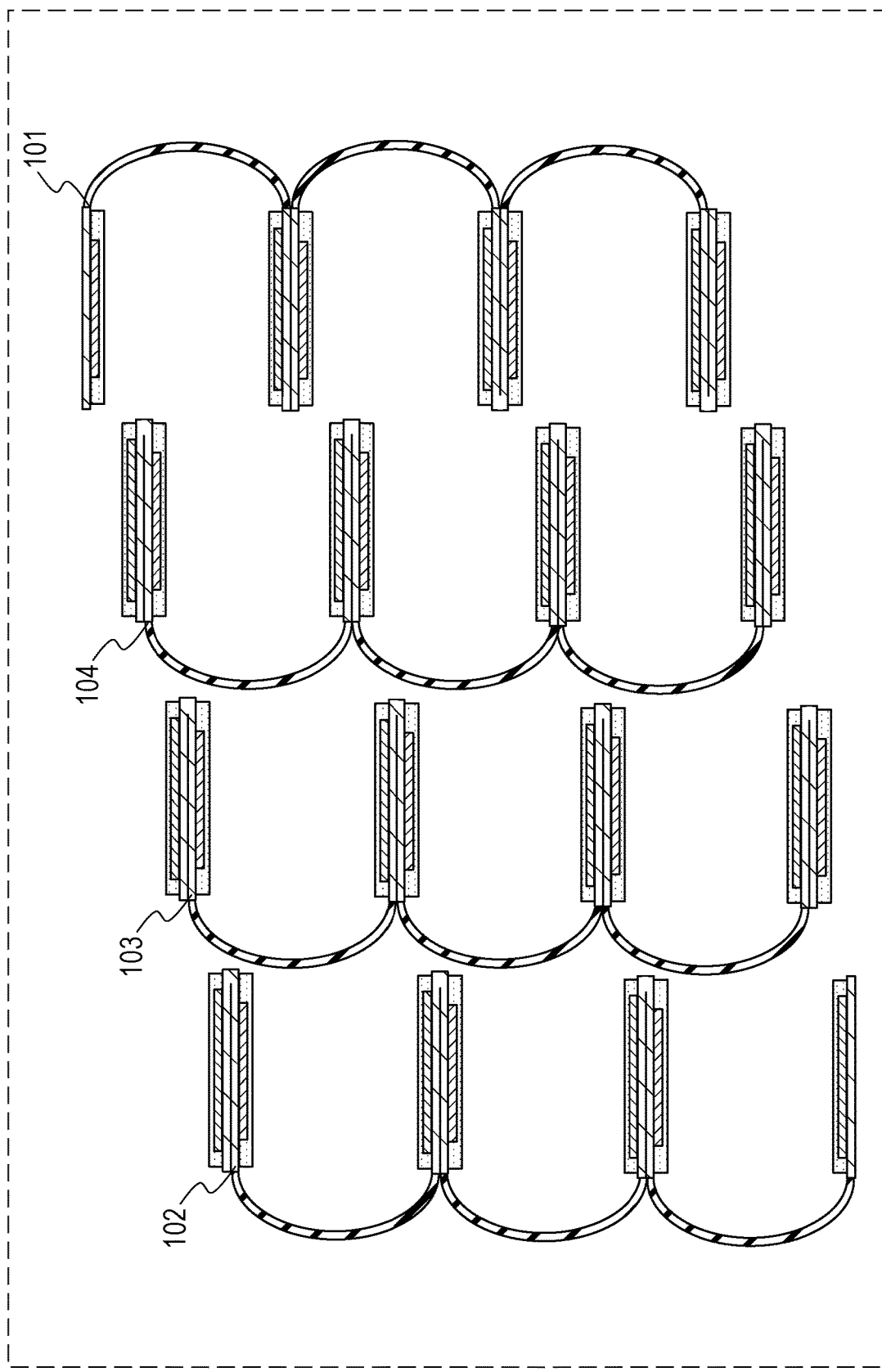
FIG. 48 is a diagram illustrating an example of the first laminating step, second laminating step, and a third laminating step according to the third embodiment.

FIG. 48 is a diagram illustrating an example of the first laminating step S1701, second laminating step S1702, and third laminating step S1703 according to the third embodiment.

Four comb-shaped electrode strips (the first current collector 101, second current collector 102, third current collector 103, and fourth current collector 104) may be inserted into each other, in the vertical relationship illustrated in FIG. 48, and also shifted by 90 degrees for example, as illustrated in FIG. 48, and bonded by pressing. Movement of the current collectors for insertion may be realized using the above-described folding members (e.g., rod members, wire members, etc.), for example. Using four electrode strips that each are individual members enables the number of necessary bipolar electrodes per electrode strip to be reduced. Accordingly, the manufacturing process can be simplified. Further, the strength of the laminated battery can be improved. For example, the strength of the laminated battery as to mechanical shock from a side face can be further improved.

The fourth current collector preparation step S104 may be executed after the first current collector preparation step S101, second current collector preparation step S102, and third current collector preparation step S103. Alternatively, fourth current collector preparation step S104 may be executed before the first current collector preparation step S101, second current collector preparation step S102, and third current collector preparation step S103. Alternatively, the first current collector preparation step S101, second current collector preparation step S102, third current collector preparation step S103, and fourth current collector preparation step S104 may be executed at the same time.

As for specific methods of the steps encompassed by the fourth current collector preparation step S104, methods shown as specific methods of the steps encompassed by the above-described first current collector preparation step S101 may be employed as appropriate.

The fourth current collector preparation step S104 may further encompass a sixth solid electrolyte layer forming step S1626 (i.e., a step (f26)) and a seventh solid electrolyte layer forming step S1627 (i.e., a step (f27)), as illustrated in FIGS. 46 and 47.

The sixth solid electrolyte layer forming step S1626 is a step of forming the fourth solid electrolyte layer 244 on at least one of the seventh electrode layer 227 and first counter electrode layer 231 by the solid electrolyte layer forming unit 440.

The seventh solid electrolyte layer forming step S1627 is a step of forming the fifth solid electrolyte layer 245 on at least one of the sixth electrode layer 226 and seventh counter electrode layer 237 by the solid electrolyte layer forming unit 440.

According to the above configuration, individual solid battery cells (individual power-generating elements) can be fabricated by a convenient folding process. Thus, a laminated battery where multiple solid battery cells are serially laminated can be fabricated with suppressed positional deviation of the component members, as compared with a case of using a process of laminating a great number of individual component members.

In a case where the solid electrolyte layer forming steps are encompassed by the fourth current collector preparation step S104, the solid electrolyte layers are formed on the electrode layers and counter electrode layers formed on the fourth current collector 104.

Note that the sixth solid electrolyte layer forming step S1626 may be encompassed by the first current collector preparation step S101. In this case, the sixth solid electrolyte layer 246 is formed on the first counter electrode layer 231 formed on the first current collector 101.

Also, the seventh solid electrolyte layer forming step S1627 may be encompassed by the third current collector preparation step S103. In this case, the seventh solid electrolyte layer 247 is formed on the sixth electrode layer 226 formed on the third current collector 103.

Note that the solid electrolyte layers may be formed on the electrode layers and counter electrode layers formed on the first current collector 101, second current collector 102, third current collector 103, and fourth current collector 104.

In the manufacturing method illustrated in FIGS. 46 and 47, the fourth solid electrolyte layer forming step S1624 is a step of forming the fourth solid electrolyte layer 244 on at least one of the fifth electrode layer 225 and sixth counter electrode layer 236 by the solid electrolyte layer forming unit 440.

According to the above-described manufacturing method illustrated in FIGS. 46 and 47, the battery 2200 according to the second embodiment can be manufactured.

Figure 49:
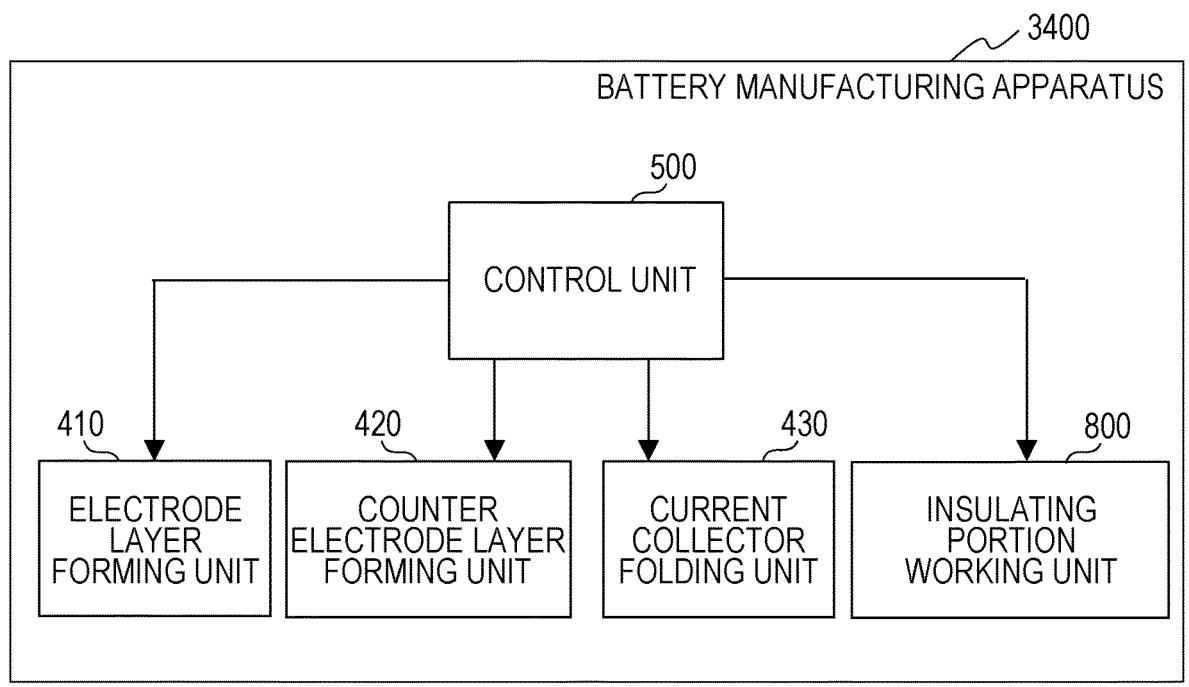
FIG. 49 is a diagram illustrating a schematic configuration of a battery manufacturing apparatus according to the third embodiment.

FIG. 49 is a diagram illustrating a schematic configuration of a battery manufacturing apparatus 3400 according to the third embodiment.

The battery manufacturing apparatus 3400 according to the third embodiment further includes the following configuration, in addition to the configuration of the above-described battery manufacturing apparatus 3000 according to the third embodiment.

That is to say, the battery manufacturing apparatus 3400 according to the third embodiment includes an insulating portion working unit 800. The insulating portion working unit 800 works edge portions.

The insulating portion working unit 800 may shrink edge portions. The insulating portion working unit 800 may have, for example, an edge portion shrinking member (e.g., a heating device, etc.). Each edge portion may include thermal shrinking material. The insulating portion working unit 800 may heat the insulating portions by the heating device and cause the thermal shrinking material to shrink, thereby causing the insulating portions to shrink.

Figure 50:
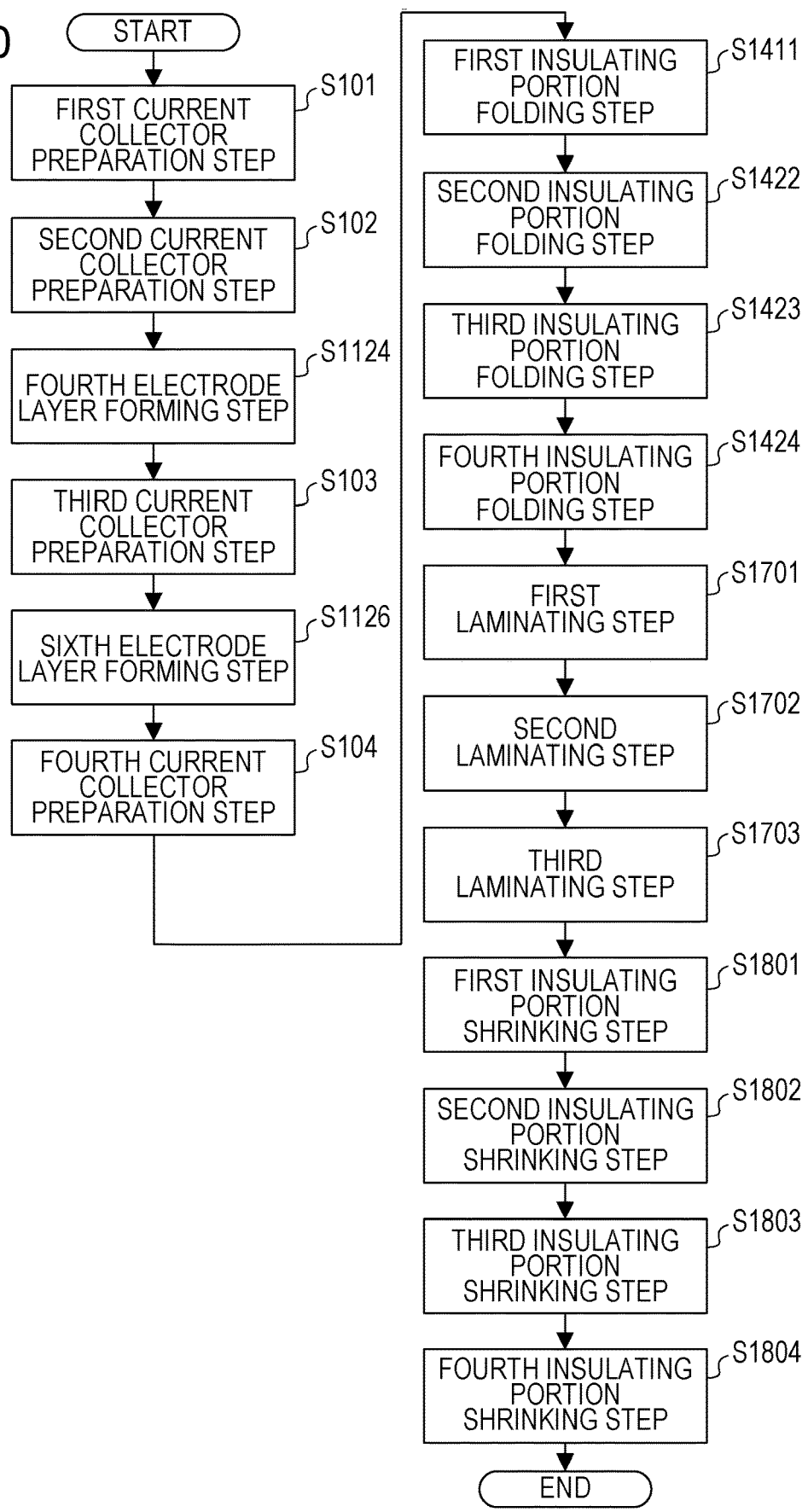
FIG. 50 is a flowchart illustrating an example of a battery manufacturing method according to the third embodiment.

FIG. 50 is a flowchart illustrating an example of a battery manufacturing method according to the third embodiment.

The battery manufacturing method illustrated in FIG. 50 further includes the following steps, in addition to the steps of the above-described battery manufacturing method illustrated in FIG. 47.

That is to say, the battery manufacturing method illustrated in FIG. 50 further includes a first insulating portion shrinking step S1801 (i.e., a step (g1)), a second insulating portion shrinking step S1802 (i.e., a step (g2)), a third insulating portion shrinking step S1803 (i.e., a step (g3)), and a fourth insulating portion shrinking step S1804 (i.e., a step (g4)).

The first insulating portion shrinking step S1801 is a step of shrinking the first insulating portion 121 by the insulating portion working unit 800, after the first insulating portion folding step S1411.

According to the above configuration, by shrinking the first insulating portion 121, the bonding by the first insulating portion 121 between the battery component members can be made even stronger.

The second insulating portion shrinking step S1802 is a step of shrinking the second insulating portion 122 by the insulating portion working unit 800, after the second insulating portion folding step S1422.

According to the above configuration, by shrinking the second insulating portion 122, the bonding by the second insulating portion 122 between the battery component materials can be made even stronger.

The third insulating portion shrinking step S1803 is a step of shrinking the third insulating portion 123 by the insulating portion working unit 800, after the third insulating portion folding step S1423.

According to the above configuration, by shrinking the third insulating portion 123, the bonding by the third insulating portion 123 between the battery component materials can be made even stronger.

The fourth insulating portion shrinking step S1804 is a step of shrinking the fourth insulating portion 124 by the insulating portion working unit 800, after the fourth insulating portion folding step S1424.

According to the above configuration, by shrinking the fourth insulating portion 124, the bonding by the fourth insulating portion 124 between the battery component materials can be made even stronger.

Note that the insulating portion working unit 800 may bond insulating portions to each other. That is to say, bending and bonding may be performed so that multiple insulating portions are bonded with each other (e.g., FIG. 13). At this time, the insulating portion working unit 800 may have bonding members (e.g., pressing plate, roller, etc.), for example. The insulating portion working unit 800 may integrate multiple insulating portions into a wall-like form, by pressing a bonding member against the insulating portions. Thus, multiple insulating portions can be integrated into a wall-like form. Accordingly, the structure where multiple power-generating elements have been serially connected can be maintained more strongly.

Note that the insulating portion working unit 800 may remove insulating portions. For example, after the folding processing of the insulating portions or the like, part of the insulating portions (or all of the insulating portions) may be removed (e.g., cut). Accordingly, energy density by volume and energy density by weight of the battery can be further improved.

Note that in the third embodiment, the electrode layer forming unit 410, counter electrode layer forming unit 420, solid electrolyte layer forming unit 440, and adhesion portion forming unit 600 may each have, for example, a discharging mechanism (e.g., a discharge orifice) that discharges coating material (e.g., electrode material, counter electrode material, solid electrolyte material, adhesive material, etc.), a supply mechanism (e.g., a tank and supply tube) that supplies the coating material to the discharge mechanism, a conveyance mechanism (e.g., a roller) that conveys an object to be coated or the like, a pressing mechanism (e.g., a pressing stand and a cylinder) that applies pressure for compression, and so forth. Commonly known apparatuses and members may be used for these mechanisms as appropriate.

Note that in the third embodiment, the current collector folding unit 430 may be provided with, for example, a folding mechanism (e.g., rod member, wire member, etc.) that folds an object of folding, a conveying mechanism (e.g., roller) that conveys the object of folding, and so forth. Commonly known apparatuses and members may be used for these mechanisms as appropriate.

Note that in the third embodiment, the laminating unit 700 may be provided with, for example, a conveying mechanism (e.g., roller) that moves an object of laminating (e.g., current collector) or the like, and adjusting mechanism that adjusts the position of the object of laminating, and so forth. Commonly known apparatuses and members may be used for these mechanisms as appropriate.

Note that the battery manufacturing apparatus according to the third embodiment may further have a control unit 500. The control unit 500 controls operations of the electrode layer forming unit 410, counter electrode layer forming unit 420, current collector folding unit 430, solid electrolyte layer forming unit 440, adhesion portion forming unit 600, laminating unit 700, and insulating portion working unit 800.

The control unit 500 may be configured of a processor and memory, for example. The processor may be a central processing unit (CPU) or microprocessor unit (MPU) or the like, for example. The processor may execute the control method (battery manufacturing method) disclosed in the present disclosure by reading out and executing programs stored in the memory.

Note that the battery manufacturing method according to the third embodiment is not restricted to coating for the electrode layers, counter electrode layers, and solid electrolyte layers. These may be formed by other techniques (e.g., sequential laminating, applying two objects to each other, transferring, etc.), or by combinations of coating and other techniques, and so forth.

Note that in the battery manufacturing method according to the third embodiment, the power-generating elements may be pressed by a press or the like, after the folding steps of the insulating portions or the like. This can realize higher packing density, and stronger adhesion. That is to say, applying pressure in the layer direction of the layers enables making the layers more precise and in a better bonding state with each other. That is to say, the electrode strips made up of current collectors may be bond-pressed. Bond pressing enables electrode layers and counter electrode layers of adjacent bipolar electrodes to be bonded across solid electrolyte layers. Further, electroconductive portions of current collectors that are doubled over are also connected even more strongly. The force of the bond pressing may be decided so that a bonding force and inter-layer packing rate necessary for good battery properties are obtained among each of the electrode layers and solid electrolyte layers, and among the solid electrolyte layers and counter electrode layers. A pressure may be selected and applied for the bond pressing so that a bonding strength that is electrically and mechanically good at electroconductive portions that are doubled over is obtained.

The battery according to the present disclosure can be used as a battery (e.g., fully-solid secondary battery) for electronic equipment, electric appliances, electric vehicles, and so forth.

What is claimed is:

1. A battery, comprising:
 a first current collector;
 a first electrode layer;
 a first counter electrode layer; and
 a second electrode layer,
 wherein the first counter electrode layer is a counter electrode of the first electrode layer and the second electrode layer,
 wherein the first current collector includes a first electroconductive portion, a first insulating portion, and a second electroconductive portion,
 wherein the second electroconductive portion includes a first edge region, a first front face region, a first rear face region, a first fold portion, a second front face region, a second rear face region, and a second edge region,
 wherein the first front face region is a region situated between the first edge region and the first fold portion,
 wherein the first rear face region is a region situated on a rear face of the first front face region,
 wherein the second front face region is a region situated between the second edge region and the first fold portion,
 wherein the second rear face region is a region situated on a rear face of the second front face region,
 wherein the first current collector is folded at the first fold portion, whereby the first rear face region and the second rear face region are positioned facing each other,
 wherein the first electrode layer is disposed in contact with the first electroconductive portion,
 wherein the first counter electrode layer is disposed in contact with the first front face region,
 wherein the second electrode layer is disposed in contact with the second front face region,
 wherein the first insulating portion links the first electroconductive portion and the first edge region,
 wherein the first current collector is folded at the first insulating portion, whereby the first electrode layer and the first counter electrode layer are positioned facing each other, and
 wherein the first current collector is folded at the first fold portion such that the first rear face region faces and is in contact with the second rear face region and conducts electricity causing electron mobility in the first fold portion.

2. The battery according to claim 1, further comprising:
 a first adhesion portion that adheres the first rear face region and second rear face region together,
 wherein the first adhesion portion is disposed between the first rear face region and the second rear face region.

3. The battery according to claim 1,
 wherein the first front face region includes a first material,
 wherein the second front face region includes a second material, and
 wherein the second material is a material that is different from the first material.

4. The battery according to claim 1,
 wherein the first rear face region and the second rear face region include a third material.

5. The battery according to claim 4,
 wherein the first front face region includes a first material, and
 wherein the first material is a material that is different from the third material.

6. The battery according to claim 4,
 wherein the second front face region includes a second material, and
 wherein the second material is a material that is different from the third material.

7. The battery according to claim 1, further comprising:
 a second counter electrode layer,
 wherein the second counter electrode layer is a counter electrode of the first electrode layer and second electrode layer,
 wherein the first current collector includes a second insulating portion and a third electroconductive portion,
 wherein the second counter electrode layer is disposed in contact with the third electroconductive portion,
 wherein the second insulating portion links the second edge region and the third electroconductive portion, and
 wherein the first current collector is folded at the second insulating portion, whereby the second electrode layer and second counter electrode layer are positioned facing each other.

8. The battery according to claim 7, further comprising:
 a first solid electrolyte layer; and
 a second solid electrolyte layer,
 wherein the first solid electrolyte layer is situated between the first electrode layer and the first counter electrode layer,
 wherein the second solid electrolyte layer is situated between the second electrode layer and the second counter electrode layer, and
 wherein the first fold portion is covered by at least one of the first solid electrolyte layer and the second solid electrolyte layer.

9. The battery according to claim 7, further comprising:
 a third electrode layer; and
 a third counter electrode layer,
 wherein the third counter electrode layer is a counter electrode of the first electrode layer, second electrode layer, and third electrode layer,
 wherein the first current collector includes a third insulating portion and a fourth electroconductive portion,
 wherein the third electroconductive portion includes a third edge region, a third front face region, a third rear face region, a second fold portion, a fourth front face region, a fourth rear face region, and a fourth edge region, wherein the third front face region is a region situated between the third edge region and the second fold portion, wherein the third rear face region is a region situated on a rear face of the third front face region, wherein the fourth front face region is a region situated between the fourth edge region and the second fold portion, wherein the fourth rear face region is a region situated on a rear face of the fourth front face region, wherein the first current collector is folded at the second fold portion, whereby the third rear face region and fourth rear face region are positioned facing each other, wherein the second counter electrode layer is disposed in contact with the third front face region, wherein the third electrode layer is disposed in contact with the fourth front face region, wherein the third counter electrode layer is disposed in contact with the fourth electroconductive portion, wherein the second insulating portion links the second edge region and third edge region, wherein the third insulating portion links the fourth edge region and the fourth electroconductive portion, and wherein the first current collector is folded at the third insulating portion, whereby the third electrode layer and the third counter electrode layer are positioned facing each other.

10. The battery according to claim 9, further comprising:
a first solid electrolyte layer;
a second solid electrolyte layer; and
a third solid electrolyte layer,
wherein the first solid electrolyte layer is situated between the first electrode layer and the first counter electrode layer,
wherein the second solid electrolyte layer is situated between the second electrode layer and the second counter electrode layer, and
wherein the third solid electrolyte layer is situated between the third electrode layer and the third counter electrode layer.

11. The battery according to claim 1, further comprising:
a second current collector;
a second counter electrode layer;
a third electrode layer; and
a third counter electrode layer,
wherein the second counter electrode layer and the third counter electrode layer are counter electrodes of the first electrode layer, the second electrode layer, and the third electrode layer,
wherein the second current collector has a third electroconductive portion, a second insulating portion, and a fourth electroconductive portion,
wherein the third electroconductive portion has a third edge region, a third front face region, a third rear face region, a second fold portion, a fourth front face region, a fourth rear face region, and a fourth edge region,
wherein the third front face region is a region situated between the third edge region and the second fold portion,
wherein the third rear face region is a region situated on a rear face of the third front face region,
wherein the fourth front face region is a region situated between the fourth edge region and second fold portion,
wherein the fourth rear face region is a region situated on a rear face of the fourth front face region,
wherein the second current collector is folded at the second fold portion, whereby the third rear face region and fourth rear face region are positioned facing each other,
wherein the third electroconductive portion is disposed between the first electroconductive portion and second electroconductive portion,
wherein the second counter electrode layer is disposed in contact with the third front face region, at a position facing the first electrode layer,
wherein the third electrode layer is disposed in contact with the fourth front face region, at a position facing the first counter electrode layer,
wherein the third counter electrode layer is disposed in contact with the fourth electroconductive portion,
wherein the second insulating portion links the fourth edge region and the fourth electroconductive portion, and
wherein the second current collector is folded at the second insulating portion, whereby the second electrode layer and third counter electrode layer are positioned facing each other.

12. The battery according to claim 11, further comprising:
a third current collector;
a fourth electrode layer;
a fourth counter electrode layer;
a fifth electrode layer; and
a fifth counter electrode layer,
wherein the fourth counter electrode layer and the fifth counter electrode layer are counter electrodes of the first electrode layer, second electrode layer, third electrode layer, fourth electrode layer, and fifth electrode layer,
wherein the third current collector has a fifth electroconductive portion, a third insulating portion, and a sixth electroconductive portion,
wherein the fifth electroconductive portion has a fifth edge region, a fifth front face region, a fifth rear face region, a third fold portion, a sixth front face region, a sixth rear face region, and a sixth edge region,
wherein the fifth front face region is a region situated between the fifth edge region and the third fold portion,
wherein the fifth rear face region is a region situated on a rear face of the fifth front face region,
wherein the sixth front face region is a region situated between the sixth edge region and third fold portion,
wherein the sixth rear face region is a region situated on a rear face of the sixth front face region,
wherein the third current collector is folded at the third fold portion, whereby the fifth rear face region and sixth rear face region are positioned facing each other,
wherein the fifth electroconductive portion is disposed between the third electroconductive portion and second electroconductive portion,
wherein the fourth electrode layer is disposed in contact with the fourth electroconductive portion,
wherein the fourth counter electrode layer is disposed in contact with the fifth front face region, at a position facing the third electrode layer,
wherein the fifth electrode layer is disposed in contact with the sixth front face region, at a position facing the first counter electrode layer,
wherein the fifth counter electrode layer is disposed in contact with the sixth electroconductive portion,
wherein the third insulating portion links the sixth edge region and the sixth electroconductive portion, and wherein the third current collector is folded at the third insulating portion, whereby the fourth electrode layer and fifth counter electrode layer are positioned facing each other.

13. The battery according to claim 12, further comprising:
a fourth current collector;
a sixth electrode layer;
a sixth counter electrode layer;
a seventh electrode layer; and
a seventh counter electrode layer,
wherein the sixth counter electrode layer and the seventh counter electrode layer are counter electrodes of the first electrode layer, the second electrode layer, the third electrode layer, the fourth electrode layer, the fifth electrode layer, the sixth electrode layer, and the seventh electrode layer,
wherein the fourth current collector includes a seventh electroconductive portion, a fourth insulating portion, and an eighth electroconductive portion,
wherein the seventh electroconductive portion includes a seventh edge region, a seventh front face region, a seventh rear face region, a fourth fold portion, an eighth front face region, an eighth rear face region, and an eighth edge region,
wherein the seventh front face region is a region situated between the seventh edge region and the fourth fold portion,
wherein the seventh rear face region is a region situated on a rear face of the seventh front face region,
wherein the eighth front face region is a region situated between the eighth edge region and fourth fold portion,
wherein the eighth rear face region is a region situated on a rear face of the eighth front face region,
wherein the fourth current collector is folded at the fourth fold portion, whereby the seventh rear face region and eighth rear face region are positioned facing each other,
wherein the seventh electroconductive portion is disposed between the fifth electroconductive portion and the second electroconductive portion,
wherein the sixth electrode layer is disposed in contact with the sixth electroconductive portion,
wherein the sixth counter electrode layer is disposed in contact with the seventh front face region, at a position facing the fifth electrode layer,
wherein the seventh electrode layer is disposed in contact with the eighth front face region, at a position facing the first counter electrode layer,
wherein the seventh counter electrode layer is disposed in contact with the eighth electroconductive portion,
wherein the fourth insulating portion links the eighth edge region and the eighth electroconductive portion, and
wherein the fourth current collector is folded at the fourth insulating portion, whereby the sixth electrode layer and seventh counter electrode layer are positioned facing each other.

14. The battery according to claim 13, further comprising:
a first solid electrolyte layer;
a second solid electrolyte layer;
a third solid electrolyte layer;
a fourth solid electrolyte layer;
a fifth solid electrolyte layer;
a sixth solid electrolyte layer; and
a seventh solid electrolyte layer,
wherein the first solid electrolyte layer is situated between the first electrode layer and the second counter electrode layer,
wherein the second solid electrolyte layer is situated between the third electrode layer and the fourth counter electrode layer;
wherein the third solid electrolyte layer is situated between the second electrode layer and the third counter electrode layer,
wherein the fourth solid electrolyte layer is situated between the fifth electrode layer and sixth counter electrode layer,
wherein the fifth solid electrolyte layer is situated between the fourth electrode layer and fifth counter electrode layer,
wherein the sixth solid electrolyte layer is situated between the seventh electrode layer and the first counter electrode layer, and
wherein the seventh solid electrolyte layer is situated between the sixth electrode layer and the seventh counter electrode layer.

* * * * *